US012679126B2

(12) United States Patent
David et al.

(10) Patent No.: US 12,679,126 B2
(45) Date of Patent: Jul. 14, 2026

(54) PRINTHEAD OPENING SYSTEM AND METHOD

(71) Applicant: Brady Worldwide, Inc., Milwaukee, WI (US)

(72) Inventors: Don Rodriguez David, Singapore (SG); Mui Heng Too, Singapore (SG)

(73) Assignee: Brady Worldwide, Inc., Milwaukee, WI (US)

( * ) Notice: Subject to any disclaimer, the term of this patent is extended or adjusted under 35 U.S.C. 154(b) by 196 days.

(21) Appl. No.: 18/790,814

(22) Filed: Jul. 31, 2024

(65) Prior Publication Data

US 2026/0034816 A1 Feb. 5, 2026

(51) Int. Cl.
*B41J 29/54* (2006.01)
*B41J 2/32* (2006.01)
(Continued)

(52) U.S. Cl.
CPC ................ *B41J 29/54* (2013.01); *B41J 2/32* (2013.01); *B41J 2/325* (2013.01); *B41J 25/304* (2013.01);
(Continued)

(58) Field of Classification Search
CPC . B41J 29/54; B41J 2/325; B41J 25/304; B41J 25/312; B41J 25/34; B41J 29/13;
(Continued)

(56) References Cited

U.S. PATENT DOCUMENTS 3,107,875 A 10/1963 Gochenour et al.
3,990,690 A 11/1976 Lick
(Continued)

FOREIGN PATENT DOCUMENTS

CN 112455097 A 3/2021
DE 4405044 A1 8/1995
(Continued)

OTHER PUBLICATIONS

Partial European Search Report received for European Patent Application No. 25190683.0, mailed on Jan. 2, 2026, 14 pages.
(Continued)

*Primary Examiner* — Henok D Legesse
(74) *Attorney, Agent, or Firm* — Husch Blackwell LLP

(57) ABSTRACT

The present disclosure is directed to a printhead assembly for use in a printer. The printhead assembly includes a printhead connected to a printer holder. The printhead is movable between a lowered position and a lifted position. The printhead assembly also includes a lever subassembly. The lever subassembly includes a lever shaft, a locking mechanism configured to maintain the printhead assembly in a closed position when the locking mechanism is engaged, and a lever cam connected to the lever shaft and positioned adjacent to a portion of the printhead holder. The lever cam moves the printhead from the lowered position to the lifted position by engaging the printhead holder. The printhead is moved to the lifted position prior to disengaging the locking mechanism when moving the printhead assembly from the closed position to an open position.

20 Claims, 58 Drawing Sheets

(51) Int. Cl.
*B41J 2/325* (2006.01)
*B41J 25/304* (2006.01)
*B41J 25/312* (2006.01)
*B41J 25/34* (2006.01)
*B41J 29/13* (2006.01)
*B41J 29/56* (2006.01)
*B41J 2/335* (2006.01)

(52) U.S. Cl.
CPC ............ *B41J 25/312* (2013.01); *B41J 25/34* (2013.01); *B41J 29/13* (2013.01); *B41J 29/56* (2013.01); *B41J 2/33505* (2013.01); *B41J 2202/31* (2013.01)

(58) Field of Classification Search
CPC . B41J 29/56; B41J 2/32; B41J 2/33505; B41J 2202/31
See application file for complete search history.

(56) References Cited

U.S. PATENT DOCUMENTS

| | | | | |
|---|---|---|---|---|
| 4,079,896 | A | 3/1978 | Plach | |
| 4,919,555 | A | 4/1990 | Kikuchi | |
| 4,984,915 | A | 1/1991 | Tashiro et al. | |
| 5,170,960 | A | 12/1992 | Pretto | |
| 5,232,174 | A | 8/1993 | Sato et al. | |
| 5,788,384 | A | 8/1998 | Goodwin et al. | |
| 5,813,343 | A | 9/1998 | Harb | |
| 5,820,277 | A | 10/1998 | Schulte | |
| 5,938,350 | A | 8/1999 | Colonel | |
| 5,947,409 | A | 9/1999 | Corrigan, Jr. | |
| 6,095,704 | A | 8/2000 | Jaeger et al. | |
| 6,302,604 | B1 | 10/2001 | Bryant et al. | |
| 6,361,228 | B1 | 3/2002 | Barrus et al. | |
| 6,616,362 | B2 | 9/2003 | Bouverie et al. | |
| 6,840,689 | B2 | 1/2005 | Barrus et al. | |
| 7,125,182 | B2 | 10/2006 | Campbell et al. | |
| 7,131,778 | B2 | 11/2006 | Tobin et al. | |
| 7,506,834 | B2 | 3/2009 | Lenkl | |
| 7,824,116 | B2 | 11/2010 | Lyman | |
| 7,905,444 | B2 | 3/2011 | Chen | |
| 7,911,204 | B2 | 3/2011 | Chen | |
| 8,029,201 | B2 | 10/2011 | Chen | |
| 8,177,446 | B2 | 5/2012 | Kuo et al. | |
| 8,182,163 | B2 | 5/2012 | Kuo et al. | |
| 8,616,793 | B2 | 12/2013 | Kasugai et al. | |
| 8,783,981 | B2 | 7/2014 | Watson et al. | |
| 8,844,859 | B2 | 9/2014 | Deonarine | |
| 9,718,285 | B2 * | 8/2017 | Kokuta .................... | B41J 15/16 |
| 9,908,344 | B2 | 3/2018 | Onodera et al. | |
| 10,301,132 | B2 | 5/2019 | Gonzalez Perello et al. | |
| 10,618,311 | B2 | 4/2020 | Lu et al. | |
| 10,640,325 | B2 | 5/2020 | Yap | |
| 10,759,202 | B2 | 9/2020 | Chen et al. | |
| 10,967,660 | B2 | 4/2021 | Ji et al. | |
| 2006/0007296 | A1 | 1/2006 | Bouverie et al. | |
| 2007/0034727 | A1 | 2/2007 | Kaya | |
| 2008/0232888 | A1 | 9/2008 | Liu et al. | |
| 2009/0175670 | A1 | 7/2009 | Chen | |
| 2009/0238628 | A1 | 9/2009 | Kuo et al. | |
| 2009/0315964 | A1 * | 12/2009 | Tomita ..................... | B41J 17/24 347/104 |
| 2010/0061790 | A1 | 3/2010 | Yu et al. | |
| 2011/0020044 | A1 | 1/2011 | Yu | |
| 2011/0020045 | A1 | 1/2011 | Yu | |
| 2013/0113858 | A1 * | 5/2013 | Gotschewski ......... | B41J 25/312 347/17 |
| 2017/0225496 | A1 | 8/2017 | Gotschewski et al. | |

FOREIGN PATENT DOCUMENTS

| | | | |
|---|---|---|---|
| DE | 20117005 | U1 | 2/2002 |
| DE | 20117004 | U1 | 4/2002 |
| DE | 202008009215 | U1 | 1/2009 |
| EP | 3255001 | A1 | 12/2017 |
| FR | 2959445 | A3 | 11/2011 |
| JP | 2008055762 | A | 3/2008 |
| JP | 2008137319 | A | 6/2008 |
| TW | M642044 | U | 6/2023 |
| WO | 2008095442 | A1 | 8/2008 |

OTHER PUBLICATIONS

Brady, "BradyPrinter i7100 600 dpi Industrial Label Printer with Product and Wire ID Software Suite", https://www.bradyid.com/label-printers/bradyprinter-i7100-600dpi-industrial-label-printer-product-wire-id-software-suite-pid-149056?s_kwcid=AL!10720!3!309643306982!e!!g!!i7100&cid=ppc&camp=ppc-us-brand-google.com-search-models_exact-i7100-i7100&gad_source=1&gclid=Cj0KCQjw-r-vBhCARIsAGgUO2AUxMkTjV5dcxFJ2_07HQwdlSEGfbkFDUslm1OQ--yKe7jeooS1qaUaAhqDEALw_wcB, 9 pages, Accessed May 30, 2024.

Wraptor A6500 Wrap Printer Applicator with Product and Wire ID Software Suite, https://www.bradyid.com/automated-labeling/wraptor-a6500-wrap-printer-applicator-product-wire-id-software-suite-pid-149242, 8 pages, date accessed Sep. 16, 2024.

Extended European Search Report received for European Patent Application No. 25190683.0, mailed on Apr. 7, 2026, 13 pages.

* cited by examiner

PRINTHEAD OPENING SYSTEM AND METHOD

CROSS-REFERENCE TO RELATED APPLICATIONS

None.

BACKGROUND

Thermal transfer printers employ a digital printing method that uses a ribbon and a printhead to selectively transfer ink onto a substrate (e.g., paper or another form of printable media). This method is known in the art to produce high-quality, high-resolution, durable prints. For example, thermal transfer printers are commonly used to print labels (e.g., barcodes) that will be used for long-term applications or that will be exposed to harsh conditions such as heat, ultraviolet light, moisture, and chemicals. Thermal transfer printers are also capable of handling high-volume print jobs in an efficient and cost-effective manner. For these and other reasons, thermal transfer printers are commonplace in a variety of industries including retail, healthcare, manufacturing, and others. Although the printhead is typically retained within a printhead assembly that includes a casing or other cover (e.g., to shelter the printhead from dust accumulation), users must be able to open the printhead assembly to access the printhead and associated parts for maintenance, loading consumables, replacing the printhead, and other purposes.

The ribbon and substrate are fed between the printhead and a platen roller at a nip point. At the nip point, the printhead applies heat to the ribbon and presses the ribbon and the substrate against the platen roller such that ink melted by the printhead is transferred from the ribbon to the substrate. The force applied by the printhead at the nip point (i.e., the "nip force") is critical to the printing process as such force ensures the ink-coated surface of the ribbon material is pressed firmly against the substrate when the ink is transferred. However, the nip force can interfere with the opening and/or closing of the printhead assembly.

For example, some devices use a locking mechanism with pivoted hooks engaging locking pins to open and close the printhead assembly. To open the printhead assembly, a user may need to push down on the printhead assembly such that the hooks disengage the locking pins. To close the printhead assembly, a user may need to, again, push down on the printhead assembly such that the hooks reengage the locking pins. The nip force may provide a considerable resistance when pushing down on the printhead assembly such that a significant amount of downward force is required to disengage or reengage the locking mechanism. This imposes hardship on consumers and may also cause the printhead and associated parts to wear more quickly over time.

Other devices use a locking mechanism with pivoted plungers connected to a lever to open and/or close the printhead assembly. However, these designs typically limit the degree to which the printhead assembly can be opened. For example, the opening providing access to the printhead or other internal parts of the printhead assembly may be smaller than is desirable, thereby creating inconvenience for users performing maintenance, replacing consumable parts, or otherwise requiring access to the internal components of the printhead assembly. The opening can be made larger by increasing the size of the printhead assembly overall, but this can affect the overall size and/or cost of the printer.

In view of the issues described above, a need exists for a printhead assembly for use with a printer that facilitates opening and closing the printhead assembly without the application of significant force and provides adequate access to the printhead and associated parts when the printhead assembly is opened.

SUMMARY

The present systems and methods disclosed herein overcome many of the shortcomings and limitations of the prior art devices discussed above.

In one aspect, a printhead assembly for use in a printer is disclosed. The printhead assembly includes a printhead connected to a printhead holder. The printhead is movable between a lowered position and a lifted position. The printhead assembly also includes a lever subassembly. The lever subassembly includes a lever shaft, a locking mechanism that maintains the printhead assembly in a closed position when the locking mechanism is engaged, and a lever cam connected to the lever shaft and positioned adjacent to a portion of the printhead holder. The lever cam moves the printhead from the lowered position to the lifted position by engaging the printhead holder. The printhead is moved to the lifted position prior to disengaging the locking mechanism when moving the printhead assembly from the closed position to an open position.

In another aspect, a printhead assembly for use in a printer is disclosed. The printhead assembly includes an enclosure formed by a casing and a side plate coupled to the casing. The printhead assembly also includes a printhead connected to a printhead holder retained within the enclosure and a lever subassembly. The lever subassembly includes a lever shaft positioned partially within the enclosure, a first lock member and a second lock member positioned on the lever shaft, and a lever cam positioned on the lever shaft. A first end of the lever shaft extends beyond the side plate and a second end of the lever shaft extends beyond a sidewall of the casing. The first lock member releasably engages a first locking pin, and the second lock member releasably engages a second locking pin. A lever is connected to the second end of the lever shaft and operably engages the lever subassembly. The printhead assembly is movable between a closed position and an open position. The printhead occupies a lowered position when the printer is in use and the printhead occupies a lifted position when the printhead assembly is transitioned between the closed position and the open position.

In a further aspect, a method of opening and closing a printhead assembly in a printer is disclosed. The method includes the step of providing a printhead assembly. The printhead assembly includes a printhead connected to a printhead holder, a lever subassembly including a lever shaft retaining a lock member releasably engaging a locking pin, and a lever cam positioned on the lever shaft and arranged to engage the printhead holder. The method also includes the step of transitioning the lever subassembly from a default configuration to a lift configuration such that the lever cam engages the printhead holder and the printhead moves from a lowered position to a lifted position while the lock member maintains engagement with the locking pin. The method further includes the steps of releasing the engagement between the lock member and the locking pin, moving the printhead assembly from a closed position to an open position, returning the printhead assembly to the closed position and reengaging the lock member with the locking pin while the printhead is in the lifted position, and returning the lever subassembly to the default configuration such that the lever cam no longer engages the printhead holder and the printhead returns to the lowered position.

BRIEF DESCRIPTION OF THE DRAWINGS

FIG. 58 illustrates a top, rear, and right side isometric view of a portion of the printhead assembly of FIG. 5.

DETAILED DESCRIPTION

Figure 1:
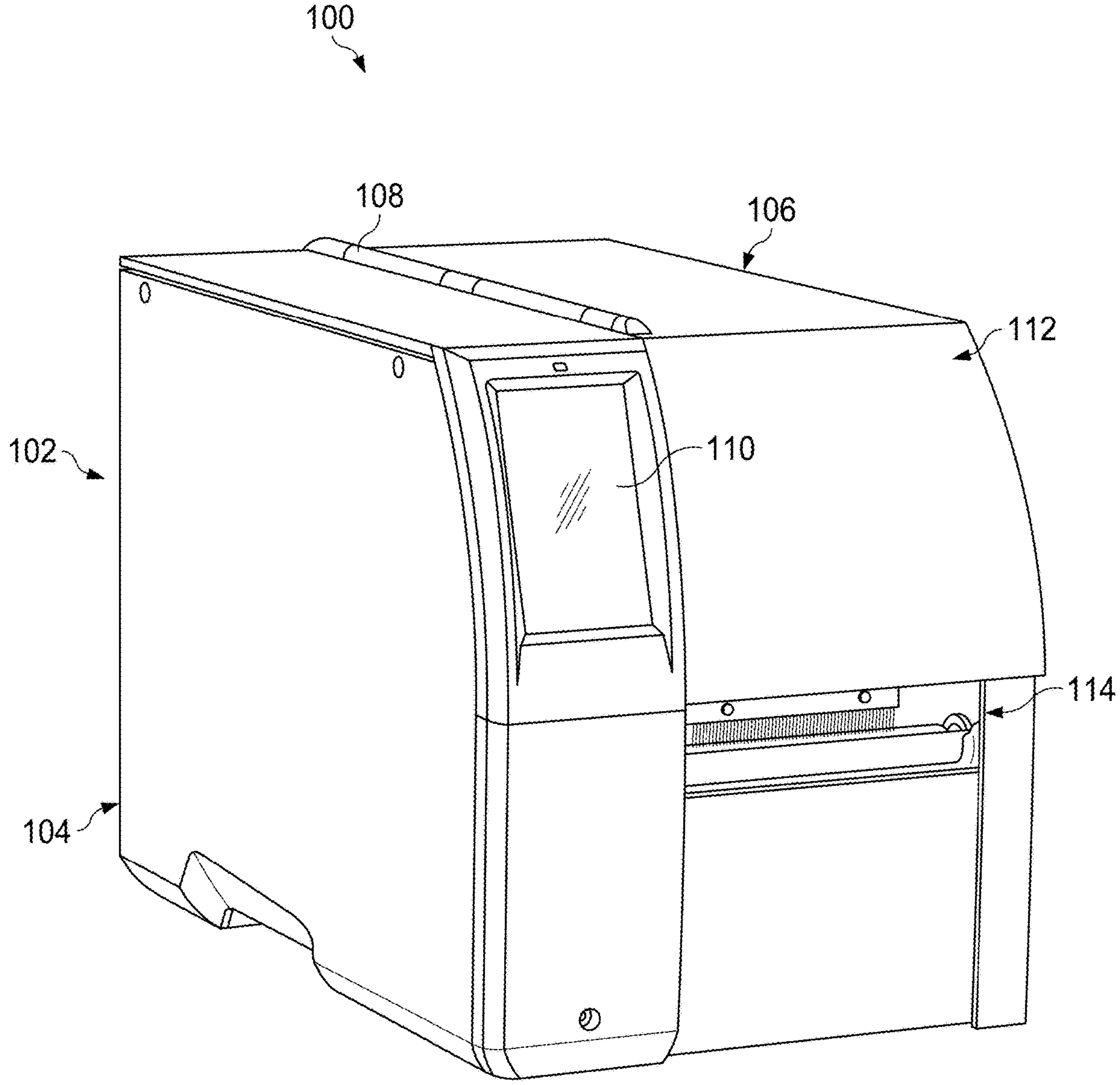
FIG. 1 illustrates a front, top, and left side isometric view of an exemplary printer in a closed configuration.

Before any embodiments are described in detail, it is to be understood that the disclosure is not limited in its application to the details of construction and the arrangement of components set forth in the following description or illustrated in the following drawings, which is limited only by the claims that follow the present disclosure. The disclosure is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the disclosure.

Additionally, while the following discussion may describe features associated with specific devices or embodiments, it is understood that additional devices and/or features can be used with the described systems and methods, and that the discussed devices and features are used to provide examples of possible embodiments, without being limited.

The present disclosure is directed to a system for opening and closing a printhead module or assembly in a printer. The system may include a lever shaft with lock members positioned thereon and releasably engaging locking pins such that the printhead assembly is maintained in a closed position. A lever may operably engage the lever shaft such that moving (e.g., rotating) the lever may cause the lock members to disengage the locking pins. In some instances, the lever subassembly may include lever cams positioned on the lever shaft. The lever cams may be configured to lift the printhead out of engagement with the platen roller before the lock members disengage the locking pins. In this way, the system may reduce the force required to open and/or close the printhead assembly.

Figure 2:
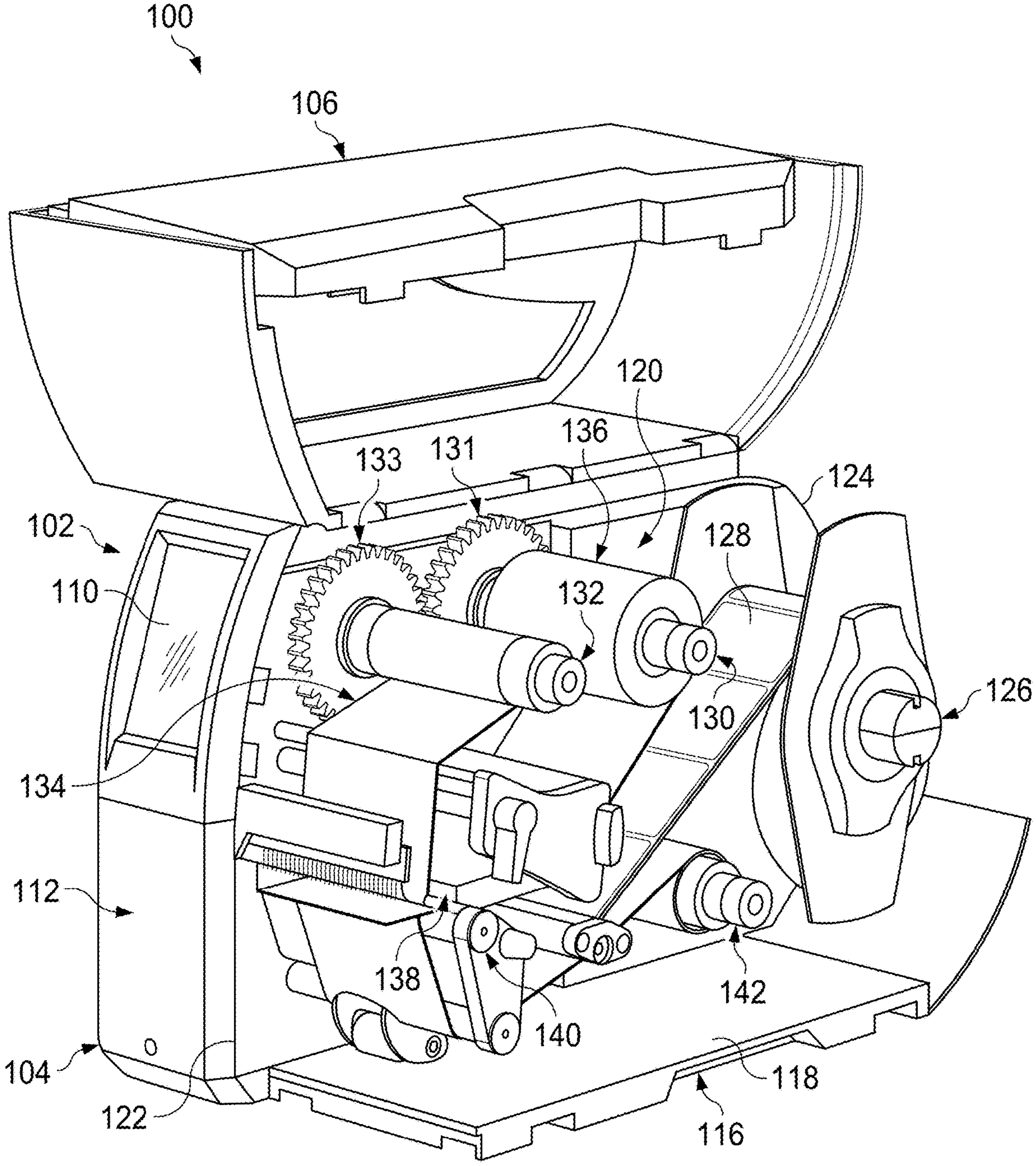
FIG. 2 illustrates a front, top, and right side isometric view of the printer of FIG. 1 in an open configuration.

Referring first to FIGS. 1 and 2, an exemplary thermal transfer printer 100 is provided in the form of a housing 102 defining a base portion 104 and an enclosure cover 106. The base portion 104 and the enclosure cover 106 may be hingedly attached or otherwise coupled to one another such that the enclosure cover 106 may be removably opened and/or attached to allow access to the internal components of the printer 100 and to allow for installation or maintenance of the internal parts. For example, the enclosure cover 106 may be coupled to the base portion 104 via a hinge 108.

A user interface 110 may be located on a front face 112 of the printer 100. The user interface 110 may allow users to operate, service, or otherwise interface with the printer 100. For example, the user interface 110 may enable users to alter certain settings or preferences with respect to one or more print jobs. Additionally, the printer 100 may include an exit slot 114 provided in the form of a rectilinear opening between the base portion 104 and the enclosure cover 106 disposed on the front face 112. The exit slot 114 may provide an aperture through which printed media produced by the printer 100 may exit the printer 100, e.g., to be retrieved by a user.

As shown in FIG. 2, the enclosure cover 106 of the printer 100 is designed to move into an open configuration. In some instances, the enclosure cover 106 may be rotatable about an axis of connection with the base portion 104 formed by the hinge 108. Thus, a user may place the printer 100 in the open configuration by lifting the enclosure cover 106 away from the base portion 104 and causing the enclosure cover 106 to rotate about the hinge, thereby exposing one or more internal components of the printer 100.

The base portion 104 may include a chassis 116 configured to support one or more internal components of the printer 100. The chassis 116 may be provided in the form of a floor 118 and a mounting wall 120 oriented in a plane that is substantially perpendicular to the floor 118. The mounting wall 120 may be formed integrally with or coupled to the floor 118 and extend upwardly therefrom. The mounting wall 120 may be defined by a front end 122 (the front end 122 corresponding to the front face 112 of the printer 100) and a rear end 124 opposing the front end 122. In some instances, the chassis 116 may be formed from cast aluminum. In other instances, the chassis 116 may be formed from any other suitable material.

Internal components of the printer 100 may be connected to the mounting wall 120 of the chassis 116. For example, a media holder 126 may be connected to the mounting wall 120 and may be positioned adjacent to the rear end 124 of the chassis 116. The media holder 126 is designed to retain and dispense a supply of printable media 128 (e.g., adhesive labels or any other suitable media) as the printer 100 operates. The media holder 126 may be configured to support printable media 128 of different sizes (e.g., labels having different widths).

The chassis 116 may also support a ribbon supply spindle 130 and a waste ribbon spindle 132 connected to the mounting wall 120. The ribbon supply spindle 130 may be positioned on the mounting wall 120 proximate to the media holder 126, and the waste ribbon spindle 132 may be positioned between the ribbon supply spindle 130 and the front end 122 of the mounting wall 120.

The ribbon supply spindle 130 may retain and dispense a supply of ribbon material 134 from a ribbon roll 136 (e.g., in a manner similar to the media holder 126) as the printer 100 operates. During the printing process, printable media 128 from the media holder 126 and ribbon material 134 from the ribbon supply spindle 130 may each be directed toward the front end 122 of the mounting wall 120. The printable media 128 and the ribbon material 134 may converge proximate to a printhead 138 and a platen roller 140. The printhead 138 and platen roller 140 may each be connected to the chassis 116 and positioned proximate to the front end 122 of the mounting wall 120. For example, the printhead 138 and platen roller 140 may be positioned on the mounting wall 120 so that the printhead 138 and platen roller 140 are positioned adjacent to the exit slot 114 when the enclosure cover 106 is placed in a closed configuration.

During printing, the printable media 128 and ribbon material 134 may pass between the printhead 138 and the platen roller 140. The printhead 138 may be configured to apply heat to the ribbon material 134 passing beneath the printhead 138, thereby causing ink from the ribbon material 134 to melt and adhere to an adjacent portion of the printable media 128. At the same time, the platen roller 140 may be arranged to provide a smooth support surface to the printable media 128 and ribbon material 134 as they pass beneath the printhead 138 and come into contact with one another. For example, the platen roller 140 may apply a pressure against the printable media 128 and the ribbon material 134, thereby ensuring that each engages firmly with the printhead 138 such that ink from the ribbon material 134 is effectively transferred to the printable media 128.

Once the ink from the ribbon material 134 has been applied to the printable media 128 by the printhead 138, the printable media 128 may exit the printer 100 via the exit slot 114 and the used ribbon material 134 may be directed to and collected on the waste ribbon spindle 132. In some instances, rather than exiting the printer 100 via the exit slot 114, the printable media 128 may be directed back toward the rear end 124 of the mounting wall 120 where the printable media 128 may be collected by a rewinder 142. In this way, the printer 100 may generate as an end product a roll of printed media (e.g., a roll of printed labels) to be later retrieved, or otherwise removed, by a user, rather than supplying the finished product directly to a user via the exit slot 114.

Figure 3:
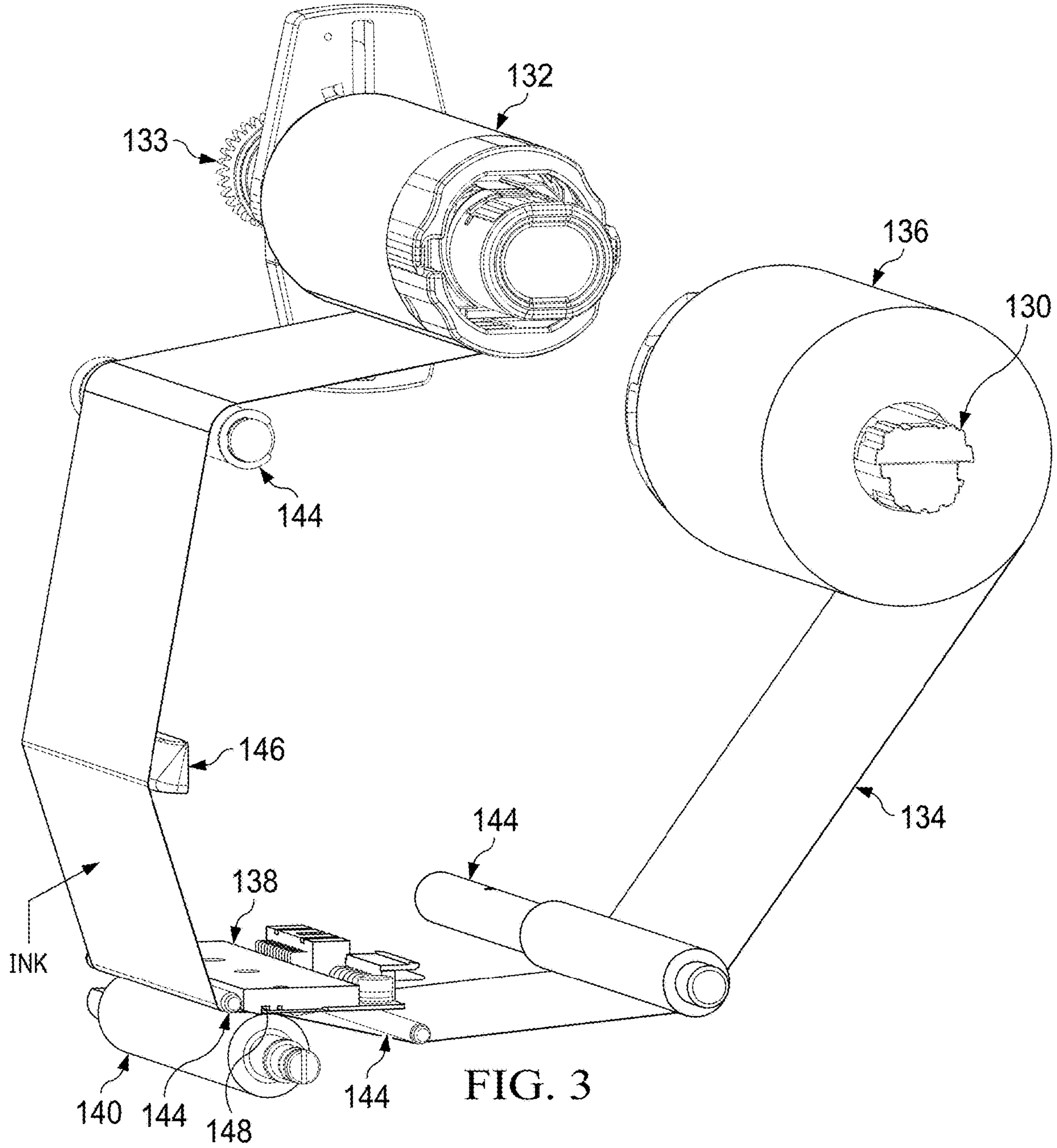
FIG. 3 illustrates a front, top, and left side isometric view of several components of the printer of FIGS. 1 and 2 including an exemplary collapsible core assembly for use with the printer of FIGS. 1 and 2 constructed according to the teachings of the present invention.

Turning to FIG. 3, the printer 100 may include one or more rollers 144 and/or one or more diverters 146 arranged to deflect or guide the ribbon material 134 along a desired ribbon path. In some instances, the printer 100 may include four rollers 144 and one diverter 146 as shown in FIG. 3. In other instances, the printer 100 may include any number of rollers 144 and/or diverters 146, and the rollers 144 and diverters 146 may be arranged to guide the ribbon material 134 along any suitable path. During operation (e.g., of the printer 100), unused ribbon material 134 may be unwound from the ribbon roll 136 installed on the ribbon supply spindle 130, the ribbon material 134 may be guided along a desired ribbon path that passes between the printhead 138 and the platen roller 140 such that the ribbon material 134 can be acted on by the printhead 138, and used ribbon material 134 may be collected on the waste ribbon spindle 132.

The ribbon path may guide the ribbon material 134 through a nip point 148 where the printhead 138 contacts or is positioned adjacent to the platen roller 140. In some instances, the ribbon material 134 (and the printable media 128 shown in FIG. 2) may be subject to a nip force at the nip point 148 (e.g., a pinching force applied by the printhead 138). Some types of printable media 128 may require a higher or lower nip force to achieve optimum print quality. Thus, in some instances, the nip force applied at the nip point 148 may need to be adjusted depending on the type of printing operation being performed or the type of printable media 128 being used.

Figure 4:
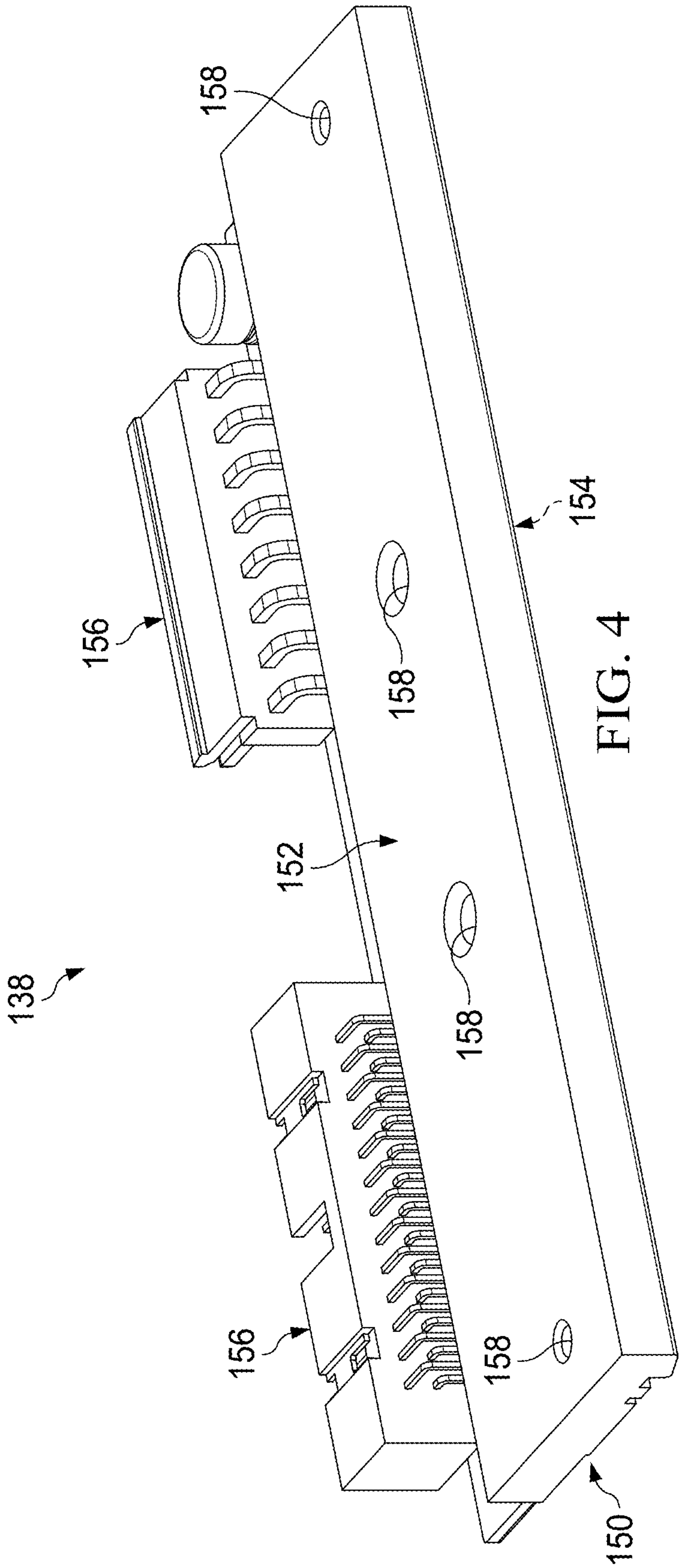
FIG. 4 illustrates a front, top, and left side isometric view of a printhead of the printer of FIGS. 1 and 2.

As best shown in FIG. 4, the printhead 138 may be provided in the form of a substantially rectilinear printhead body 150 defined by a substantially planar printhead attachment surface 152 and a substantially planar heating surface 154 (not shown) oriented parallel and positioned opposite with respect to the printhead attachment surface 152. The printhead 138 may include one or more heating modules 156 designed to provide heat to (e.g., by transmitting an electrical current to) one or more heating elements (not shown) positioned on the heating surface 154 and arranged to act on the ribbon material 134. One or more printhead connection holes 158 may be disposed along the printhead body 150 and extend entirely therethrough. For example, the printhead connection holes 158 may be arranged to facilitate a connection between the printhead 138 and one or more associated components (e.g., of a printhead assembly 200 shown in FIG. 5) by receiving a fastener (e.g., a screw, pin, or any other suitable fastener) therein.

Figure 5:
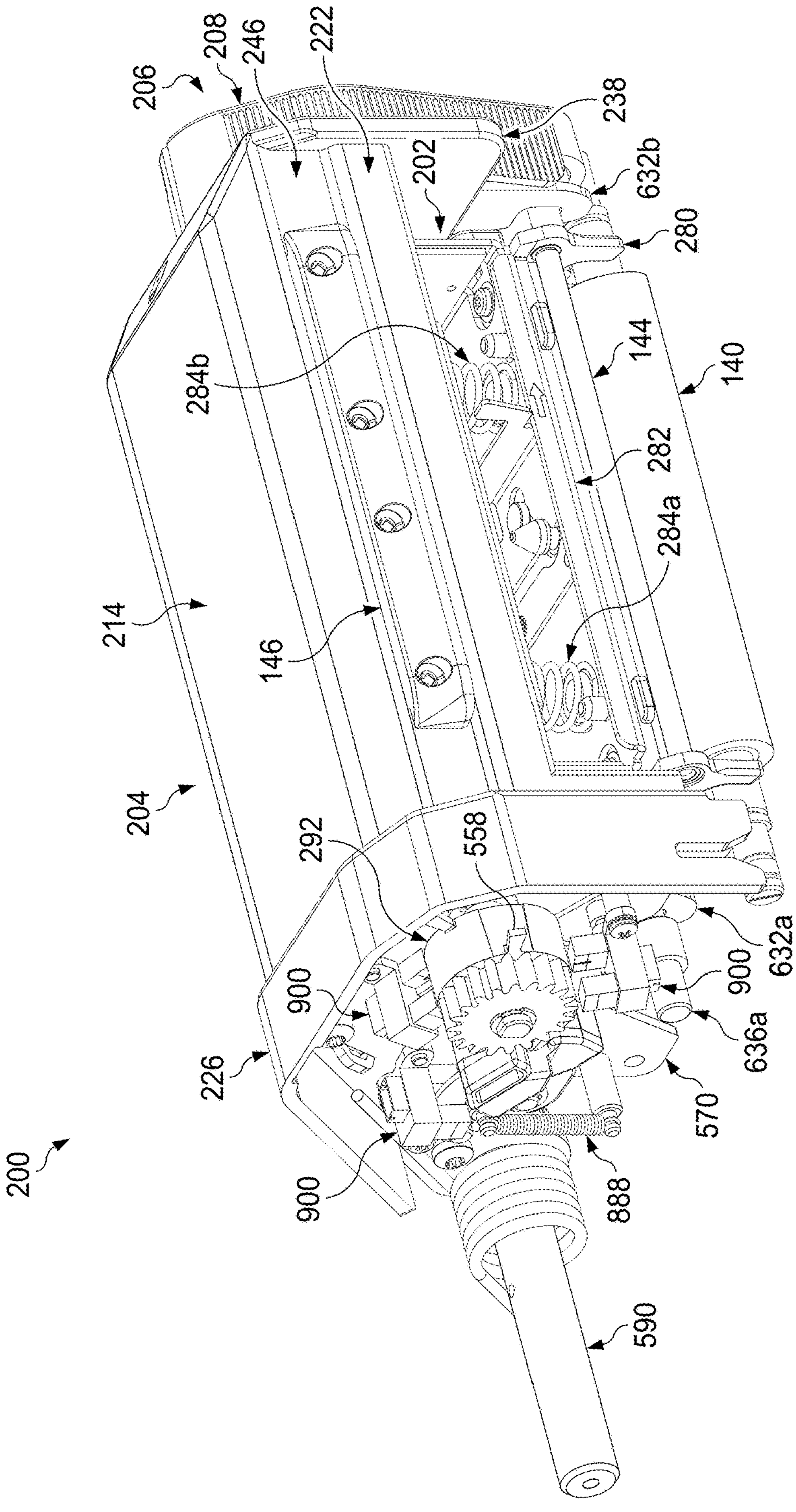
FIG. 5 illustrates a front, top, and left side isometric view of an exemplary printhead assembly constructed according to the principles of the present disclosure in a closed position.
Figure 6:
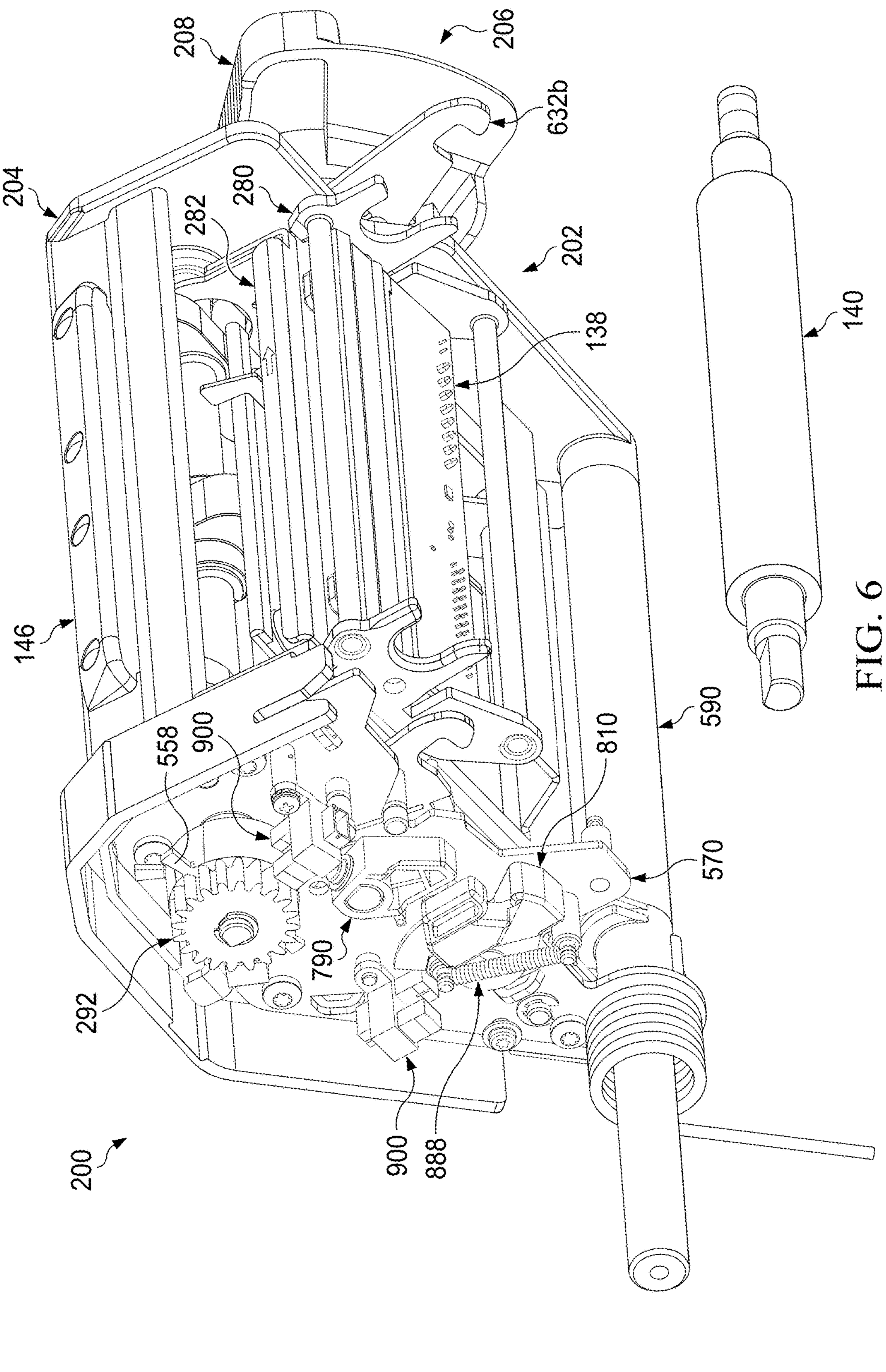
FIG. 6 illustrates a front, top, and left side isometric view of the printhead assembly of FIG. 5 in an open position.

Turning to FIG. 5, the printhead assembly 200 may include a printhead module 202 at least partially retained within a casing 204. For example, the casing 204 may be provided to shelter, support, and/or retain various components of the printhead module 202 positioned therein (e.g., by preventing dust or other particles from accumulating on the printhead 138 or associated parts). The printhead assembly 200 may occupy a closed position, shown in FIG. 5, where the printhead 138 engages (e.g., applies a nip force to) the platen roller 140. A lever subassembly 206 including a lever 208 positioned adjacent to the casing 204 may operably engage the printhead module 202 and/or the casing 204 such that the lever subassembly 206 is operable to transition the printhead assembly 200 from the closed position to an open position (see FIG. 6). For example, a user may engage the lever 208 to open the printhead assembly 200 and access one or more components thereof (e.g., the printhead 138). As shown in FIG. 6, the printhead module 202 (including the printhead 138) and the casing 204 may rotate upwardly away from the platen roller 140 such that the printhead 138 is retained at a distance from the platen roller 140 when the printhead assembly 200 is in the open position. In some instances, opening the printhead assembly 200 may be desirable or necessary to perform maintenance or cleaning, fix or replace the heating elements or other components of the printhead 138, clear jams (e.g., when ribbon material 134 is caught or tangled-up in the printhead assembly 200), or under other circumstances.

Figure 7:
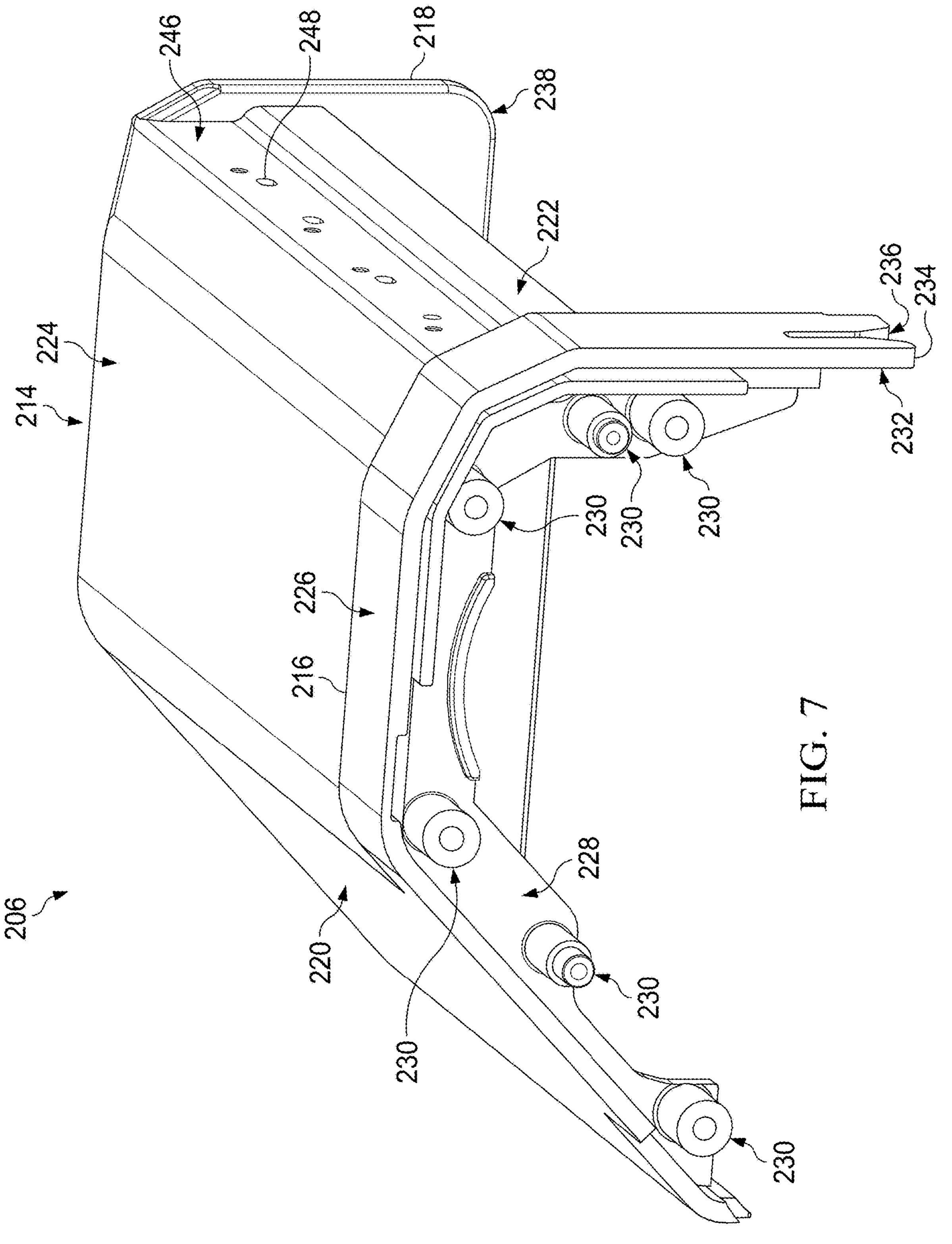
FIG. 7 illustrates a front, top, and left side isometric view of a casing of the printhead assembly of FIG. 5.

Turning to FIG. 7, the casing 204 may be provided in the form of a substantially rectilinear roof 214 extending between a casing first side 216 and a casing second side 218 opposing the casing first side 216. In some instances, the roof 214 may be defined by a slanted portion 220, a substantially vertical portion 222, and an upper panel 224 positioned between the slanted portion 220 and the vertical portion 222. In other instances, the casing 204 may be imparted with any suitable shape and structure. A substantially rectilinear overhang 226 may be positioned at the casing first side 216 and may be connected to at least a portion of the slanted portion 220, upper panel 224, and/or vertical portion 222. The overhang 226 may be substantially parallel with respect to the roof 214. In some instances, at least a portion of the overhang 226 may be elevated with respect to the roof 214 (see FIG. 8). In other instances, the overhang 226 may be substantially coplanar with the roof 214.

A substantially rectilinear casing lip 228 may be connected to the overhang 226 and extend downwardly therefrom. One or more casing mounting members 230 designed to support or engage one or more components of the printhead module 202 or other components of the printhead assembly 200 may be positioned on the casing lip 228. In some instances, six casing mounting members 230 may be connected to the casing lip 228 and extend outwardly therefrom. In other instances, the casing 204 may include any number of casing mounting members 230 and the casing mounting members 230 may be arranged on the casing lip 228 in any suitable configuration. The casing mounting members 230 may be provided in the form of substantially cylindrical or annular protrusions extending outwardly from the casing lip 228. For example, the casing mounting members 230 may be oriented substantially perpendicularly with respect to the casing lip 228. In some instances, each casing mounting member 230 may be provided in substantially the same form. In other instances, each casing mounting members 230 may be imparted with any suitable shape or structure provided that each casing mounting member 230 is configured to support or engage a desired component of the printhead assembly 200.

The overhang 226 may include a guide member 232 positioned at an overhang distal end 234. The guide member 232 may be configured to engage or receive an internal component of a printing device (e.g., the printer 100). In some instances, the guide member 232 may include a substantially linear cutout 236 designed to receive an internal component of a printing device and ensure a proper orientation or positioning of the casing 204 and/or the printhead assembly 200 overall with respect to the printing device.

Figure 8:
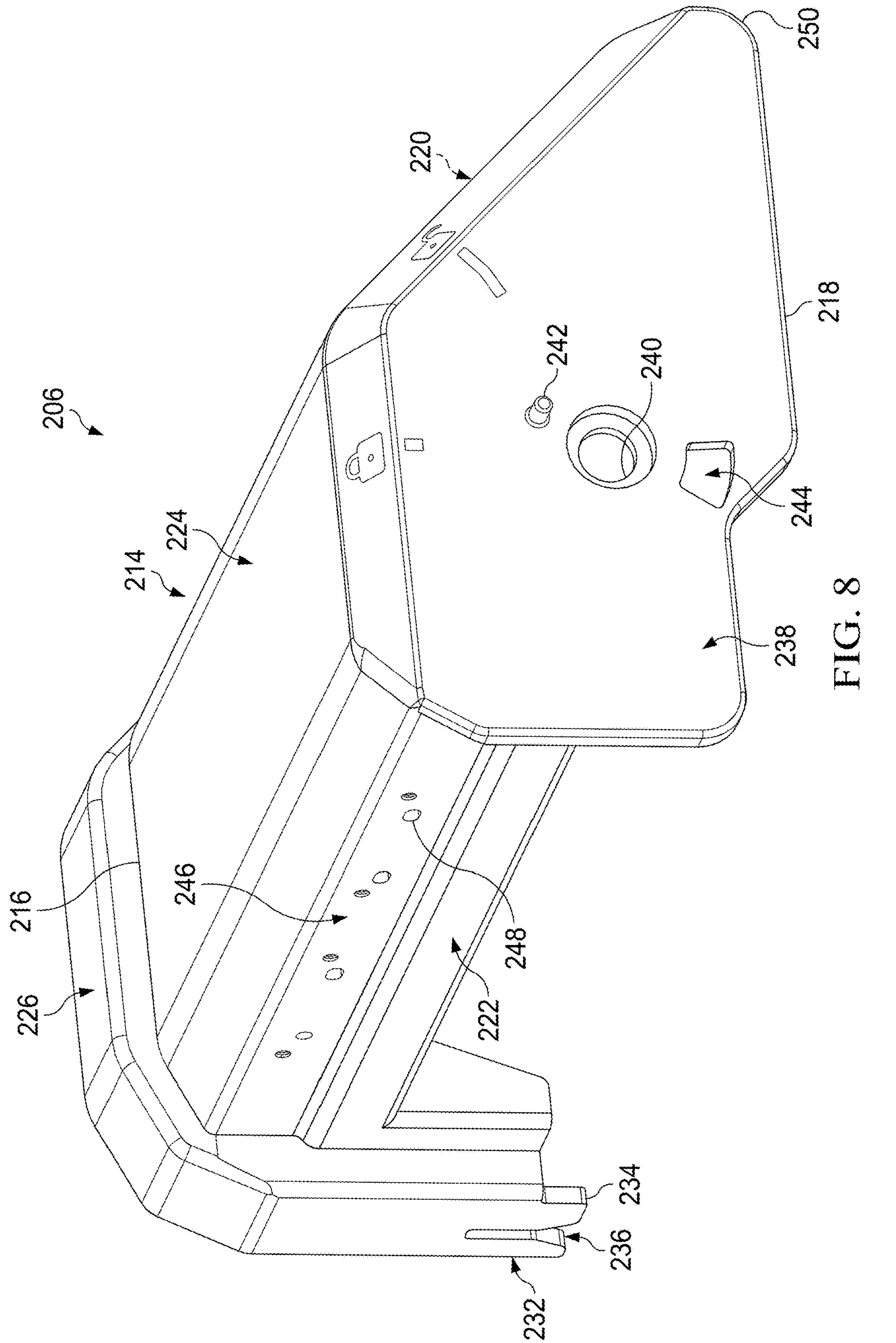
FIG. 8 illustrates a front, top, and right side isometric view of the casing of FIG. 7.

As best shown in FIG. 8, the casing 204 may include a casing sidewall 238 connected to the roof 214 and extending downwardly therefrom. The casing sidewall 238 may be positioned at the casing second side 218 and may be oriented in a plane substantially parallel to the casing lip 228. A casing lever shaft hole 240 may be provided in the form of a substantially circular opening positioned on the casing sidewall 238 and extending entirely therethrough. Additionally, in some instances, one or more casing protrusions 242 and one or more recessed surfaces 244 may be disposed on the casing sidewall 238. In some instances, the casing lever shaft hole 240, casing protrusions 242, and recessed surfaces 244 may be configured facilitate connection or engagement between the printhead module 202 and the lever 208.

In some instances, a diverter surface 246 may be positioned on or adjacent to the vertical portion 222 of the roof 214 with one or more diverter holes 248 positioned thereon and extending at least partially therethrough. In some instances, a diverter 146 may be coupled to the casing 204 via the diverter surface 246 (see FIG. 5). In other instances, the diverter 146 shown in FIG. 5 may be omitted. As shown in FIG. 8, the casing 204 may include a rear corner 250 positioned at a junction between the casing sidewall 238 and the slanted portion 220 of the roof 214.

Figure 9:
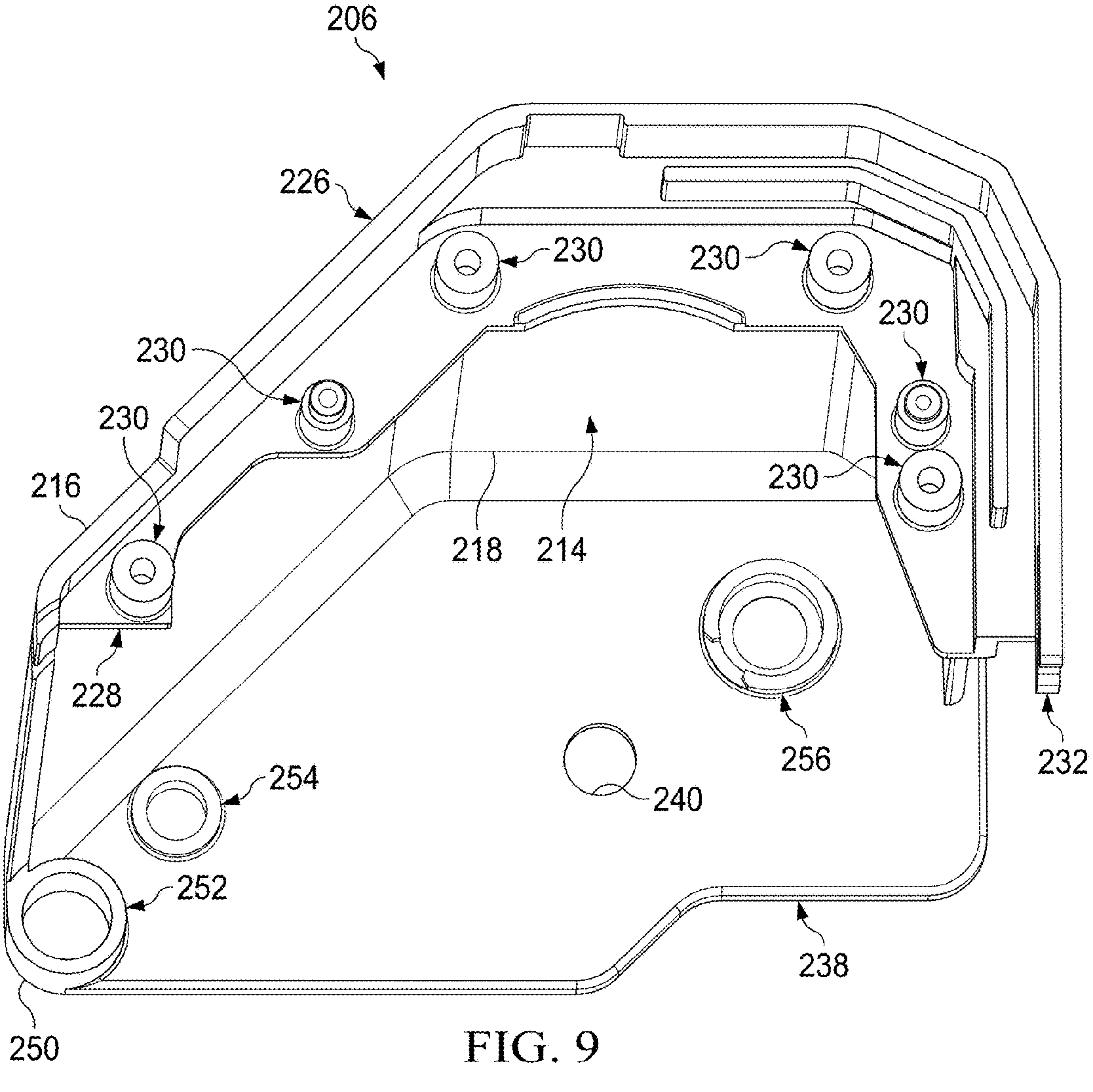
FIG. 9 illustrates a bottom and left side isometric view of the casing of FIG. 7.

Turning to FIG. 9, the casing sidewall 238 may be configured to receive and/or support one or more components of the printhead module 202. For example, in some instances, the casing 204 may include a support shaft seat 252, a linking shaft seat 254, and a cam shaft seat 256 positioned on a casing sidewall interior surface 258. In other instances, the casing 204 may include additional or alternative features designed to support various components of the printhead module 202 that are disposed at least partially within the casing 204. In some instances, the support shaft seat 252, linking shaft seat 254, and cam shaft seat 256 may each be provided in the form of substantially annular protrusions connected to the casing sidewall 238 and extending inwardly therefrom (e.g., toward the casing first side 216). In other instances, the support shaft seat 252, linking shaft seat 254, and cam shaft seat 256 may be provided in any suitable form.

Figure 10:
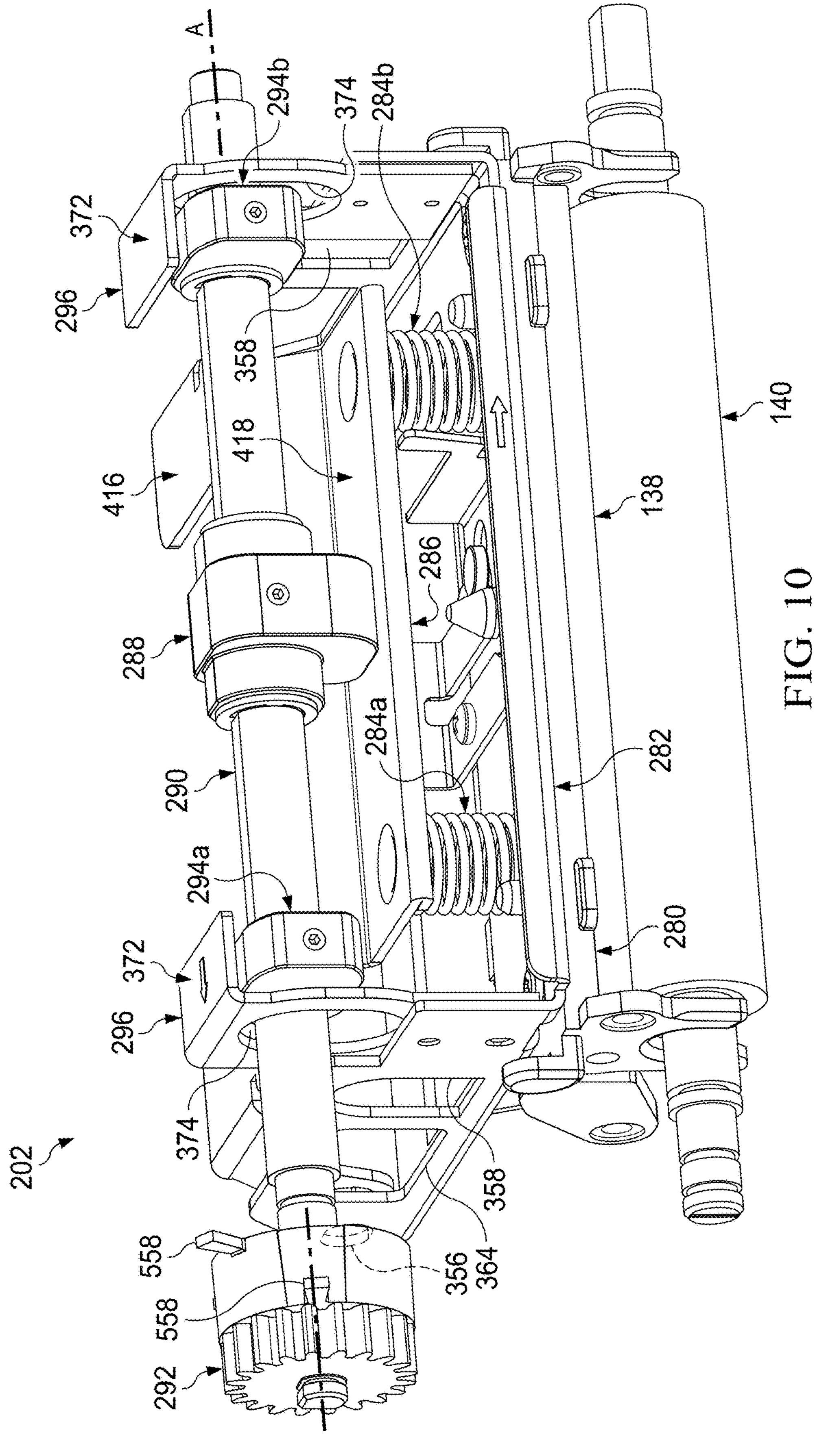
FIG. 10 illustrates a front, top, and left side isometric view of a printhead module of the printhead assembly of FIG. 5.

Turning to FIG. 10, in some instances, the printhead module 202 may be designed to adjust the nip force applied by the printhead 138 at the nip point 148 (see FIG. 3) and/or to facilitate lifting of the printhead 138 away from the platen roller 140 (e.g., to avoid applying a constant nip force to the ribbon material 134 and/or the printable media 128 during periods of non-use). The printhead 138 may be coupled to or retained by a docking plate 280. The docking plate 280 may in turn be connected to a printhead holder 282 designed to be engaged by one or more other components of the printhead module 202 and facilitate movement of the printhead 138. For example, the printhead holder 282 may be configured to impart a downward force on the printhead 138 (e.g., pressing the printhead 138 toward the platen roller 140) or to place the printhead 138 in a lifted position (e.g., moving the printhead 138 out of contact with the platen roller 140).

The printhead module 202 may include one or more springs 284 positioned between the printhead holder 282 and a push plate 286 positioned above the printhead holder 282. The springs 284 may be compressed between the printhead holder 282 and the push plate 286 such that the springs 284 store elastic potential energy and apply an outward force or pressure on the printhead holder 282 and the push plate 286. The outward force applied to the printhead holder 282 may be transmitted to the printhead 138 via the docking plate 280 such that the springs 284 cause the printhead 138 to exert a nip force on the platen roller 140. Thus, the nip force applied by the printhead 138 may be altered by altering the degree to which the springs 284 are compressed (e.g., by altering the distance at which the push plate 286 is retained from the printhead holder 282). In some instances, the printhead module 202 may include two springs 284, a first spring **284*a* and a second spring 284*b*. In other instances, the printhead module 202 may include any suitable number of springs 284**.

A force cam 288 positioned along a cam shaft 290 may be configured to adjustably engage the push plate 286. In some instances, the printhead module 202 may be configured such that rotation of the force cam 288 alters the position of the push plate 286 relative to the printhead holder 282. Thus, rotation of the force cam 288 may cause compression or decompression of the springs 284, thereby adjusting the nip force applied by the printhead 138. The force cam 288 may be configured to rotate in unison with the cam shaft 290. In some instances, a cam adjustment gear 292 may be connected to the cam shaft 290 and positioned for engagement by one or more components of the printhead module 202 or of a printing device (e.g., the printer 100). For example, a gear subassembly (not shown) in communication with the printhead module 202 may be configured to alter the rotational position of the cam shaft 290 via engagement with the cam adjustment gear 292.

Additionally, one or more lift cams 294 configured to move the printhead 138 from a lowered position (depicted in FIG. 10) to a lifted position (e.g., moving the printhead 138 out of contact with the platen roller 140) may be positioned along the cam shaft 290. The lift cams 294 may be configured to rotate in unison with the cam shaft 290 and may be arranged for engagement with an adjacent flange member 296 of the printhead holder 282. For example, in some instances, two lift cams 294, a first lift cam 294*a* and a second lift cam 294*b*, may be positioned proximate to opposing ends of the cam shaft 290. The printhead holder 282 may include two flange members 296 including at least a portion thereof positioned adjacent to (e.g., above) the lift cams 294. In some instances, the printhead assembly 200 may be configured to lift the printhead 138 away from the platen roller 140 such that no nip force is applied (e.g., during periods of non-use) by rotating the cam shaft 290 such that the lift cams 294 rotate into engagement with the flange members 296.

Figure 11:
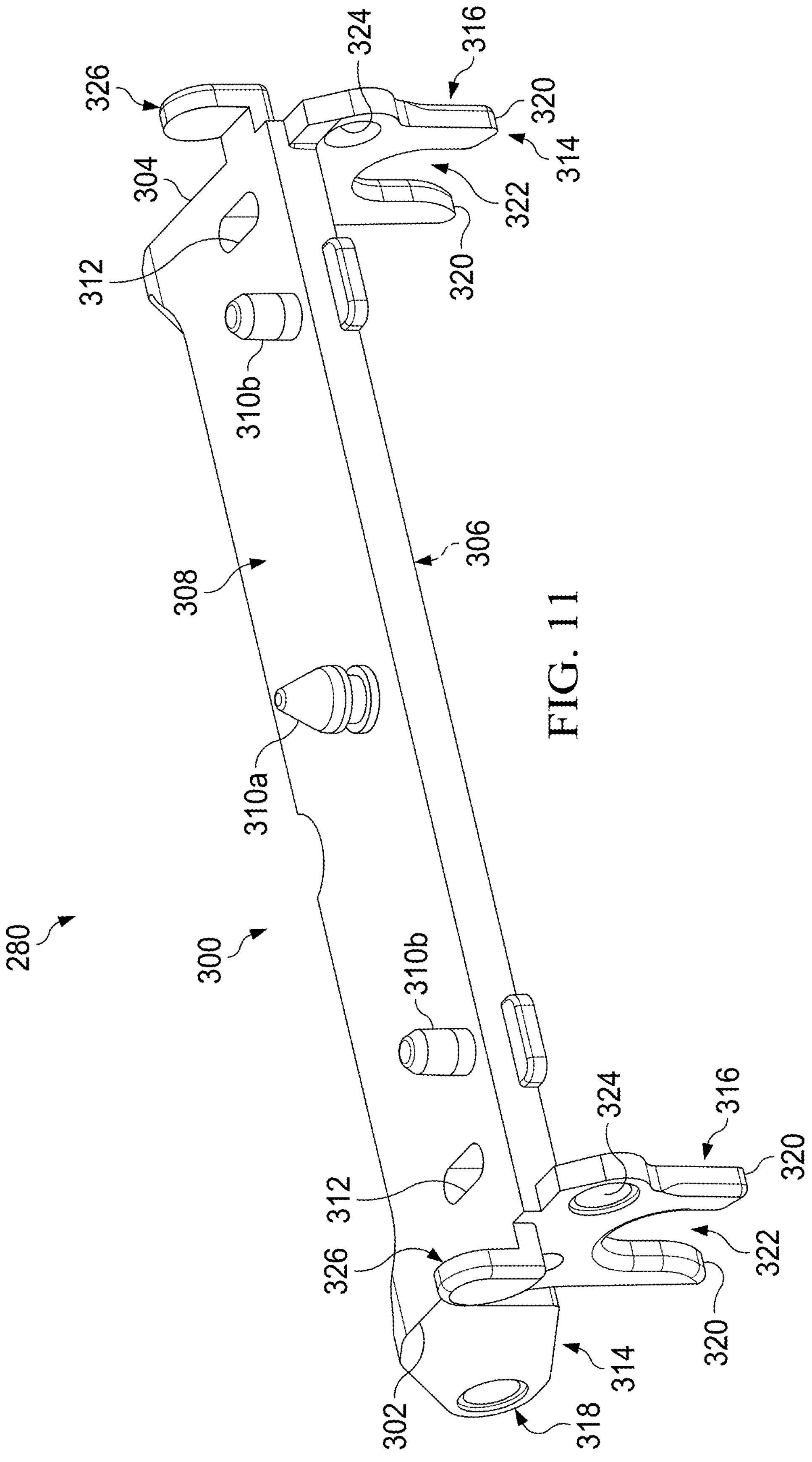
FIG. 11 illustrates a front, top, and left side isometric view of a docking plate of the printhead module of FIG. 10.

Turning to FIG. 11, the docking plate 280 may be provided in the form of a substantially rectilinear docking plate body 300 defined by a docking plate first end 302 and a docking plate second end 304 opposing the docking plate first end 302. The docking plate body 300 may include a first or lower docking plate surface 306 and a second or upper docking plate surface 308 each extending between the docking plate first end 302 and the docking plate second end 304. In some instances, the lower docking plate surface 306 and the upper docking plate surface 308 may be provided in the form of substantially planar surfaces oriented parallel with respect to one another. The printhead 138 may be connected to or installed on the docking plate 280 such that the printhead attachment surface 152 is positioned adjacent to or flush with the lower docking plate surface 306.

One or more dock pin members 310 may be positioned on the upper docking plate surface 308 and extend upwardly therefrom. In some instances, the docking plate 280 may include a first dock pin member 310*a* and two second dock pin members 310*b*. The first dock pin member 310*a* may be substantially conical or frustoconical in shape and may be positioned substantially centrally with respect to the docking plate first end 302 and the docking plate second end 304 (or substantially centrally with respect to the second dock pin members 310*b*). The second dock pin members 310*b* may be substantially cylindrical in shape and may be positioned proximate to the docking plate first end 302 and the docking plate second end 304, respectively. In other instances, the docking plate 280 may include any number of dock pin members 310 and the dock pin members 310 may be positioned in any suitable arrangement and imparted with any suitable structure. The dock pin members 310 are designed to facilitate coupling between the docking plate 280 and the printhead holder 282, the push plate 286, and/or other components of the printhead module 202.

One or more printhead docking holes 312 configured to facilitate coupling of the printhead 138 to the docking plate 280 and/or the printhead holder 282 may be positioned on the docking plate body 300 and extend entirely therethrough. For example, the one or more printhead docking holes 312 may be positioned on the docking plate 280 to align with one or more of the printhead connection holes 158 of the printhead 138 (see FIG. 4). In some instances, the printhead docking holes 312 may be provided in the form of rounded or elliptical-shaped openings extending entirely between the upper docking plate surface 308 and the lower docking plate surface 306. In some instances, the docking plate 280 may include two printhead docking holes 312 such that one of the printhead docking holes 312 is positioned proximate to the docking plate first end 302 and the other printhead docking hole 312 is positioned proximate to the docking plate second end 304. In other instances, the docking plate 280 may include any number of printhead docking holes 312 arranged in any suitable configuration, provided that the printhead docking holes 312 are configured to facilitate a connection between the printhead 138 and the docking plate 280.

Figure 12:
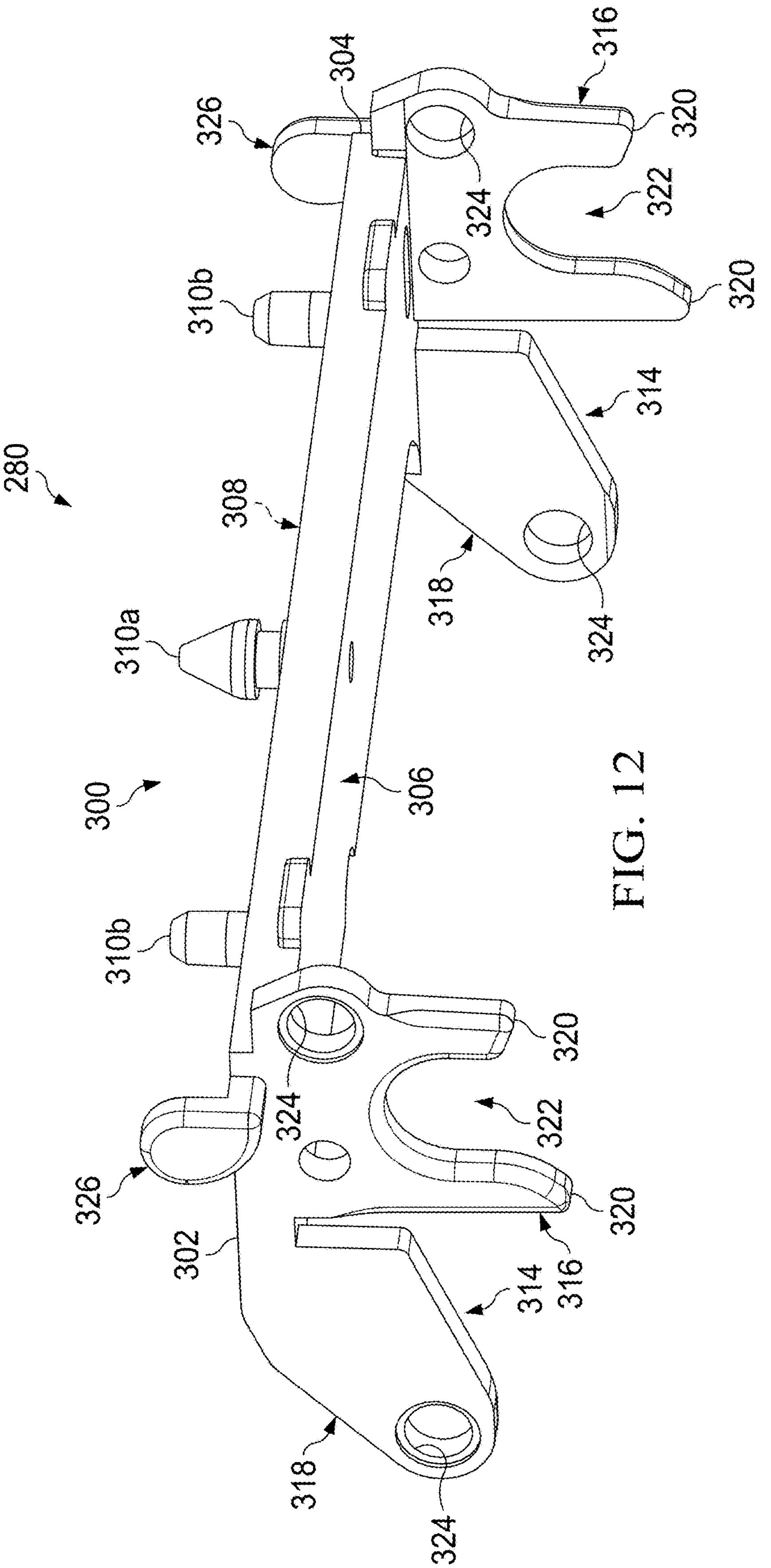
FIG. 12 illustrates a front, bottom, and left side isometric view of the docking plate of FIG. 11.

As best shown in FIG. 12, the docking plate 280 may include two docking plate sidewalls 314 connected to the docking plate body 300 at the docking plate first end 302 and the docking plate second end 304 and extending downwardly therefrom. The docking plate sidewalls 314 may be formed integrally with the docking plate body 300 or may be coupled thereto. Each of the docking plate sidewalls 314 may be provided in the form of an irregularly shaped panel oriented substantially perpendicularly with respect to the docking plate body 300 and may include a pronged member 316 and a rear leg 318 positioned adjacent to the pronged member 316. The pronged member 316 may include two prongs 320 defining a space 322 therebetween. In some instances, the pronged members 316 may be configured to orient the docking plate 280 within a printing device (e.g., the printer 100) by receiving a component of the printing device within the spaces 322.

The docking plate sidewalls 314 may include one or more roller holes 324 designed to support one or more rollers 144 extending between the docking plate sidewalls 314 (see FIG. 5). The roller holes 324 may be provided in the form of substantially circular openings extending entirely through the docking plate sidewalls 314. In some instances, the docking plate sidewalls 314 may each include one roller hole 324 positioned on the pronged member 316 and another roller hole 324 positioned on the rear leg 318. In other instances, the docking plate sidewalls 314 may include any number of roller holes 324 or other openings arranged in any suitable configuration. In some instances, the docking plate 280 may include vertical flaps 326 positioned at each of the docking plate first end 302 and the docking plate second end 304. For example, the vertical flaps 326 may be coupled to the pronged members 316 of the docking plate sidewalls 314 and extend outwardly and/or upwardly therefrom. The vertical flaps 326 may be substantially parallel with respect to the docking plate sidewalls 314 (e.g., perpendicular with respect to the docking plate body 300). In some instances, the vertical flaps 326 may help facilitate connection of the docking plate 280 to the printhead holder 282, or vice versa, and/or the positioning of the printhead holder 282, or a portion of the printhead holder 282, on the docking plate 280.

Figure 13:
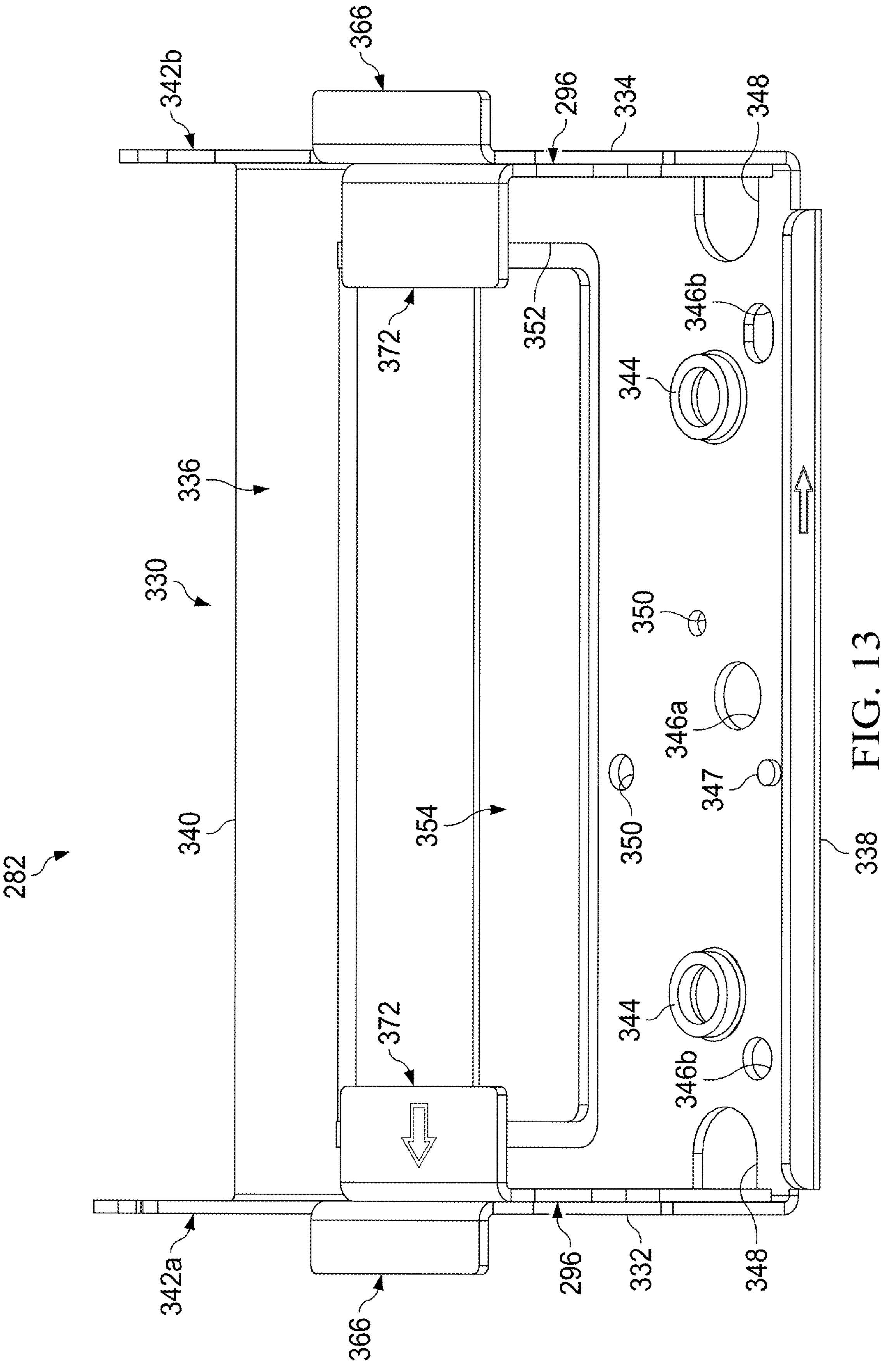
FIG. 13 illustrates a front and top isometric view of a printhead holder of the printhead module of FIG. 10.

Turning to FIG. 13, the printhead holder 282 may be provided in the form of a substantially rectilinear printhead holder body 330 defined by a printhead holder first side 332 and a printhead holder second side 334 opposing the printhead holder first side 332. The printhead holder 282 may include a base plate 336 extending between the printhead holder first side 332 and the printhead holder second side 334. The base plate 336 may be defined by a printhead holder front edge 338 and a printhead holder rear edge 340 opposing the printhead holder front edge 338. Printhead holder sidewalls 342 may be connected to the base plate 336 at the printhead holder first side 332 and the printhead holder second side 334 and extend upwardly therefrom. In some instances, the printhead holder sidewalls 342 may be provided in slightly different forms (see FIG. 14). For example, a first printhead holder sidewall 342*a* may be connected to the base plate 336 at the printhead holder first side 332 and a second printhead holder sidewall 342*b* may be connected to the base plate 336 at the printhead holder second side 334.

The printhead holder 282 may include one or more spring base members 344 positioned on the base plate 336 proximate to the printhead holder front edge 338. The spring base members 344 may be provided in the form of substantially annular protrusions positioned on the base plate 336 and extending upwardly therefrom. In some instances, the printhead holder 282 may include two spring base members 344 positioned proximate to the printhead holder first side 332 and the printhead holder second side 334. One or more printhead holder connection holes 346 may be provided in the form of substantially circular openings extending entirely through the base plate 336 and arranged to facilitate coupling between the printhead holder 282 and the docking plate 280. In some instances, the printhead holder 282 may include a first printhead holder connection hole 346*a* arranged to receive the first dock pin member 310*a* and two second printhead holder connection holes 346*b* arranged to receive the second dock pin members 310*b*. In some instances, a printhead holder peg 347 may be positioned proximate to the first printhead holder connection hole 346*a*.

Additionally, the printhead holder 282 may include one or more printhead holder fastener holes 348 configured to facilitate coupling between the printhead 138, the docking plate 280, and/or the printhead holder 282. For example, the printhead holder 282 may include two printhead holder fastener holes 348 provided in the form of rounded or arch shaped openings extending entirely through the base plate 336. The printhead holder fastener holes 348 may be configured to align with the printhead docking holes 312 of the docking plate 280 and one or more of the printhead connection holes 158 of the printhead 138. Thus, fasteners (see FIG. 16) may extend through the printhead holder fastener holes 348 and the printhead docking holes 312 and may be received by one or more of the printhead connection holes 158 (e.g., via engagement between a threaded exterior surface of the fastener and a threaded interior surface of the printhead connection holes 158).

The printhead holder 282 may include one or more printhead holder sockets 350 provided in the form of substantially circular openings extending entirely through the base plate 336. In some instances, a vent 352 may be provided in the form of a substantially rectangular opening extending entirely through the base plate 336. The printhead holder 282 may include a tray member 354 positioned within the vent 352. For example, the tray member 354 may be coupled to the base plate 336 along an edge of the vent 352 proximate to the printhead holder rear edge 340 and extend downwardly therefrom. In some instances, the vent 352 may reduce the overall weight or cost of producing the printhead assembly 200, and the tray member 354 may be configured to guide or support printable media 128 and/or ribbon material 134 passing beneath the printhead 138 while the printhead assembly 200 is in use.

Figure 14:
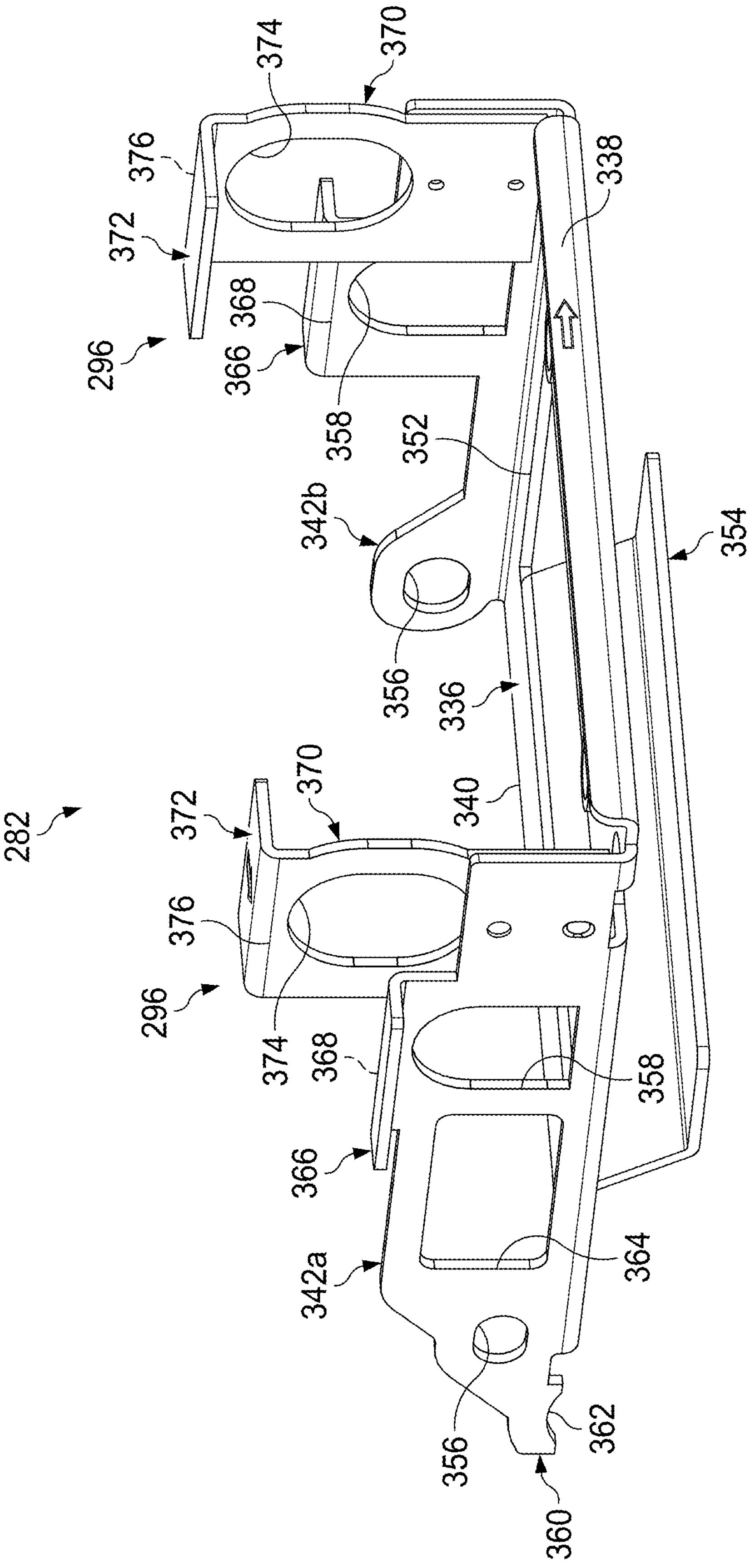
FIG. 14 illustrates a front and left side isometric view of the printhead holder of FIG. 13.

As best shown in FIG. 14, each of the printhead holder sidewalls 342*a*, 342*b* may include a first linking shaft opening 356 and a lever shaft opening 358. The first linking shaft opening 356 and lever shaft opening 358 of the first printhead holder sidewall 342*a* may be arranged to align with the first linking shaft opening 356 and lever shaft opening 358 of the second printhead holder sidewall 342*b*, respectively. In some instances, one of the printhead holder sidewalls 342 (e.g., the first printhead holder sidewall 342*a*) may further include a first orienting member 360 having a curved orienting surface 362 configured to be received by or engage another portion of the printhead assembly 200 (see FIG. 36). The first orienting member 360 may be positioned proximate to the printhead holder rear edge 340 and extend outwardly therefrom. Additionally, one of the printhead holder sidewalls 342 (e.g., the first printhead holder sidewall 342*a*) may include a substantially rectangular carveout 364 positioned between the first linking shaft opening 356 and the lever shaft opening 358.

Both of the printhead holder sidewalls 342*a*, 342*b* may include a lever impact surface 366 connected to a sidewall upper edge 368. In some instances, the lever impact surfaces 366 may be provided in the form of substantially rectilinear protrusions connected to the sidewall upper edge 368 and extending outwardly therefrom (e.g., the lever impact surface 366 of the first printhead holder sidewall 342*a* may extend away from the second printhead holder sidewall 342*b*, and vice versa). The lever impact surfaces 366 may be positioned above or adjacent to the lever shaft openings 358.

The printhead holder 282 may include two flange members 296 positioned adjacent to and coplanar with each of the printhead holder sidewalls 342*a*, 342*b*. Each flange member 296 may include a flange wall 370 and a flange impact surface 372. The flange wall 370 may include a cam shaft opening 374 provided in the form of a substantially circular, ovoid, or rounded opening extending entirely through the flange wall 370. The cam shaft opening 374 may be any size or shape suitable for the cam shaft 290 to pass through. In some instances, the cam shaft opening 374 may have a size suitable for the cam shaft 290 to move substantially vertically (e.g., up and down) as the force cam 288 and/or the one or more lift cams 294 rotate about an axis A of the cam shaft 290 (see FIG. 10). The flange impact surface 372 may be positioned above or adjacent to the cam shaft opening 374 such that the flange impact surface 372 is positioned for engagement with one of the lift cams 294 as the lift cams 294 rotate about the axis A (see FIG. 10). In some instances, the flange impact surface 372 may be connected to the flange wall 370 at a flange upper edge 376 and extend inwardly therefrom (e.g., the flange impact surface 372 of the flange member 296 adjacent to the first printhead holder sidewall 342*a* may extend toward the second printhead holder sidewall 342*b*, and vice versa). The flange wall 370 may be substantially parallel to or coplanar with the associated printhead holder sidewall 342, and the flange impact surface 372 may be oriented substantially perpendicularly with respect to the flange wall 370.

Figure 15:
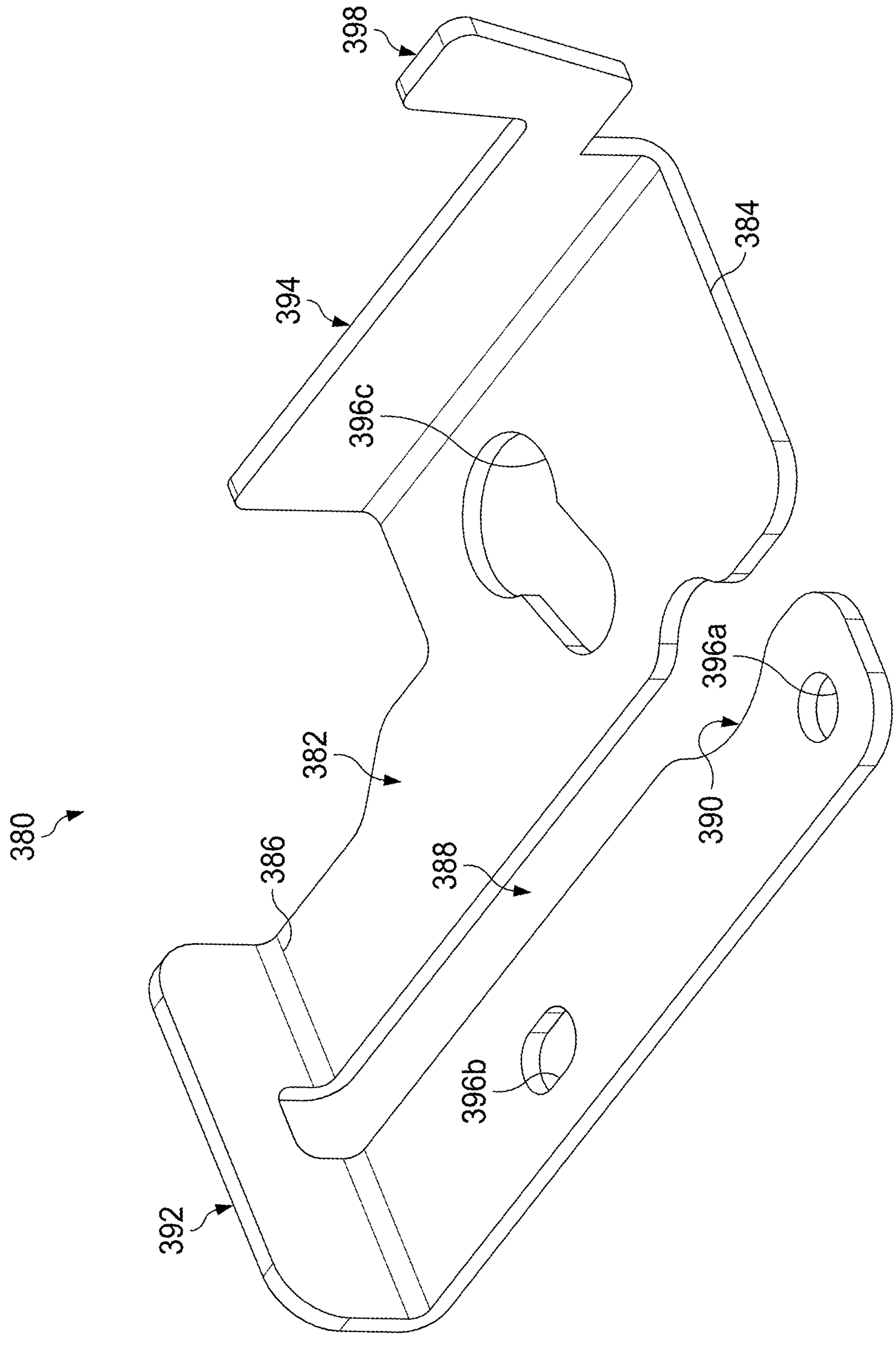
FIG. 15 illustrates a front, top, and left side isometric view of a connection plate of the printhead module of FIG. 10.

Turning to FIG. 15, a connection plate 380 may be provided in the form of a substantially planar connection plate body 382 defined by a connection plate first end 384 and a connection plate second end 386 opposing the connection plate first end 384. A substantially linear channel 388 including a rounded receiving region 390 may extend between the connection plate first end 384 and the connection plate second end 386. The connection plate 380 may include a first lip member 392 positioned at the connection plate second end 386 and a second lip member 394 positioned proximate to the connection plate first end 384 and extending partially toward the connection plate second end 386. The first and second lip members 392, 394 may be either formed integrally with or coupled to the connection plate body 382 and extend upwardly therefrom. For example, the first and second lip members 392, 394 may each be substantially perpendicular with respect to the connection plate body 382. Additionally, the first and second lip members 392, 394 may be substantially perpendicular with respect to one another. The first and second lip members 392, 394 may facilitate the coupling of the connection plate 380 with the printhead holder 282 and/or may provide additional structural support to the printhead holder 282. In some instances, the first lip member 392 may also prevent or reduce movement of the connection plate 380 with respect to the printhead holder 282 once coupled thereto.

One or more connection plate holes 396 may be provided in the form of openings extending entirely through the connection plate body 382. For example, the connection plate 380 may include a first connection plate hole 396*a* and a second connection plate hole 396*b* provided in the form of substantially circular openings positioned proximate to the channel 388. The connection plate 380 may also include a third connection plate hole 396*c* provided in the form of an irregular or key-shaped opening positioned between the channel 388 and the second lip member 394. In some instances, the connection plate 380 may include a post 398 connected to the second lip member 394 proximate to the connection plate first end 384 and extending upwardly and/or outwardly therefrom.

Figure 16:
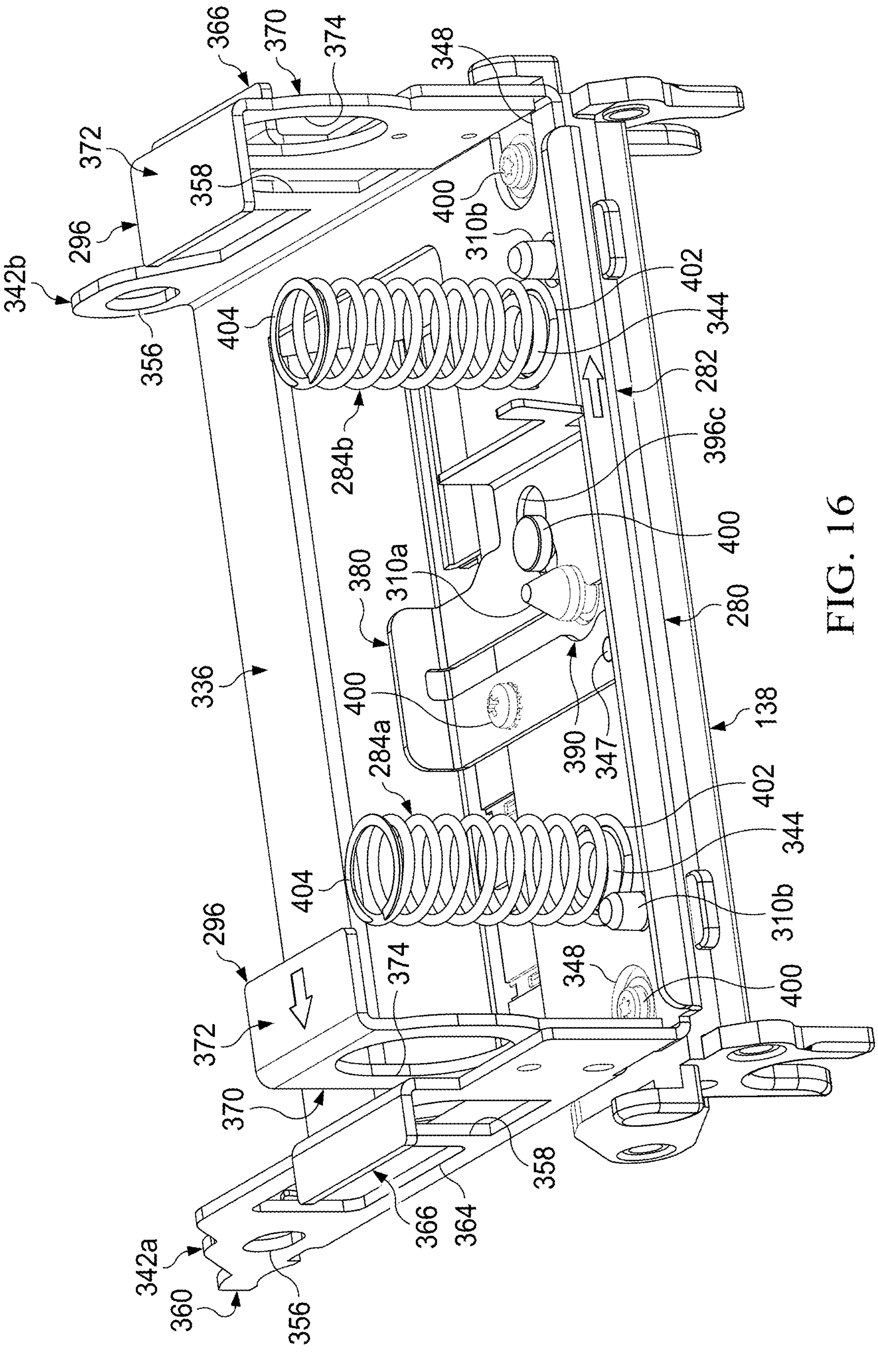
FIG. 16 illustrates a front, top, and left side isometric view of a partial assembly of the printhead module of FIG. 10 including the printhead of FIG. 4, the docking plate of FIG. 11, the printhead holder of FIG. 13, the connection plate of FIG. 15, and springs.

Turning now to FIG. 16, the printhead 138, docking plate 280, printhead holder 282, and connection plate 380 may be coupled to one another to form a partial assembly of the printhead module 202. In some instances, the printhead 138, docking plate 280, printhead holder 282, and docking plate 280 may be configured to move as a single unit when the printhead assembly 200 is in use. For example, the printhead 138 may be positioned adjacent to the docking plate 280 such that the printhead attachment surface 152 (see FIG. 4) abuts the lower docking plate surface 306 (see FIG. 12) and two printhead connection holes 158 align with the printhead docking holes 312 of the docking plate 280. The printhead holder 282 may be positioned on the docking plate 280 such that the dock pin members 310 are received by the printhead holder connection holes 346 (see FIG. 13). For example, the first printhead holder connection hole 346*a* may receive the first dock pin member 310*a* and the second printhead holder connection holes 346*b* may receive the second dock pin members 310*b*. Thus, fasteners 400 may extend through the printhead holder fastener holes 348 and the printhead docking holes 312 of the docking plate 280 and be received by the adjacent printhead connection holes 158. In this way, the fasteners 400 and the dock pin members 310 may facilitate coupling between the printhead 138, docking plate 280, and printhead holder 282.

The connection plate 380 may be positioned on or adjacent to the printhead holder 282 such that the first dock pin member 310*a* extends through the receiving region 390. The first connection plate hole 396*a* (see FIG. 15) may align with and receive the printhead holder peg 347 (e.g., in a press fit). The second connection plate hole 396*b* may align with one of the printhead holder sockets 350 (see FIG. 13) such that a fastener 400 may extend through the second connection plate hole 396*b* and be received by the printhead holder socket 350. The third connection plate hole 396*c* may align with the other of the printhead holder sockets 350 such that a fastener 400 may extend through the third connection plate hole 396*c* and be received by the printhead holder socket 350. Thus, the fasteners 400 may couple the connection plate 380 to the printhead holder 282 or restrict the movement of the connection plate 380 with respect to the printhead holder 282. The fasteners 400 may be provided in the form of a screw, pin, or any other suitable fastener configured to facilitate coupling between two parts via a press fit, interference fit, threaded engagement, or any other method known in the art.

The springs 284 may be positioned on the printhead holder 282 (e.g., in a decompressed state) such that they are available to be compressed by the push plate 286 when the printhead module 202 is fully assembled. For example, the first spring 284*a* and the second spring 284*b* may each have a first spring end 402 and a second spring end 404 opposing the first spring end 402. The first spring end 402 may be supported or received by the spring base members 344 of the printhead holder 282, leaving the second spring end 404 available for engagement with the push plate 286 (see FIG. 19).

Figure 17:
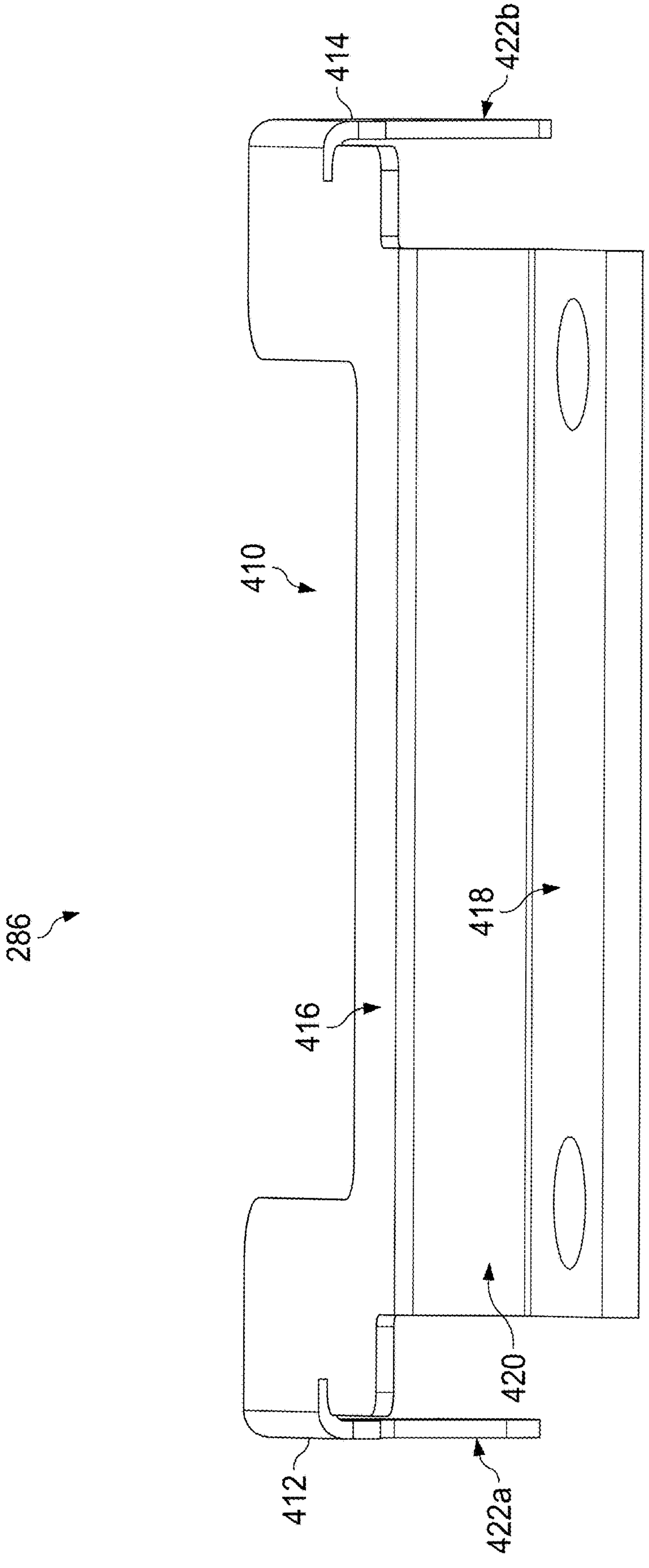
FIG. 17 illustrates a front and top isometric view of a push plate of the printhead module of FIG. 10.

Turning to FIG. 17, the push plate 286 may be provided in the form of a substantially rectilinear push plate body 410 defined by a push plate first side 412 and a push plate second side 414 opposing the push plate first side 412. The push plate body 410 may include an upper shelf 416 and a lower shelf 418. The upper shelf 416 may be vertically offset with respect to (e.g., positioned higher than) the lower shelf 418, and each of the upper shelf 416 and the lower shelf 418 may extend between the push plate first side 412 and the push plate second side 414. A slanted panel 420 may extend between and connect the upper shelf 416 and the lower shelf 418. For example, the upper shelf 416 and lower shelf 418 may be substantially parallel, and the slanted panel 420 may be oriented at an angle with respect to both the upper shelf 416 and the lower shelf 418. The push plate 286 may include two push plate sidewalls 422 connected to the upper shelf 416 and extending downwardly therefrom. For example, a first push plate sidewall 422*a* may be connected to the upper shelf 416 at the push plate first side 412, and a second push plate sidewall 422*b* may be connected to the upper shelf 416 at the push plate second side 414. The push plate sidewalls 422 may be formed integrally with the upper shelf 416 or may be connected thereto.

Figure 18:
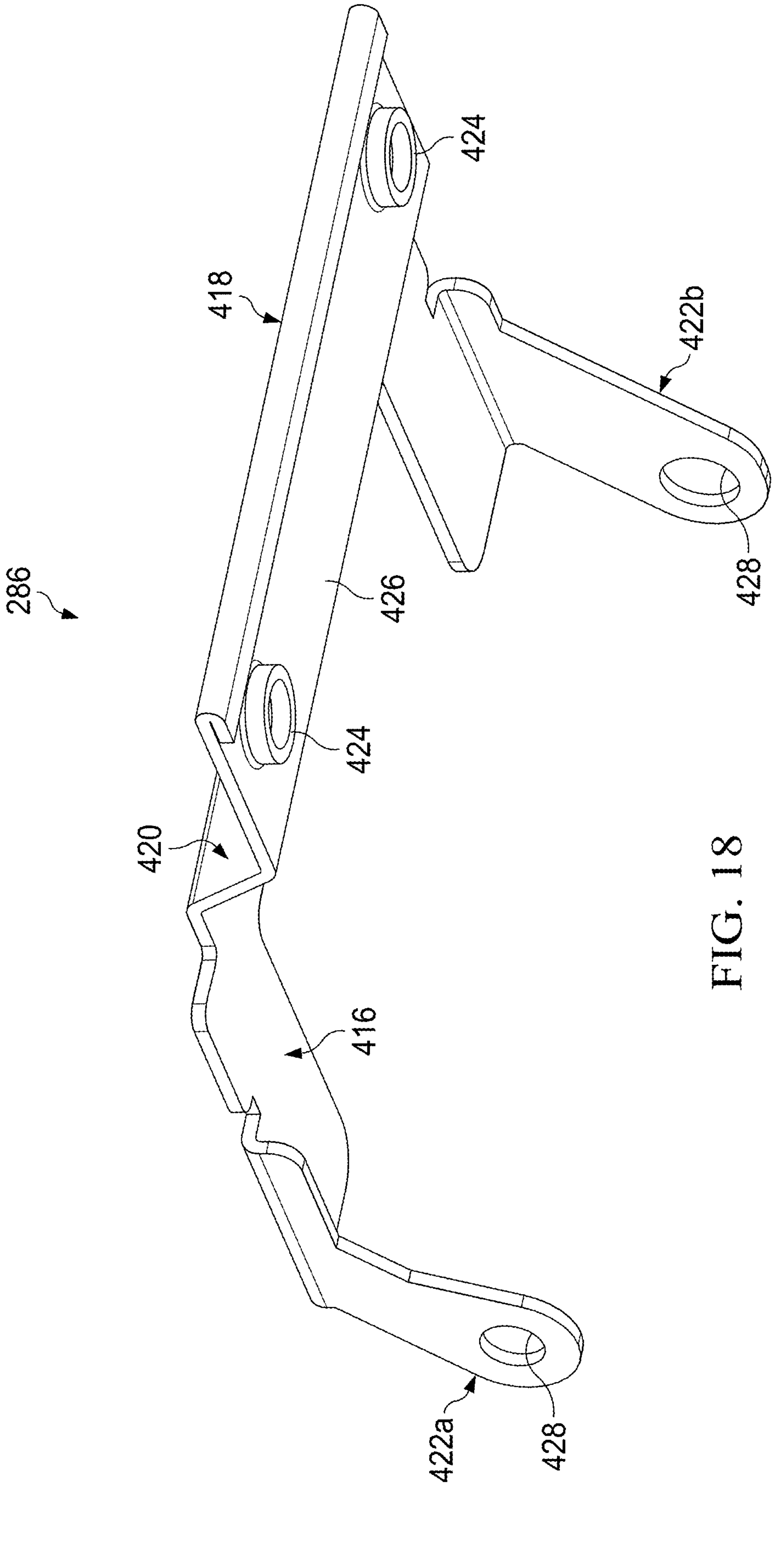
FIG. 18 illustrates a front, bottom, and left side isometric view of the push plate of FIG. 17.

As best shown in FIG. 18, one or more upper spring support members 424 may be connected to an underside 426 of the lower shelf 418 and extend downwardly therefrom. For example, the push plate 286 may include two upper spring support members 424 positioned to align with the spring base members 344 of the printhead holder 282 and receive the second spring end 404 of the springs 284*a*, 284*b* (see FIG. 16). Each of the push plate sidewalls 422*a*, 422*b* may include a second linking shaft opening 428 provided in the form of a substantially circular opening extending entirely through the push plate sidewalls 422*a*, 422*b*. For example, the second linking shaft openings 428 of the push plate sidewalls 422*a*, 422*b* may be positioned to align with the first linking shaft openings 356 of the printhead holder sidewalls 342*a*, 342*b*, respectively.

Figure 19:
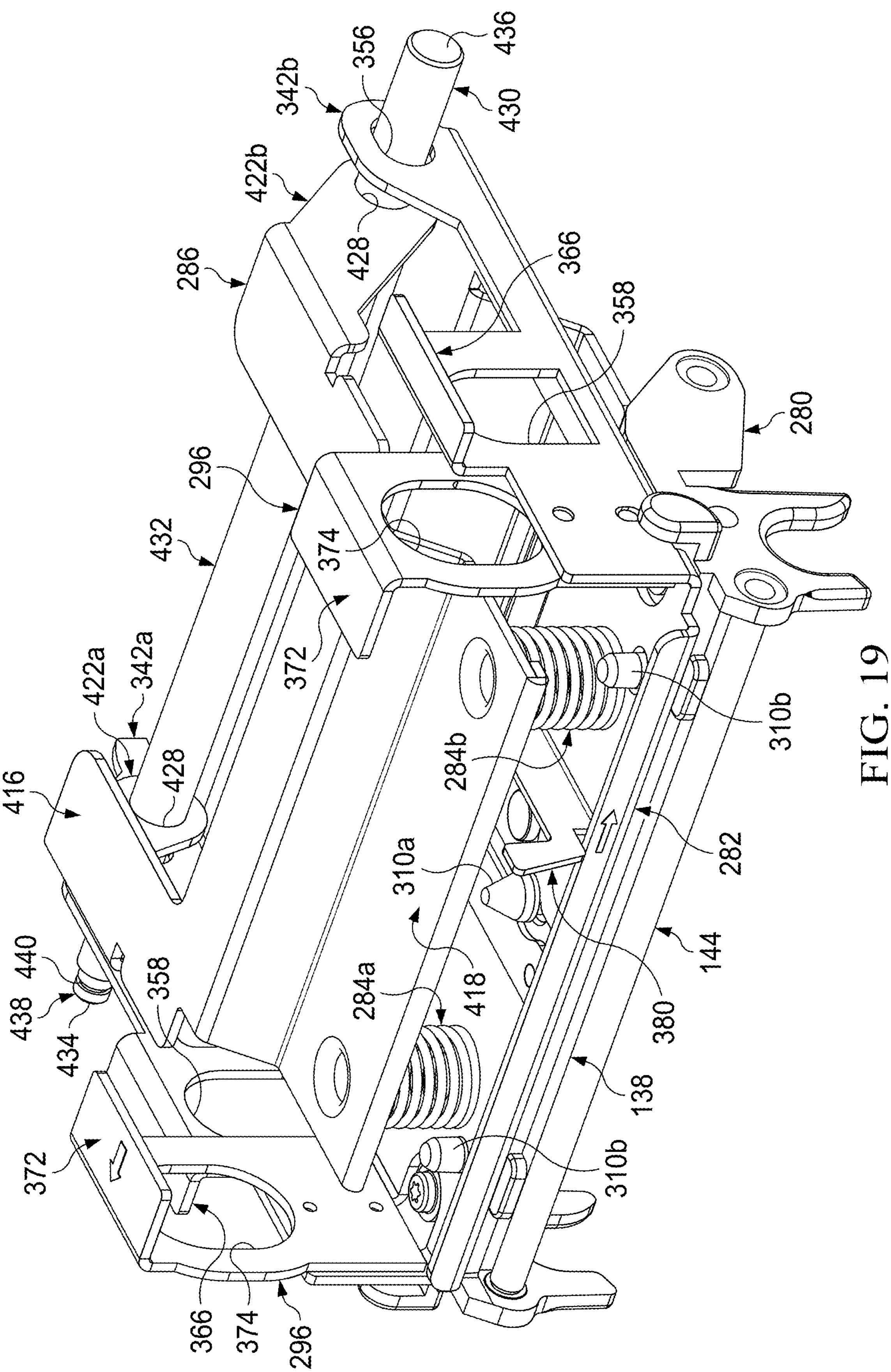
FIG. 19 illustrates a front, top, and right side isometric view of the partial assembly of FIG. 16 with the push plate of FIG. 17 and a linking shaft.

Turning to FIG. 19, the push plate 286 may be positioned proximate to (e.g., above) the printhead holder 282 such that the second linking shaft openings 428 of the push plate 286 align with the first linking shaft openings 356 of the printhead holder 282. Thus, a linking shaft 430 may extend through the first printhead holder sidewall 342*a*, the first push plate sidewall 422*a*, the second push plate sidewall 422*b*, and the second printhead holder sidewall 342*b* via the first and second linking shaft openings 356, 428. The linking shaft 430 may be provided in the form of a substantially cylindrical linking shaft body 432 defined by a linking shaft first end 434 and a linking shaft second end 436 opposing the linking shaft first end 434. In some instances, the linking shaft first end 434 may be positioned proximate to (e.g., outside of) the first printhead holder sidewall 342*a* and the first push plate sidewall 422*a*, and the linking shaft second end may be positioned proximate to (e.g., outside of) the second printhead holder sidewall 342*b* and the second push plate sidewall 422*b*. In some instances, the linking shaft 430 may include a notched segment 438 with a substantially circular groove 440 at the linking shaft first end 434.

In some instances, the linking shaft 430 may facilitate coupling and/or maintain alignment between the printhead holder 282 and the push plate 286. The push plate 286 may be positioned such that the second spring ends 404 of the springs 284 (see FIG. 16) are received by the upper spring support members 424 positioned on the lower shelf 418 and extending downwardly therefrom. Thus, the springs 284 may be interposed between the push plate 286 and the printhead holder 282 and a pressure applied by the push plate 286 may compress the springs 284. In some instances, the push plate 286 may be held in place with respect to the printhead holder 282 such that the elastic potential energy stored in the compressed springs 284 may apply an upward force against the push plate 286 and a downward force against the printhead holder 282. In this way, the springs 284 may cause the printhead 138 to apply a nip force to the platen roller 140.

Figure 20:
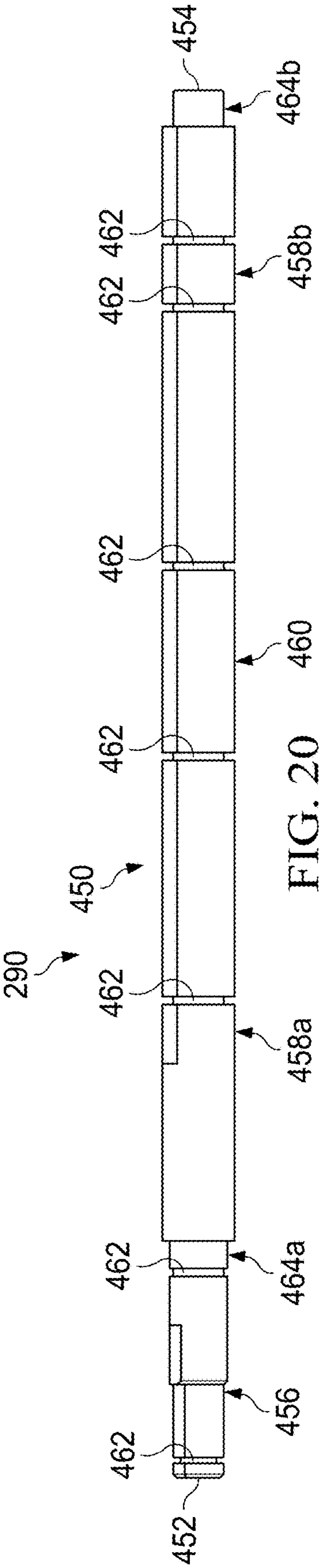
FIG. 20 illustrates a front elevational view of a cam shaft of the printhead module of FIG. 10.

Turning to FIG. 20, the cam shaft 290 may be provided in the form of a substantially cylindrical or linear cam shaft body 450 defined by a cam shaft first end 452 and a cam shaft second end 454 opposing the cam shaft first end 452. A gear region 456 adjacent to the cam shaft first end 452 may be configured to receive the cam adjustment gear 292 and support the cam adjustment gear 292 for rotation with the cam shaft 290. Two lift cam regions 458 may be configured to receive the lift cams 294 and support the lift cams 294 for rotation with the cam shaft 290. For example, a first lift cam region 458*a* arranged to receive the first lift cam 294*a* may be positioned adjacent to the gear region 456, and a second lift cam region 458*b* arranged to receive the second lift cam 294*b* may be positioned proximate to the cam shaft second end 454. In some instances, the first and second lift cam regions 458*a*, 458*b* may be positioned to align with the flange impact surfaces 372 of the printhead holder 282 (see FIG. 10) when the printhead module 202 is fully assembled.

A force cam region 460 positioned between the lift cam regions 458 may be configured to receive the force cam 288 and support the force cam 288 for rotation with the cam shaft 290. The cam shaft 290 may include one or more washer grooves 462 arranged on or adjacent to the gear region 456, lift cam regions 458, and/or force cam region 460. For example, the washer grooves 462 may be configured to receive a washer or other mechanical part designed to prevent unintentional tracking or movement of the cam adjustment gear 292, lift cams 294, and/or force cam 288 with respect to the cam shaft 290.

The cam shaft 290 may include one or more insert regions 464 configured to facilitate rotation of the cam shaft 290 when the printhead module 202 is fully assembled. For example, a first insert region 464*a* may be positioned proximate to the cam shaft first end 452 (e.g., between the gear region 456 and the lift cam region 458 proximate to the gear region 456), and a second insert region 464*b* may be positioned at the cam shaft second end 454. In some instances, each of the insert regions 464*a*, 464*b* may be configured to receive and support a bearing (see FIG. 22) that facilitates rotation of the cam shaft 290 when the printhead module 202 is fully assembled.

Figure 21:
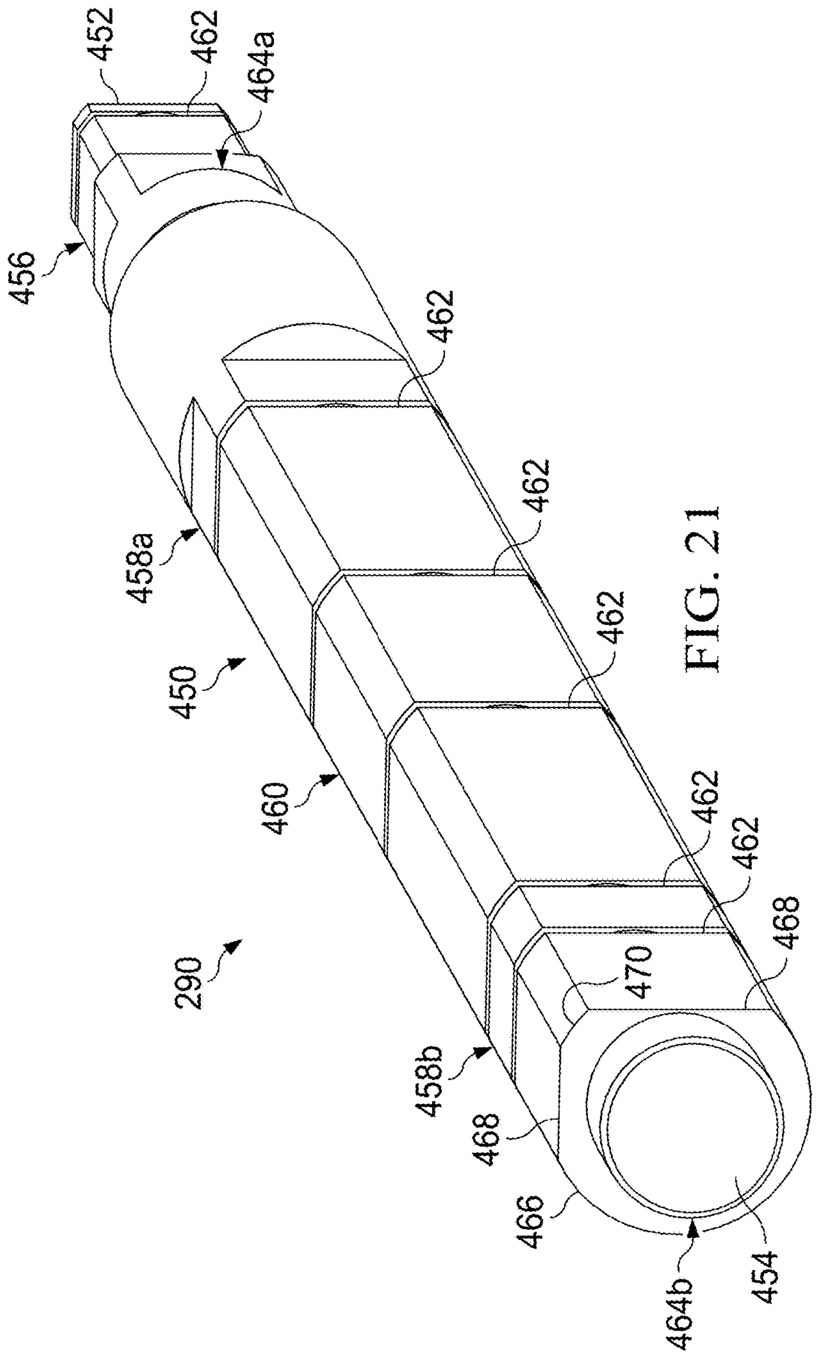
FIG. 21 illustrates a top and right side isometric view of the cam shaft of FIG. 20.

As best shown in FIG. 21, at least a portion of the cam shaft body 450 may be provided in the form of a partial cylinder. For example, in some instances, the gear region 456, first lift cam region 458*a*, second lift cam region 458*b*, and force cam region 460 may each include a semicircular edge 466, two substantially planar edges 468 connected to opposing ends of the semicircular edge 466, and a beveled edge 470 positioned at a juncture between the planar edges 468. In other instances, the gear region 456, lift cam regions 458*a*, 458*b*, and force cam region 460 may be provided in any suitable form provided that the gear region 456, lift cam regions 458*a*, 458*b*, and force cam region 460 are configured to inhibit rotation of the cam adjustment gear 292, lift cams 294, and force cam 288, respectively, with respect to the cam shaft 290. The insert regions 464*a*, 464*b* may be provided in the form of substantially cylindrical segments positioned along the cam shaft body 450 as described above with reference to FIG. 20.

Figure 22:
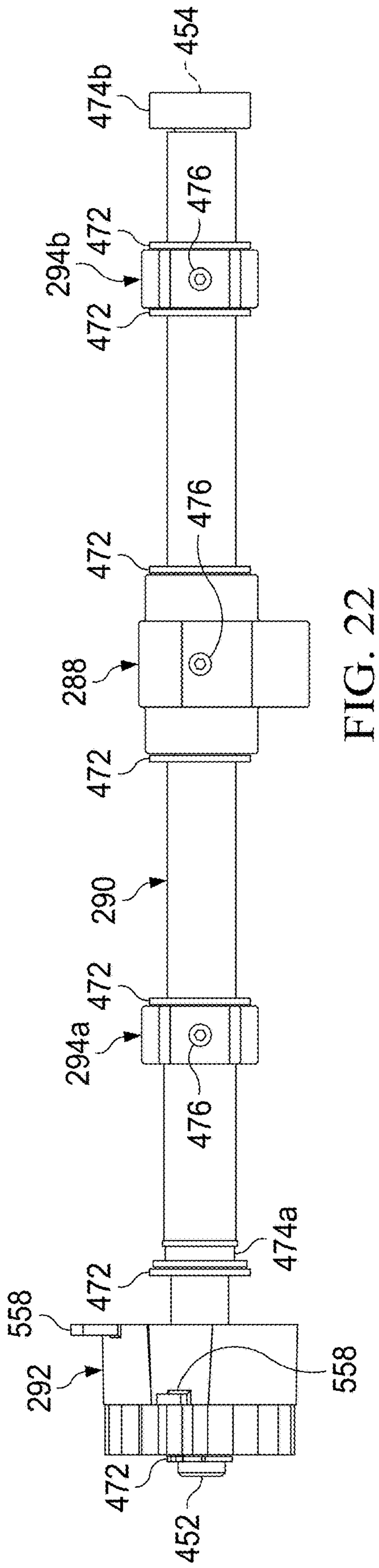
FIG. 22 illustrates the cam shaft of FIG. 20 with a cam adjustment gear, lift cams, and a force cam positioned thereon.

Turning to FIG. 22, the cam shaft 290 is depicted with the cam adjustment gear 292 positioned on the gear region 456, the first and second lift cams 294*a*, 294*b* positioned on the first and second lift cam regions 458*a*, 458*b*, respectively, and the force cam 288 positioned on the force cam region 460. In some instances, washers 472 may be installed on the washer grooves 462 (see FIG. 20) adjacent to the cam adjustment gear 292, the lift cams 294, and/or the force cam 288 to inhibit or eliminate unintentional tracking or movement along the cam shaft 290. One or more cam shaft bearings 474 may be positioned along the cam shaft 290 (e.g., to facilitate rotation of the cam shaft 290 when the printhead module 202 is fully assembled). For example, a first cam shaft bearing 474*a* may be positioned on the first insert region 464*a* and a second cam shaft bearing 474*b* may be positioned on the second insert region 464*b*.

Figure 23:
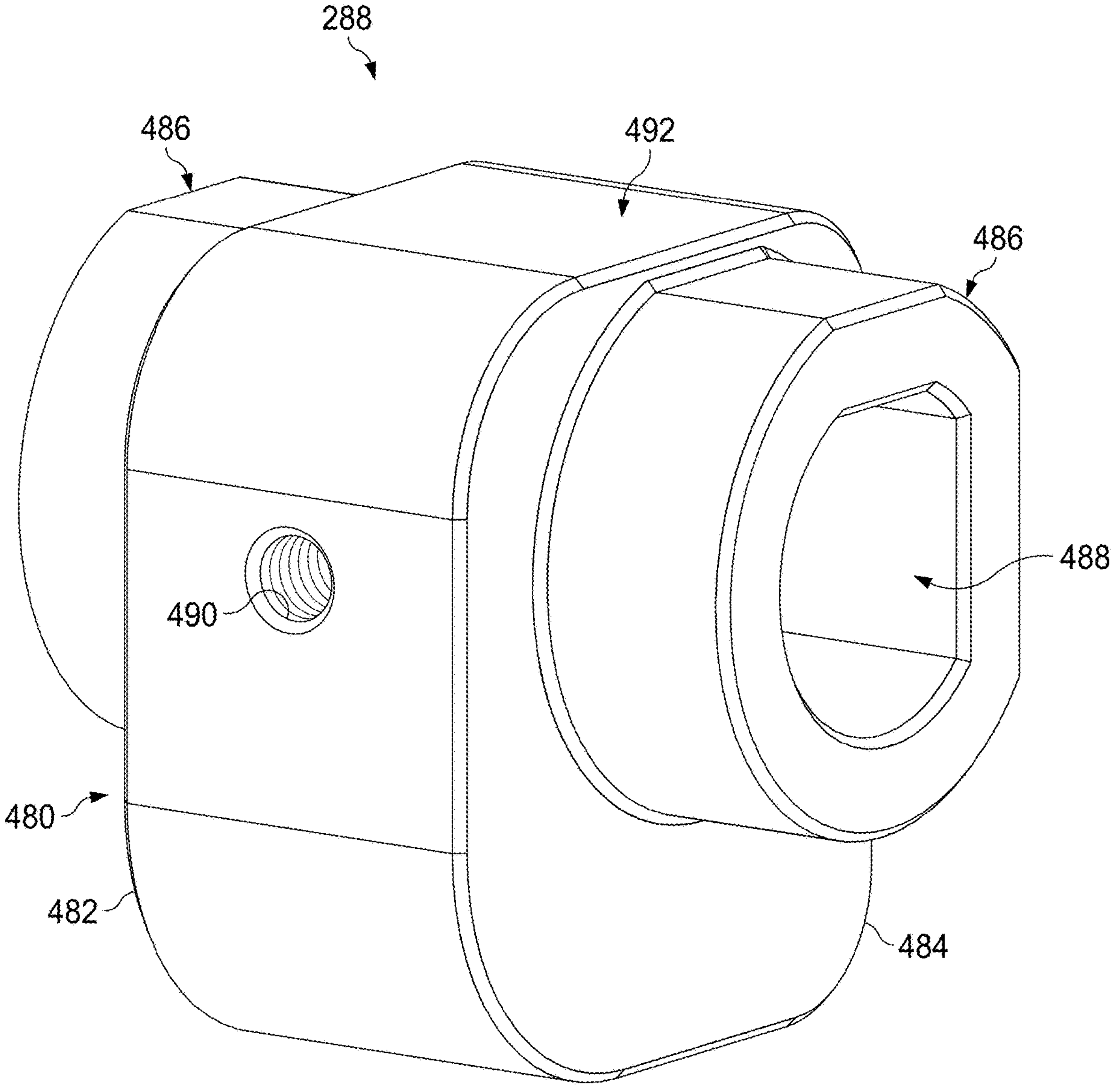
FIG. 23 illustrates a front, top, and right side isometric view of the force cam of FIG. 22.
Figure 29:
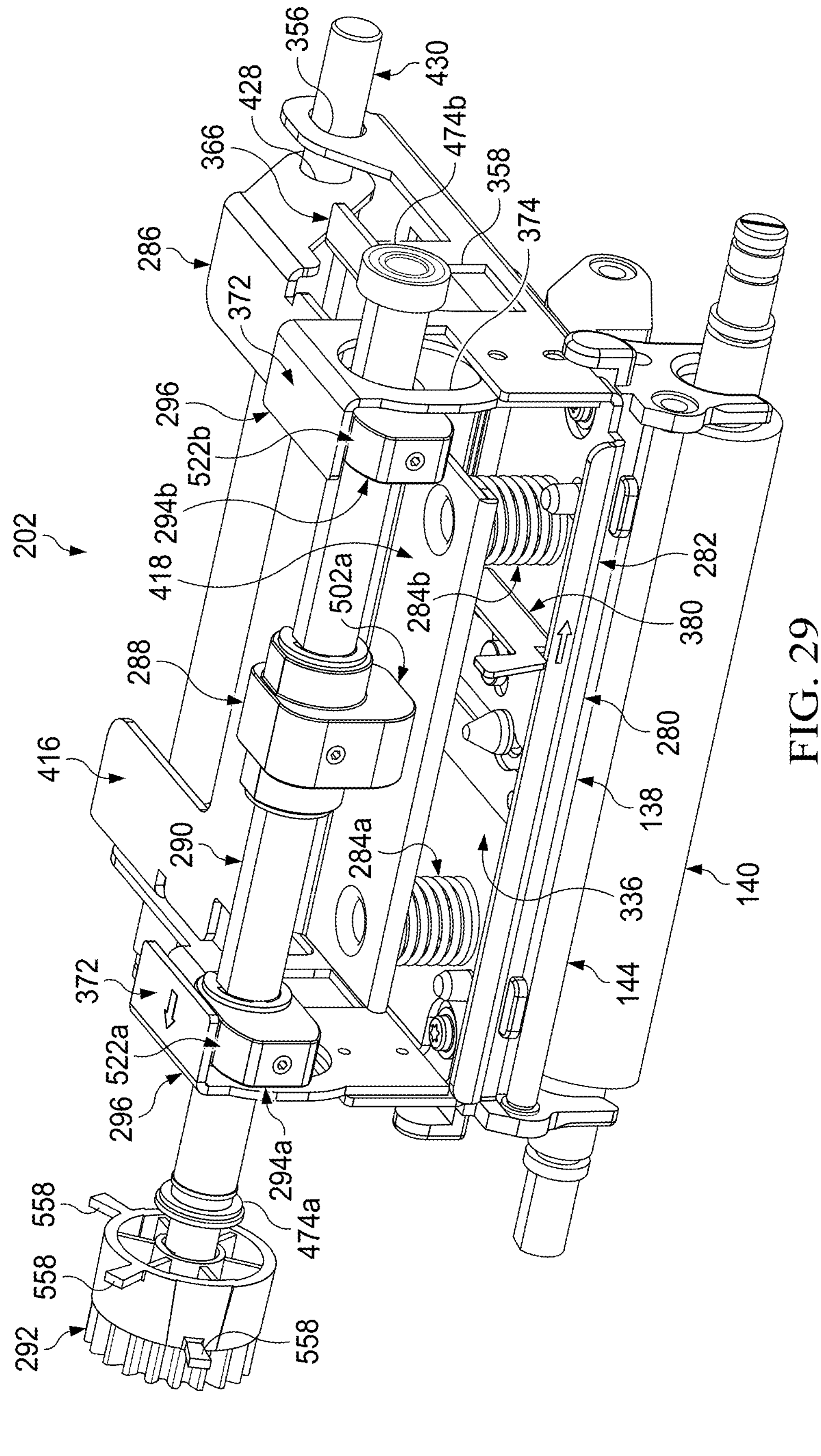
FIG. 29 illustrates a front, top, and right side isometric view of the printhead module of FIG. 10.

Turning now to FIG. 23, the force cam 288 may be configured to adjustably engage the push plate 286 (see FIG. 29). For example, the force cam 288 may be provided in the form of a substantially rectilinear force cam body 480 defined by a force cam first side 482 and a force cam second side 484 opposing the force cam first side 482. A substantially annular collar 486 may be connected to each of the force cam first side 482 and the force cam second side 484 and extend outwardly therefrom. The collars 486 may be arranged to be aligned with respect to the force cam body 480 such that a force cam opening 488 may extend entirely through the force cam body 480 and both collars 486. In some instances, a force cam connection hole 490 may be positioned on the force cam body 480 and extend entirely therethrough. For example, the force cam connection hole 490 may be provided in the form of a substantially circular opening extending entirely between a force cam exterior surface 492 and the force cam opening 488. In some instances, the force cam connection hole 490 may include a threaded interior surface and may be substantially perpendicular with respect to the force cam opening 488. Thus, a screw member 476 may extend through the force cam connection hole 490 (e.g., engaging a threaded inner surface of the force cam connection hole 490) and aid in securing the force cam 288 with respect to the cam shaft 290 (see FIG. 22). In other instances, the force cam connection hole 490 may be any suitable size and shape to receive a screw, pin, or other fastener known in the art.

Figure 24:
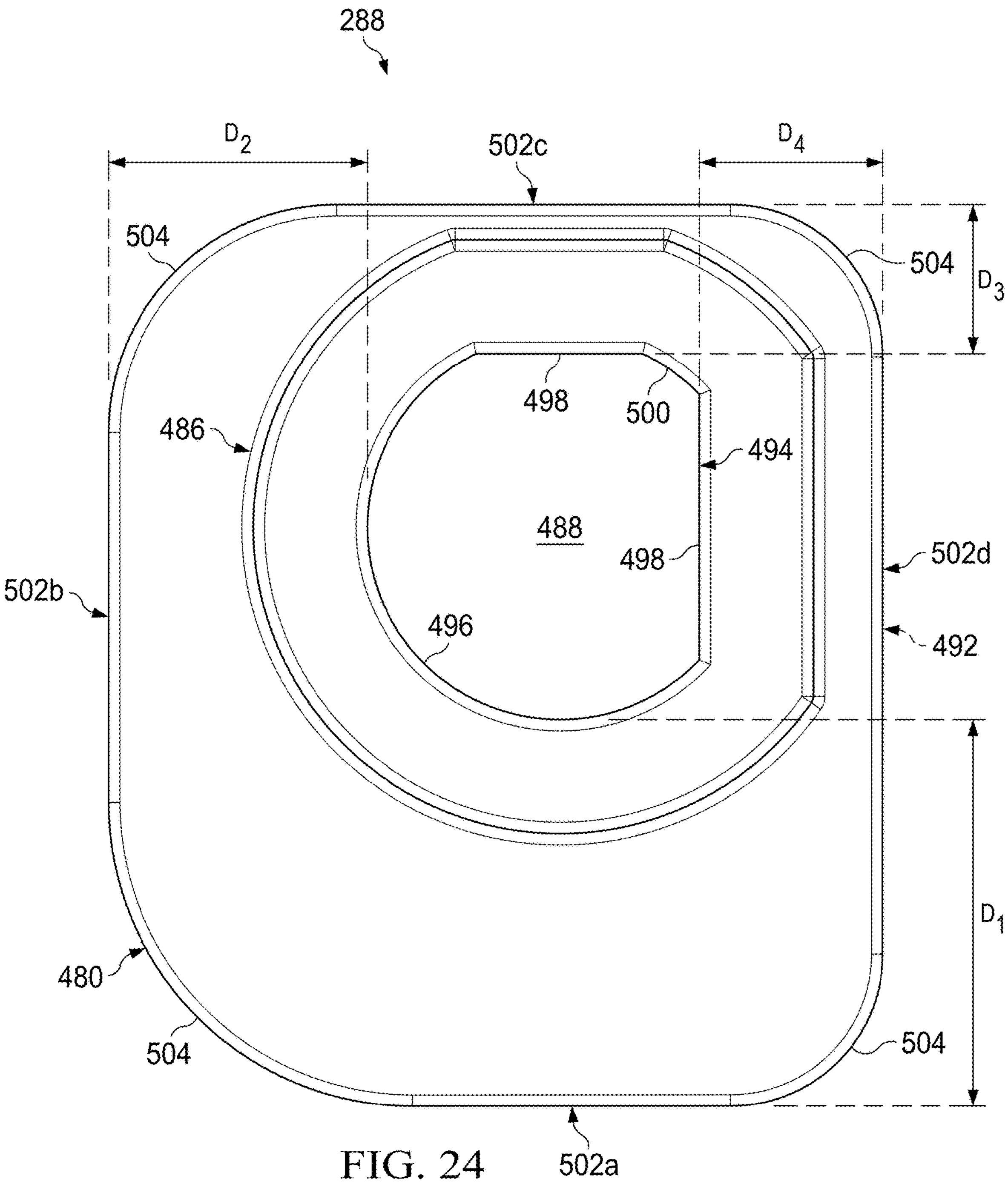
FIG. 24 illustrates a right side elevational view of the force cam of FIG. 22.

As best shown in FIG. 24, a force cam interior surface 494 may define the force cam opening 488 such that the geometry of the force cam opening 488 mirrors or complements the geometry of the cam shaft 290 at the force cam region 460 (see FIG. 21). For example, in some instances, the force cam interior surface 494 may include a force cam semicircular edge 496, two force cam planar edges 498 connected to opposing ends of the force cam semicircular edge 496, and a force cam beveled edge 500 positioned at a juncture between the force cam planar edges 498. Thus, the force cam planar edges 498 and the force cam beveled edge 500 may engage the planar edges 468 and beveled edge 470, respectively, of the cam shaft 290 when the force cam 288 is installed (e.g., when the force cam opening 488 receives the force cam region 460 of the cam shaft 290). In this way, the force cam 288 may be prevented or restricted from rotating with respect to the cam shaft 290 when the printhead assembly 200 is in use. In other words, the force cam 288 may be configured to rotate in unison with the cam shaft 290 when the printhead assembly 200 is in use.

In some instances, the force cam exterior surface 492 may be substantially rectangular and may include four force cam quadrants 502*a*, 502*b*, 502*c*, 502*d* provided in the form of substantially planar segments of the force cam exterior surface 492. Curved corner portions 504 provided in the form of rounded segments of the force cam exterior surface 492 may be positioned between each adjacent pair of the force cam quadrants 502*a*-502*d* (e.g., 502*a* and 502*b*; 502*b* and 502*c*; 502*c* and 502*d*; and/or 502*d* and 502*a*). The force cam quadrants 502*a*-502*d* may correspond to different settings or conditions of the printhead 138 or the printhead assembly 200.

For example, the force cam quadrants 502*a*-502*d* may be separated from the force cam opening 488 by varying distances. In some instances, the first force cam quadrant 502*a* may be separated from the nearest point along the force cam interior surface 494 by a first distance $D_1$, the second force cam quadrant 502*b* may be separated from the nearest point along the force cam interior surface 494 by a second distance $D_2$, the third force cam quadrant 502*c* may be separated from the nearest point along the force cam interior surface 494 by a third distance $D_3$, and the fourth force cam quadrant 502*d* may be separated from the nearest point along the force cam interior surface 494 by a fourth distance $D_4$. In some instances, the first distance $D_1$ may be greater than the second distance $D_2$, the third distance $D_3$, and the fourth distance $D_4$. The second distance $D_2$ may be greater than the third distance $D_3$ and the fourth distance $D_4$. The third distance $D_3$ may be greater than the fourth distance $D_4$, the third distance $D_3$ and the fourth distance $D_4$ may be substantially equal, or the fourth distance $D_4$ may be larger than the third distance $D_3$.

In some instances, the first, second, and third force cam quadrants 502*a*, 502*b*, 502*c* may be active quadrants of the force cam 288. For example, the first, second, and third force cam quadrants 502*a*, 502*b*, 502*c* may be arranged to alter the nip force applied by the printhead 138 by altering a force applied to the push plate 286 while the printhead 138 is in a lowered position with respect to the platen roller 140 (see FIG. 10). In some instances, the fourth force cam quadrant 502*d* may be an idle quadrant of the force cam 288 arranged to impact the push plate 286 when the printhead 138 is in the lifted position with respect to the platen roller 140. For example, the fourth force cam quadrant 502*d* may be arranged to contact the push plate 286 when the lift cams 294 are rotated into engagement with the flange members 296, thereby lifting the printhead 138 out of engagement with the platen roller 140 (see FIG. 10).

Figure 25:
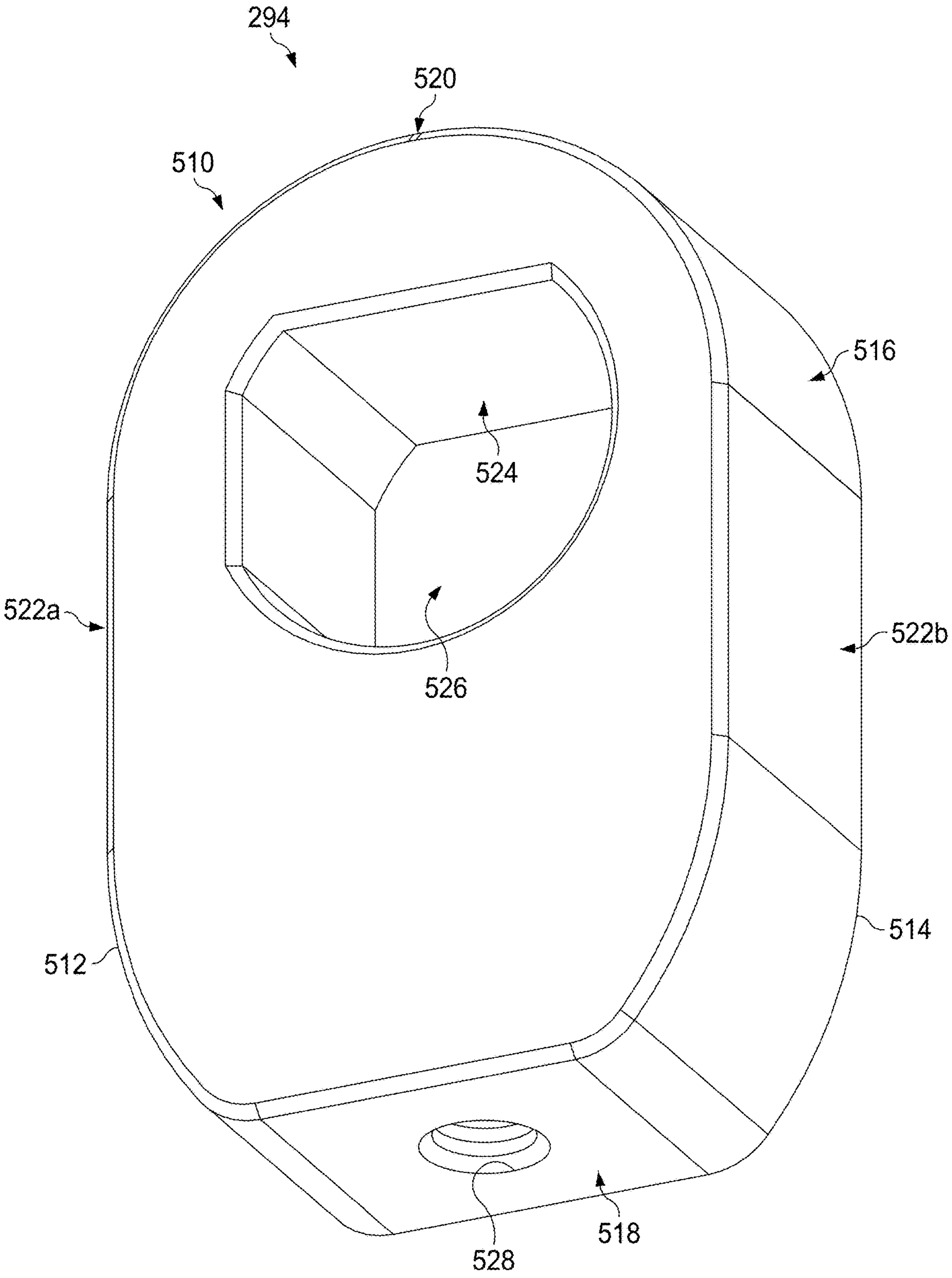
FIG. 25 illustrates a front, bottom, and left side isometric view of the lift cam of FIG. 22.

Turning to FIG. 25, the first lift cam 294*a* and the second lift cam 294*b* may each be provided in the form of a substantially rectangular or rounded lift cam body 510 defined by a lift cam first side 512 and a lift cam second side 514 opposing the lift cam first side 512. The lift cams 294 may include a lift cam exterior surface 516 extending around a perimeter of the lift cam body 510. The lift cam exterior surface 516 may include a substantially planar lift cam impact surface 518, a rounded lift cam apex 520, a first lift cam sidewall 522*a* extending between the lift cam impact surface 518 and the lift cam apex 520, and a second lift cam sidewall 522*b* opposing the first lift cam sidewall 522*a* and extending between the lift cam impact surface 518 and the lift cam apex 520. A lift cam interior surface 524 may define a lift cam opening 526 extending entirely through the lift cam body 510.

In some instances, a lift cam connection hole 528 may be positioned on the lift cam body 510 and extend entirely therethrough. For example, the lift cam connection hole 528 may be provided in the form of a substantially circular opening extending entirely between the lift cam impact surface 518 and the lift cam interior surface 524. In some instances, the lift cam connection hole 528 may include a threaded interior surface and may be substantially perpendicular with respect to the lift cam opening 526. Thus, a screw member 476 may extend through the lift cam connection hole 528 (e.g., engaging a threaded inner surface of the lift cam connection hole 528) and aid in securing the lift cam 294 with respect to the cam shaft 290 (see FIG. 22). In other instances, the lift cam connection hole 528 may be any suitable size or shape to receive a fastener such as a pin or other coupling mechanism known in the art.

Figure 26:
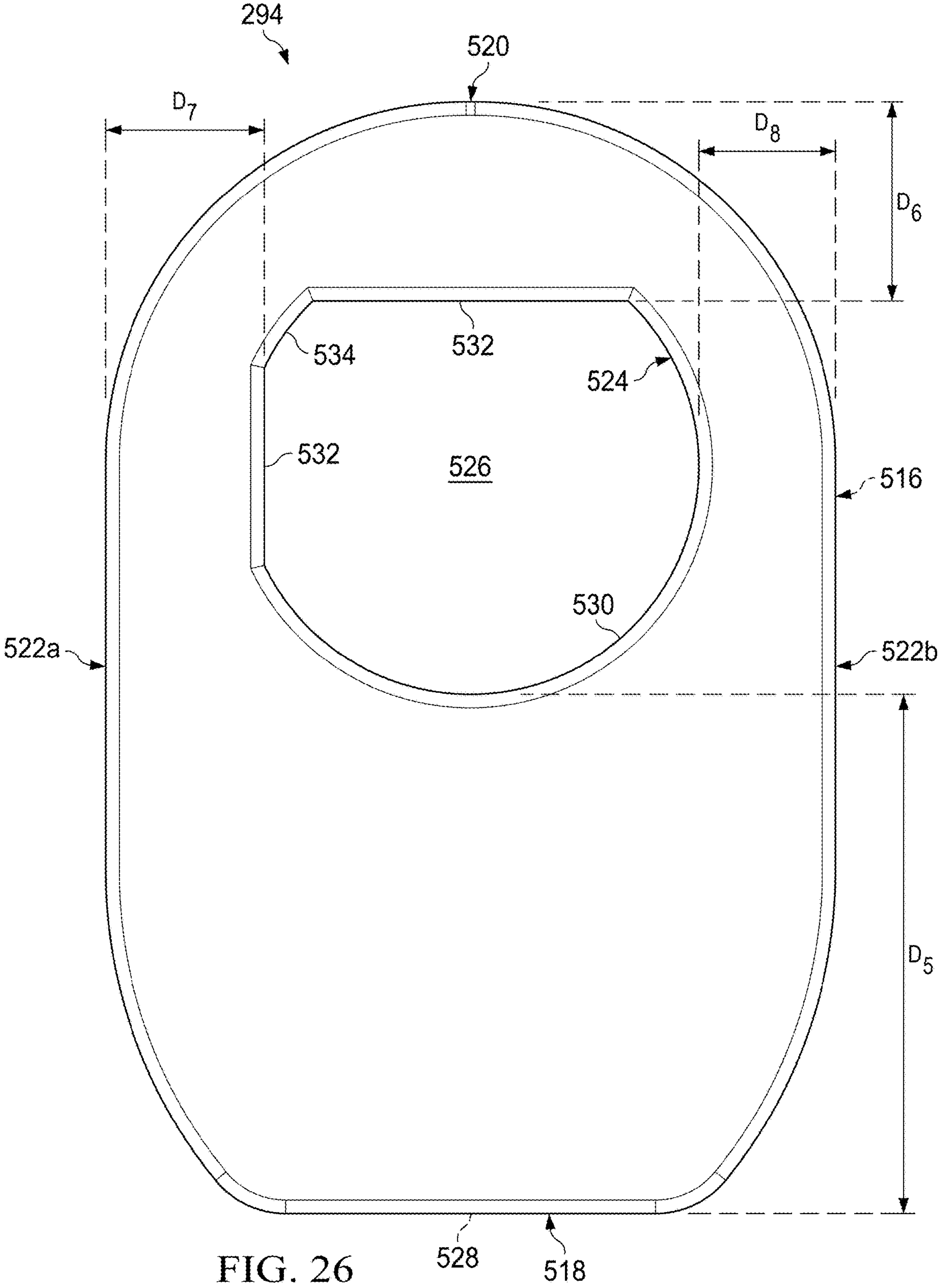
FIG. 26 illustrates a left side elevational view of the lift cam of FIG. 22.

As best shown in FIG. 26, the lift cam interior surface 524 may define the lift cam opening 526 such that the geometry of the lift cam opening 526 mirrors or complements the geometry of the cam shaft 290 at the lift cam regions 458 (see FIG. 21). For example, in some instances, the lift cam interior surface 524 may include a lift cam semicircular edge 530, two lift cam planar edges 532 connected to opposing ends of the lift cam semicircular edge 530, and a lift cam beveled edge 534 positioned at a juncture between the lift cam planar edges 532. Thus, the lift cam planar edges 532 and the lift cam beveled edge 534 may engage the planar edges 468 and beveled edge 470, respectively, of the cam shaft 290 when the lift cam 294 is installed (e.g., when the lift cam opening 526 receives the associated lift cam region 458 of the cam shaft 290). In this way, the lift cams 294 may be prevented or restricted from rotating with respect to the cam shaft 290 when the printhead assembly 200 is in use. In other words, the lift cams 294 may be configured to rotate in unison with the cam shaft 290 when the printhead assembly 200 is in use.

The lift cam impact surface 518, lift cam apex 520, and lift cam sidewalls 522 may be separated from the lift cam opening 526 by varying distances. For example, the lift cam impact surface 518 may be separated from the nearest point along the lift cam interior surface 524 by a fifth distance $D_5$, the lift cam apex 520 may be separated from the nearest point along the lift cam interior surface 524 by a sixth distance $D_6$, the first lift cam sidewall 522*a* may be separated from the nearest point along the lift cam interior surface 524 by a seventh distance $D_7$, and the second lift cam sidewall 522*b* may be separated from the nearest point along the lift cam interior surface 524 by an eighth distance $D_8$. In some instances, the fifth distance $D_5$ may be greater than the sixth distance $D_6$, the seventh distance $D_7$, and the eighth distance $D_8$. The sixth distance $D_6$, the seventh distance $D_7$, and the eighth distance $D_8$ may be substantially equal or may vary with respect to one another.

In some instances, the lift cam apex 520 and the lift cam sidewalls 522 may be idle portions of the lift cam exterior surface 516. For example, the lift cam apex 520 and the lift cam sidewalls 522 may be arranged to be positioned adjacent to, but not to engage, the associated flange member 296 when the active quadrants of the force cam 288 (e.g., the first, second, and third force cam quadrants 502*a*, 502*b*, 502*c*) engage the push plate 286 (see FIG. 10). The lift cam impact surface 518 may be an active portion of the lift cam exterior surface 516. For example, the lift cam impact surface 518 may be arranged to engage the associated flange member 296 (thereby lifting the printhead 138 away from the platen roller 140) when the idle quadrant of the force cam 288 (e.g., the fourth force cam quadrant 502*d*) engages the push plate 286 (see FIG. 10).

Thus, the lift cams 294 may not engage the flange members 296 while printing is in process so that the printhead 138 is maintained in the lowered position while the active force cam quadrants 502*a*-502*c* engage the push plate 286. During periods of non-use, the lift cams 294 may be rotated into engagement with the flange members 296 to place the printhead 138 in the lifted condition while the idle force cam quadrant 502*d* engages the push plate 286.

Figure 27:
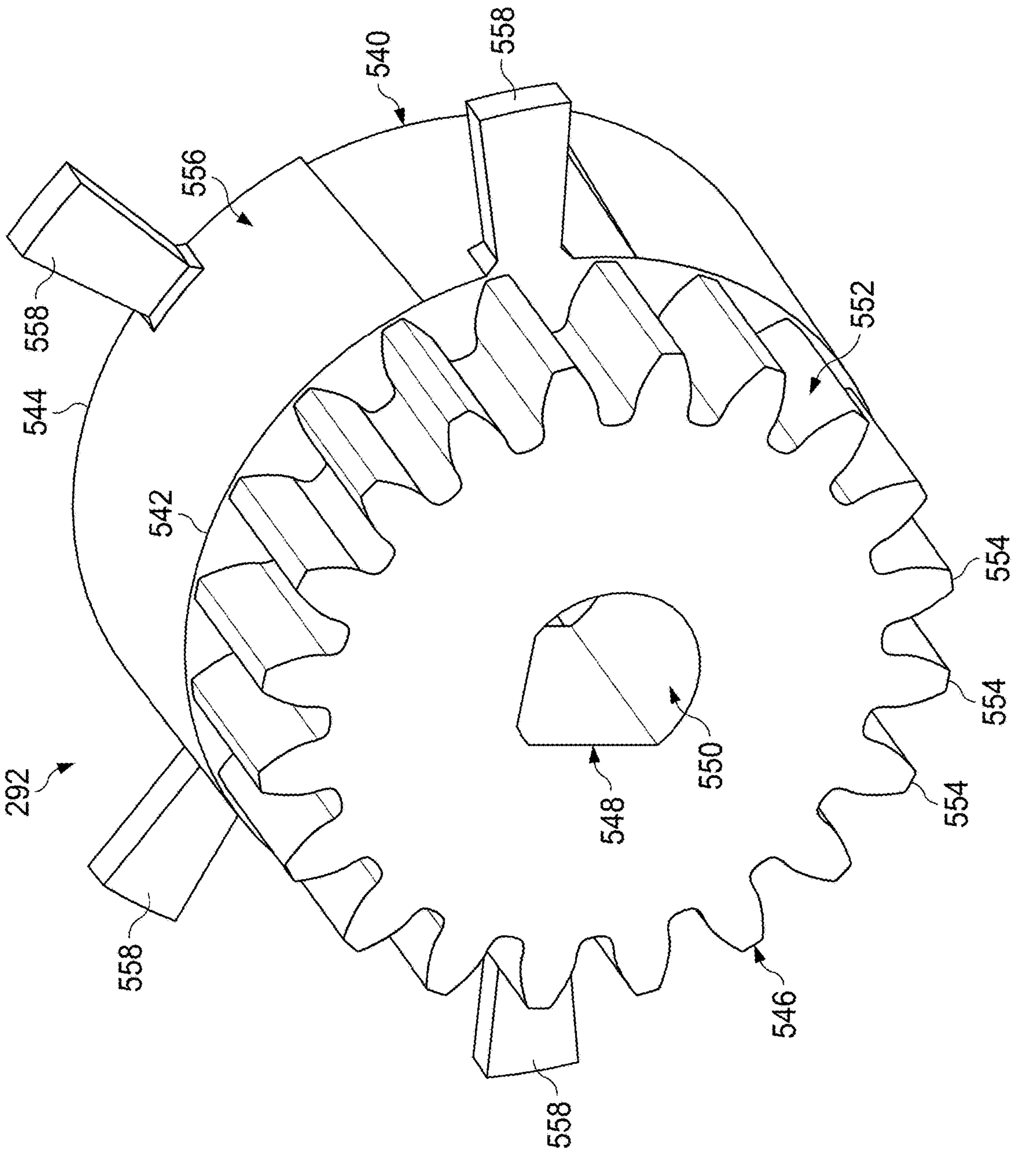
FIG. 27 illustrates a front, top, and left side isometric view of the cam adjustment gear of FIG. 22.

Turning to FIG. 27, the cam adjustment gear 292 may be provided in the form of a substantially annular adjustment gear hub 540 defined by a hub first end 542 and a hub second end 544 opposing the hub first end 542 and an adjustment gear member 546 connected to the adjustment gear hub 540 at the hub first end 542. An adjustment gear interior surface 548 may define an adjustment gear opening 550 extending entirely through the adjustment gear member 546 and the adjustment gear hub 540. The adjustment gear member 546 may include an adjustment gear member exterior surface 552 with a plurality of adjustment gear teeth 554 circumscribing the gear member exterior surface 552 and spaced evenly radially apart from one another. For example, the adjustment gear member 546 may be arranged to be engaged by one or more gears (not shown) of the printhead assembly 200 or a printing device (e.g., the printer 100).

The adjustment gear hub 540 may include a substantially smooth hub exterior surface 556 extending between the hub first end 542 and the hub second end 544. The cam adjustment gear 292 may include one or more sensor flags 558 positioned on the hub exterior surface 556 and extend outwardly therefrom. For example, the sensor flags 558 may be provided in the form of substantially rectangular or rectilinear protrusions connected to the hub exterior surface 556 and extending radially away from the adjustment gear hub 540. In some instances, one or more sensor flags 558 may be positioned at the hub first end 542 and one or more sensor flags 558 may be positioned at the hub second end 544. For example, as shown in the example of FIG. 27, the cam adjustment gear 292 may include two sensor flags 558 positioned at the hub first end 542 and two sensor flags 558 positioned at the hub second end 544. In other instances, the cam adjustment gear 292 may include any number of sensor flags 558, and the sensor flags 558 may be provided in any suitable form and arranged in any suitable configuration. In some instances, the sensor flags 558 may be configured to indicate the rotational position of the cam shaft 290.

Figure 28:
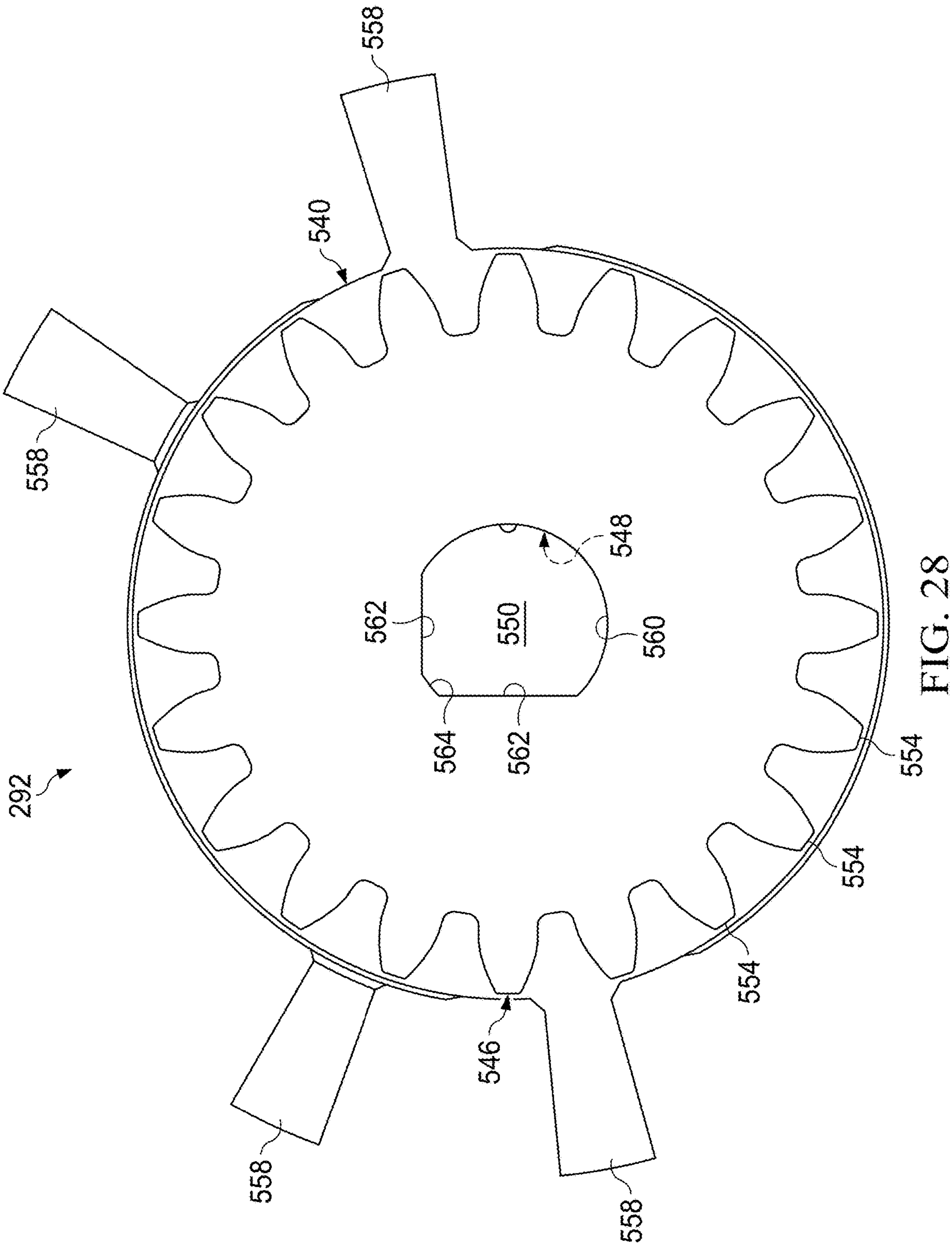
FIG. 28 illustrates a left side elevational view of the cam adjustment gear of FIG. 22.

As best shown in FIG. 28, the adjustment gear interior surface 548 may define the adjustment gear opening 550 such that the geometry of the adjustment gear opening 550 mirrors or complements the geometry of the cam shaft 290 at the gear region 456 (see FIG. 21). For example, in some instances, the adjustment gear interior surface 548 may include an adjustment gear semicircular edge 560, two adjustment gear planar edges 562 connected to opposing ends of the adjustment gear semicircular edge 560, and an adjustment gear beveled edge 564 positioned at a juncture between the adjustment gear planar edges 562. Thus, the adjustment gear planar edges 562 and the adjustment gear beveled edge 564 may engage the planar edges 468 and beveled edge 470, respectively, of the cam shaft 290 when the cam adjustment gear 292 is installed (e.g., when the adjustment gear opening 550 receives the gear region 456 of the cam shaft 290). In this way, the cam adjustment gear 292 may be prevented or restricted from rotating with respect to the cam shaft 290 when the printhead assembly 200 is in use. In other words, the cam adjustment gear 292 may be configured to rotate in unison with the cam shaft 290 when the printhead assembly 200 is in use.

Turning to FIG. 29, the printhead module 202 is depicted where the printhead assembly 200 is in the closed position and the cam shaft 290 is in a first rotational position. The cam shaft 290 may extend through the cam shaft openings 374 of the printhead holder 282 such that the force cam 288 is positioned to engage the push plate 286. In some instances, the first force cam quadrant 502*a* may engage the push plate 286 when the cam shaft 290 is in the first rotational position. The lift cams 294 may not engage the flange impact surfaces 372 (e.g., one of the lift cam sidewalls 522*a*, 522*b* may be positioned adjacent to, but may not impact, the adjacent flange impact surface 372) when the cam shaft 290 is in the first rotational position. The cam shaft 290 may move from the first rotational position to other rotational positions while the printhead assembly 200 is in use. For example, the first rotational position of the cam shaft 290 may correspond to a first setting (e.g., a first nip force setting) of the printhead assembly 200. In some instances, a second rotational position of the cam shaft 290 may correspond to a second setting of the printhead assembly 200, and another of the force cam quadrants 502 (e.g., the second force cam quadrant 502*b*) may engage the push plate 286 when the cam shaft 290 is in the second rotational position. The cam shaft 290 may be configured to move into further rotational positions (e.g., a third rotational position, a fourth rotational position, etc.) corresponding to further settings of the printhead assembly 200.

Figure 30:
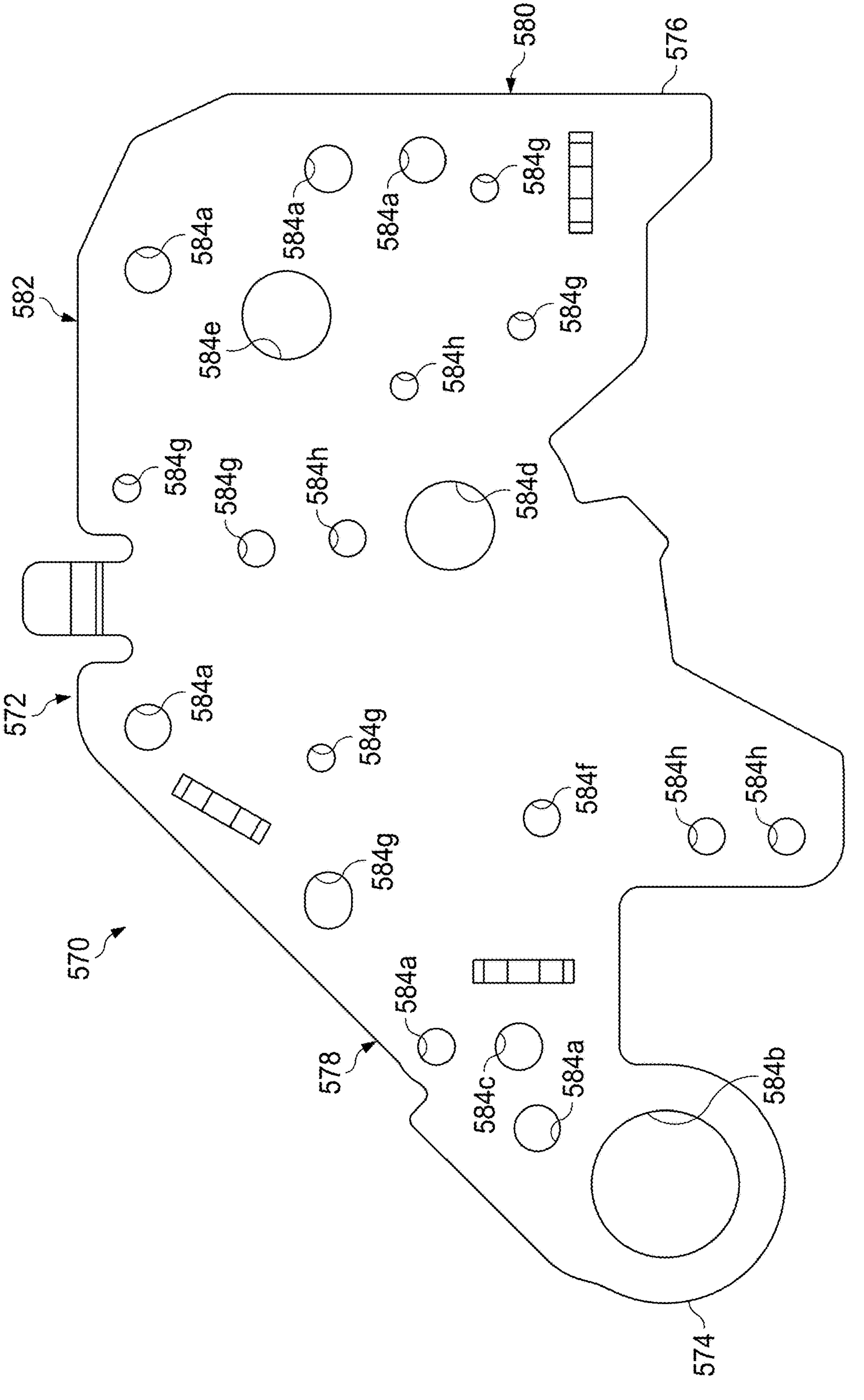
FIG. 30 illustrates a left side elevational view of a side plate of the printhead assembly of FIG. 5.

Turning now to FIG. 30, a side plate 570 may be configured to be coupled to the casing lip 228 of the casing 204 and be oriented parallel with respect to the casing sidewall 238 (see, e.g., FIG. 7) such that the side plate 570 is positioned to support or retain various components of the printhead assembly 200. The side plate 570 may be provided in the form of a substantially planar side plate body 572 defined by a side plate first end 574 and a side plate second end 576 opposing the side plate first end 574. In some instances, the side plate 570 may be designed to mirror the shape of the casing 204 and/or the casing sidewall 238. For example, the side plate 570 may have a side plate slanted edge 578 proximate to the side plate first end 574 (e.g., arranged to align with the slanted portion 220 of the casing 204), a side plate vertical edge 580 proximate to the side plate second end 576 (e.g., arranged to align with the vertical portion 222 of the casing 204), and a side plate upper edge 582 (e.g., arranged to align with the upper panel 224 of the casing 204).

The side plate 570 may include a plurality of side plate holes 584 provided in the form of substantially circular or rounded openings extending entirely through the side plate body 572. The side plate holes 584 may be arranged to receive or support various components of the printhead assembly 200. For example, in some instances, the side plate holes 584 may include one or more side plate mounting holes 584*a*, a side plate support shaft hole 584*b*, a side plate linking shaft hole 584*c*, a side plate lever shaft hole 584*d*, a side plate cam shaft hole 584*e*, a side plate stopper hole 584*f*, one or more side plate sensor holes 584*g*, and one or more side plate pin holes 584*h*. In other instances, the side plate 570 may include any number of side plate holes 584 configured in any suitable arrangement.

In the example of FIG. 30, the side plate mounting holes 584*a* may be arranged to align with the casing mounting members 230 positioned on the casing lip 228 (see FIG. 9), the side plate support shaft hole 584*b* may be arranged to align with the support shaft seat 252 (see FIG. 9) and to receive a portion of the support shaft 590, the side plate linking shaft hole 584*c* may be arranged to align with the first linking shaft openings 356 of the printhead holder 282 (see FIG. 14) and the second linking shaft openings 428 of the push plate 286 (see FIG. 18) and to receive a portion of the linking shaft 430, the side plate lever shaft hole 584*d* may be arranged to align with the casing lever shaft hole 240 (see FIG. 9), and the side plate cam shaft hole 584*e* may be arranged to align with the cam shaft seat 256 (see FIG. 9) and receive a portion of the cam shaft 290.

Figure 31:
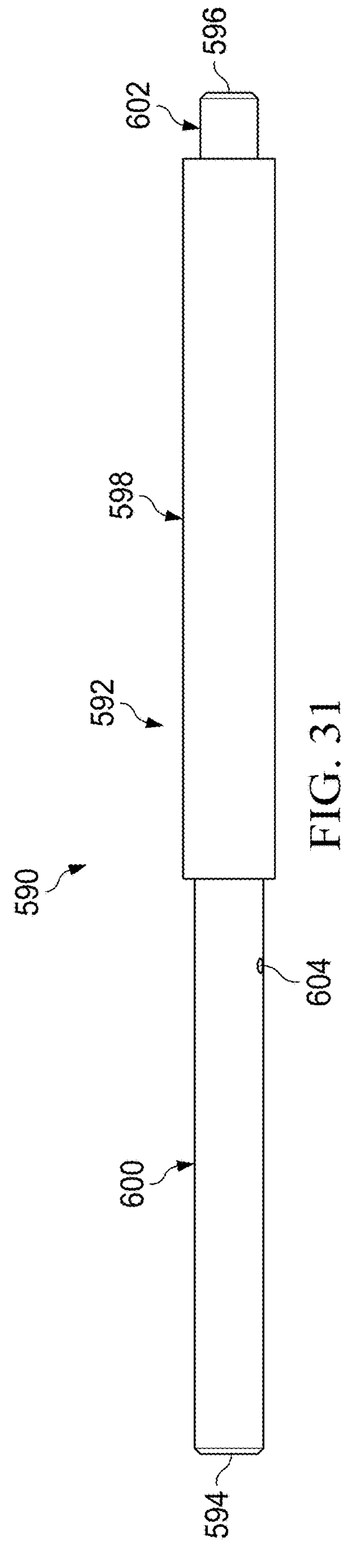
FIG. 31 illustrates a front elevational view of a support shaft of the printhead assembly of FIG. 5.

Turning to FIG. 31, in some instances, a support shaft 590 may support or orient one or more components of the printhead assembly 200 and may facilitate a connection between the printhead module 202 and the casing 204. The support shaft 590 may be provided in the form of a substantially cylindrical support shaft body 592 defined by a support shaft first end 594 and a support shaft second end 596 opposing the support shaft first end 594. The support shaft 590 may include a main body portion 598 proximate to the support shaft second end 596 and a protruding portion 600 positioned between the main body portion 598 and the support shaft first end 594. A stud member 602 may be connected to the main body portion 598 proximate to the support shaft second end 596 and extend outwardly therefrom. A support shaft connection hole 604 provided in the form of a substantially circular opening extending at least partially through the support shaft body 592 may be positioned on the protruding portion 600 proximate to the main body portion 598.

Figure 32:
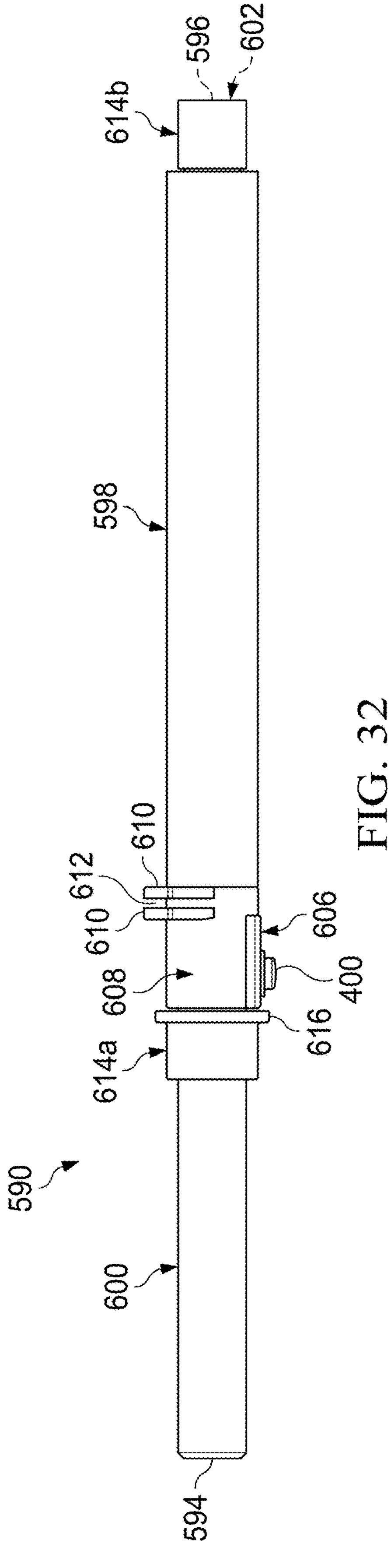
FIG. 32 illustrates a front elevational view of the support shaft of FIG. 31 with an orienting member and bushings positioned thereon.

As shown in FIG. 32, a second orienting member 606 provided in the form of a substantially annular orienting member body 608 may be positioned on the protruding portion 600 adjacent to the main body portion 598 of the support shaft 590 and be coupled thereto. For example, the second orienting member 606 may include an opening (not shown) configured to align with the support shaft connection hole 604. Thus, a fastener 400 may extend through the opening in the second orienting member and be received by the support shaft connection hole 604 (e.g., via a threaded engagement between the fastener 400 and an interior surface of the support shaft connection hole 604), thereby coupling the second orienting member 606 to the support shaft 590.

In some instances, the second orienting member 606 may include two orienting ridges 610 connected to the orienting member body 608 and extending upwardly therefrom. The orienting ridges 610 may be provided in the form of substantially planar protrusions oriented parallel with respect to one another such that an orienting slot 612 is defined therebetween. For example, the orienting slot 612 of the second orienting member 606 may be arranged to receive the orienting surface 362 positioned on the first orienting member 360 of the printhead holder 282 (see FIG. 14). Thus, in some instances, the second orienting member 606 may be configured to maintain a proper positioning and orientation (e.g., with respect to the casing 204) of the printhead 138, docking plate 280, printhead holder 282, and/or push plate 286 when the printhead assembly 200 is in use.

One or more bushings 614 may be positioned along the support shaft 590. In some instances, a first bushing 614*a* may be positioned on the protruding portion 600 adjacent to the second orienting member 606 and a second bushing 614*b* may be positioned on the stud member 602. The first bushing 614*a* may include a bushing lip 616 provided in the form of an annular protrusion extending outwardly from the first bushing 614*a* and positioned proximate to the second orienting member 606. The first bushing 614*a* may be positioned to align with or be received by the side plate support shaft hole 584*b* (see FIG. 30) and facilitate rotation of the support shaft 590 relative to the side plate 570 while the printhead assembly 200 is in use (e.g., when the printhead assembly 200 transitions between the closed position and the open position). The second bushing 614*b* may be positioned to align with or be received within the support shaft seat 252 of the casing 204 (see FIG. 9) and facilitate rotation of the support shaft 590 relative to the casing 204 while the printhead assembly 200 is in use (e.g., when the printhead assembly 200 transitions between the closed position and the open position). For example, when the printhead assembly 200 moves from the closed position (see FIG. 5) to the open position (see FIG. 6), the casing 204 and printhead module 202 may pivot or rotate about an axis extending along a length of the support shaft 590 such that the printhead 138 moves away from the platen roller 140.

Figure 33:
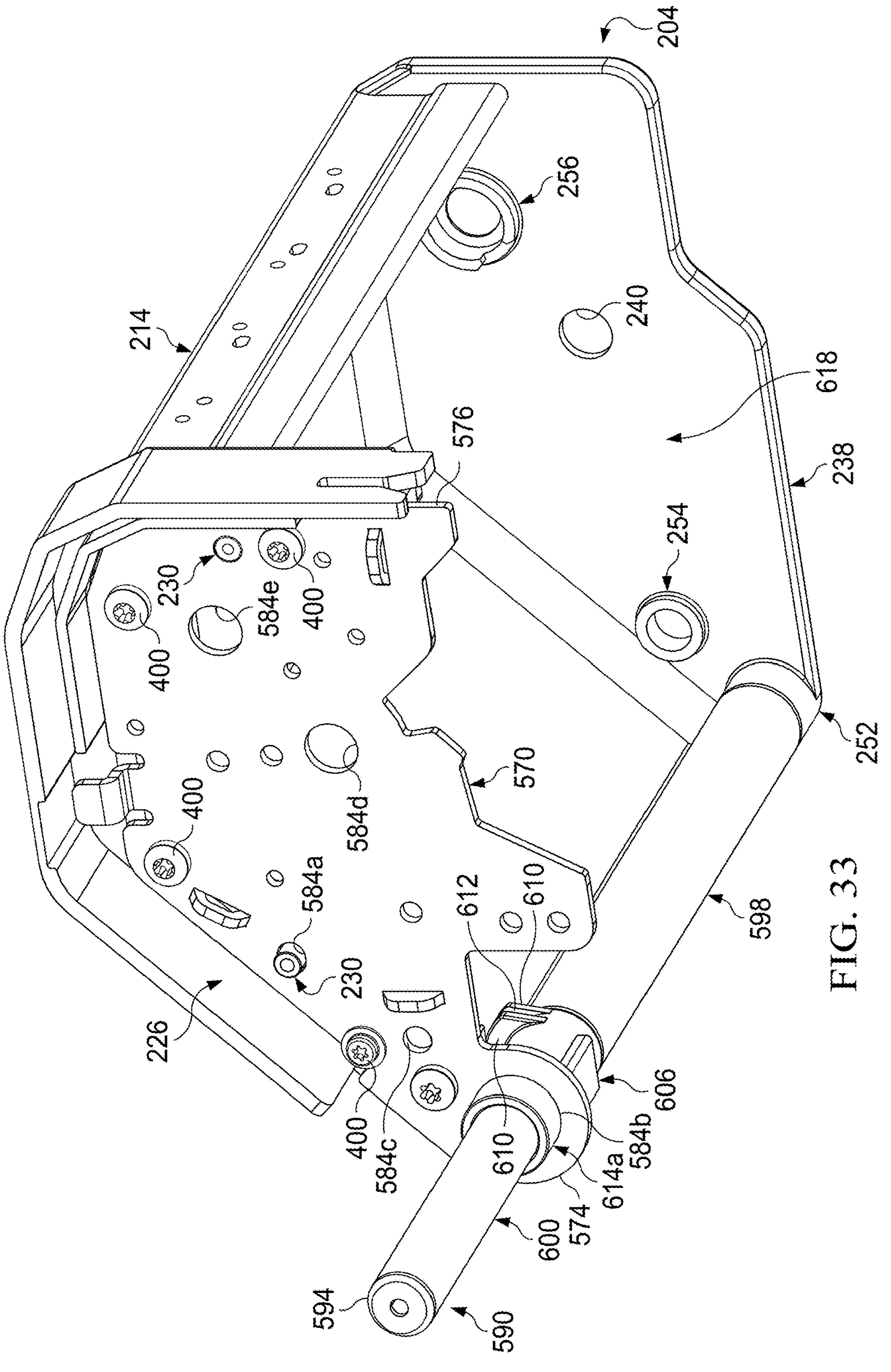
FIG. 33 illustrates a front, bottom, and left side isometric view of the side plate of FIG. 30 and the support shaft of FIG. 31 coupled to the casing of FIG. 7.

Turning to FIG. 33, the side plate 570 may be coupled to the casing 204 to form an enclosure 618 where one or more components of the printhead module 202 may be positioned or retained. For example, fasteners 400 may extend through one or more of the side plate mounting holes 584*a* and be received by adjacent casing mounting members 230, and/or one or more of the side plate mounting holes 584*a* may receive an adjacent casing mounting member 230 (e.g., in a press fit). In some instances, the enclosure 618 may be defined by the side plate 570, the roof 214 of the casing 204, and the casing sidewall 238. As shown, the side plate cam shaft hole 584*e* may align with the cam shaft seat 256 such that the cam shaft 290 may be securely positioned within the enclosure 618. The side plate linking shaft hole 584*c* may align with the linking shaft seat 254 such that the linking shaft 430 may be securely positioned within the enclosure 618. For example, the linking shaft second end 436 may be received by the linking shaft seat 254 and the notched segment 438 at the linking shaft first end 434 may extend beyond the side plate 570 via the side plate linking shaft hole 584*c*. The side plate lever shaft hole 584*d* may align with the casing lever shaft hole 240.

The support shaft 590 may extend through the side plate support shaft hole 584*b* such that the stud member 602 at the support shaft second end 596 is received by the support shaft seat 252, the main body portion 598 is positioned within or adjacent to the enclosure 618, and the protruding portion 600 extends beyond the side plate 570. The second orienting member 606 may be positioned within the enclosure 618 adjacent to the side plate first end 574 (e.g., in a rear corner of the enclosure 618) such that the orienting ridges 610 (see FIG. 32) extend toward the roof 214 and are available to receive the first orienting member 360 (see FIG. 14) within the orienting slot 612.

The first bushing 614*a* may surround the portion of the support shaft 590 received by the side plate support shaft hole 584*b* and facilitate rotation of the support shaft 590 therein. In some instances, the bushing lip 616 may engage the side plate 570 and prevent the first bushing 614*a* from tracking along the support shaft 590 (e.g., sliding out of the side plate support shaft hole 584*b*). The second bushing

614*b* may surround the portion of the support shaft 590 received by the support shaft seat 252 (e.g., the stud member 602) and facilitate rotation of the support shaft 590 therein.

Figure 34:
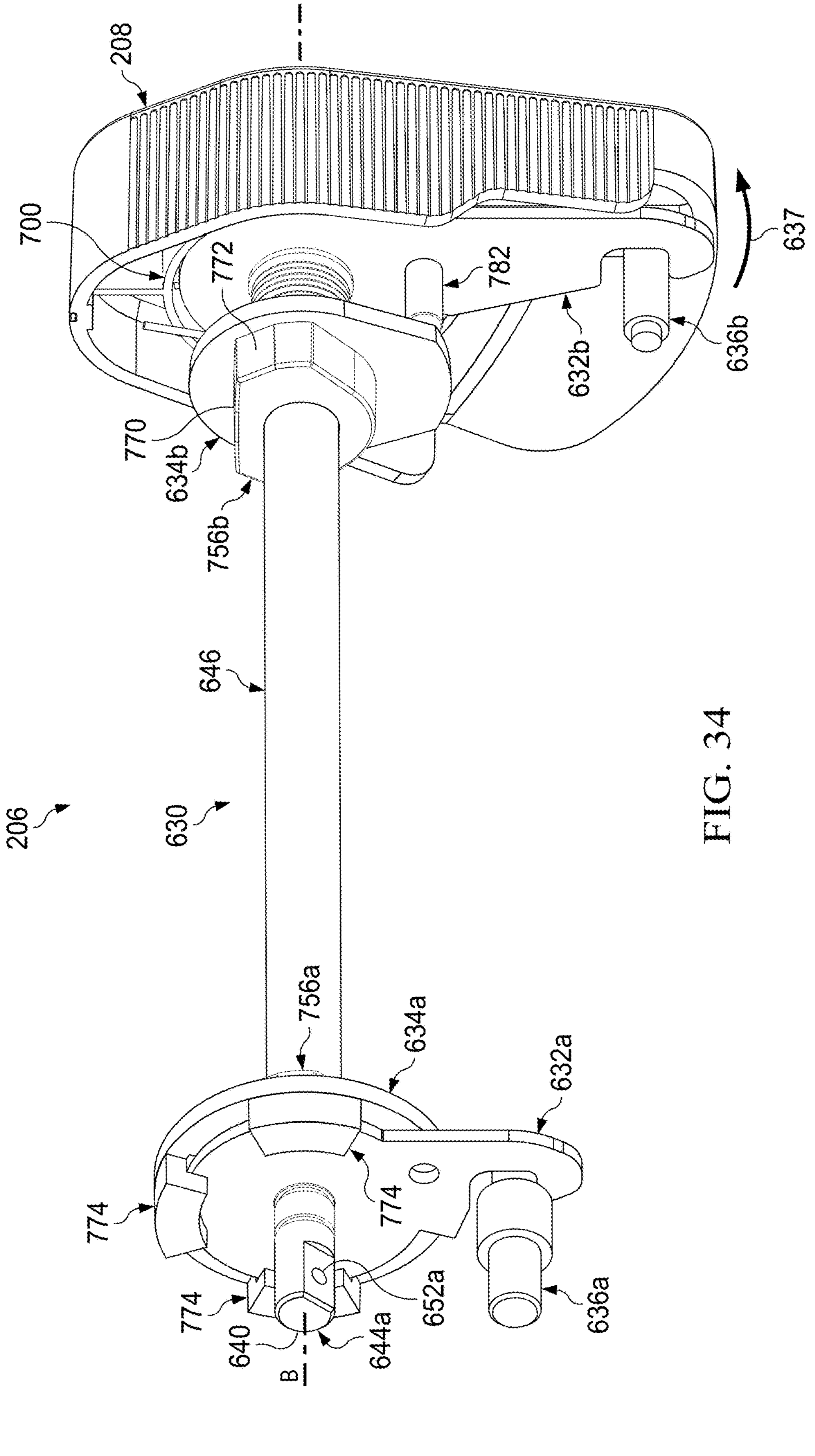
FIG. 34 illustrates a front and left side isometric view of a lever subassembly of the printhead assembly of FIG. 5.

Turning to FIG. 34, the lever subassembly 206 may be at least partially disposed within the enclosure 618 and may be operable by engaging the lever 208 (e.g., to open the printhead assembly 200 and provide access to one or more internal components thereof for cleaning, maintenance, or other purposes). The lever subassembly 206 may include a lever shaft 630 received at one end by the lever 208. The lever shaft 630 may be coupled to the lever 208 such that the lever shaft 630 is configured to rotate in response to rotation of the lever 208. In some instances, the lever subassembly 206 may include one or more lock members 632 and one or more lift members 634 positioned on the lever shaft 630. For example, in some instances, a first lock member 632*a* and a second lock member 632*b* may be positioned proximate to opposing ends of the lever shaft 630. A first lift member 634*a* and a second lift member 634*b* may be positioned proximate to the first lock member 632*a* and the second lock member 632*b*, respectively. The lever 208, lever shaft 630, first lock member 632*a*, second lock member 632*b*, first lift member 634*a*, and second lift member 634*b* may rotate about an axis B.

The first lock member 632*a* may engage a first locking pin 636*a* and the second lock member 632*b* may each engage a second locking pin 636*b* when the lever subassembly 206 is in the default configuration (i.e., depicted in FIG. 34). For example, in some instances, each of the first and second locking pins 636*a*, 636*b* may be coupled to or formed integrally with an internal component of the printing device (e.g., the printer 100) such that the locking pins 636 occupy a fixed position therein. In other instances, each of the first and second locking pins 636*a*, 636*b* may be formed integrally with or coupled to a stationary component of the printhead assembly 200. In some instances, releasable engagement between the first and second lock members 632*a*, 632*b* and the first and second locking pins 636*a*, 636*b*, respectively, may maintain the lever subassembly 206 in the default configuration. For example, a user may be able to disengage the first and second lock members 632*a*, 632*b* from the first and second locking pins 636*a*, 636*b*, respectively, by rotating the lever 208 in the direction of a first arrow 637.

Figure 35:
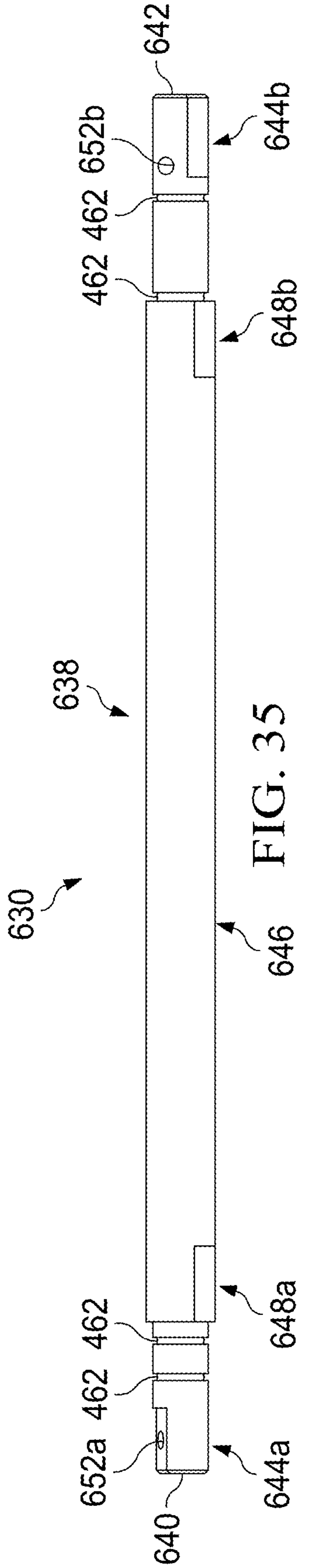
FIG. 35 illustrates a front elevational view of a lever shaft of the lever subassembly of FIG. 34.

As best shown in FIG. 35, the lever shaft 630 may be provided in the form of a substantially cylindrical lever shaft body 638 defined by a lever shaft first end 640 and a lever shaft second end 642 opposing the lever shaft first end 640. The lever shaft 630 may include one or more lever shaft notched regions 644 imparted with the shape of a partial cylinder and designed to facilitate a connection between the lever shaft and the casing 204, the lever 208, and/or other components of the printhead assembly 200. For example, a first lever shaft notched region 644*a* may be positioned at the lever shaft first end 640 and a second lever shaft notched region 644*b* may be positioned at the lever shaft second end 642. A lever shaft central region 646 may extend between the first lever shaft notched region 644*a* and the second lever shaft notched region 644*b*.

The lever shaft 630 may include one or more lever cam regions 648 arranged to support the lift members 634 for rotation with the lever shaft 630. For example, a first lever cam region 648*a* may be positioned on the lever shaft central region 646 proximate to the first lever shaft notched region 644*a* and a second lever cam region 648*b* may be positioned on the lever shaft central region 646 proximate to the second lever shaft notched region 644*b*. In some instances, the first lever cam region 648*a* may be arranged to receive the first lift member 634*a* and the second lever cam region 648*b* may be arranged to receive the second lift member 634*b*.

In some instances, the lever shaft 630 may include one or more washer grooves 462 (e.g., positioned on the first lever shaft notched region 644*a* and/or the second lever shaft notched region 644*b*). Additionally, the lever shaft 630 may include one or more lever shaft openings 652. For example, a first lever shaft opening 652*a* may be provided in the form of a substantially circular hole positioned on the first lever shaft notched region 644*a* and extending entirely therethrough, and a second lever shaft opening 652*b* may be provided in the form of a substantially circular hole positioned on the second lever shaft notched region 644*b* and extending entirely therethrough.

Figure 36:
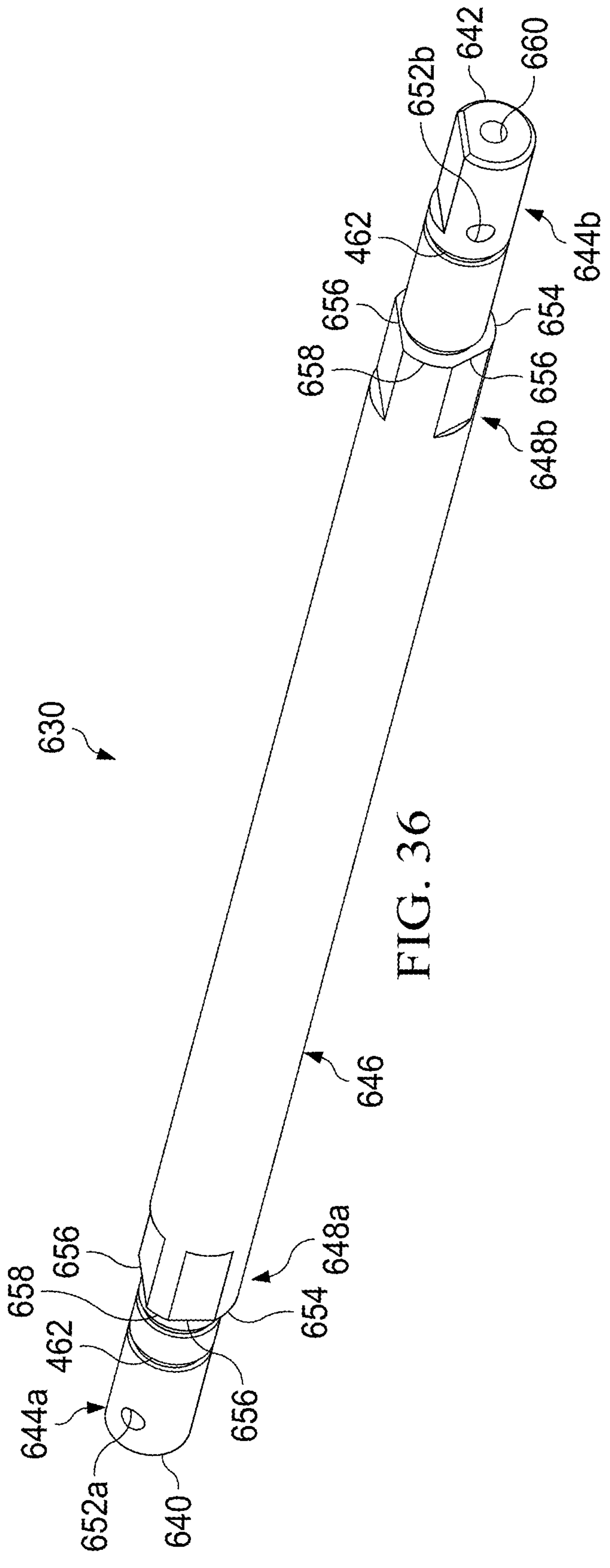
FIG. 36 illustrates a front and right side isometric view of the lever shaft of FIG. 35.

As best shown in FIG. 36, the first cam region 648*a* may be configured to receive the first lift member 634*a*, and the second lever cam region 648*b* may be configured to receive the second lift member 634*b*. The first and second cam regions 648*a*, 648*b* may support the lift members 634*a*, 634*b*, respectively, for rotation with the lever shaft 630 about the axis B. For example, the first and second lever cam regions 648*a*, 648*b* may each include a lever shaft semicircular edge 654, two substantially lever shaft planar edges 656 connected to opposing ends of the lever shaft semicircular edge 654, and a lever shaft beveled edge 658 positioned at a juncture between the lever shaft planar edges 656. In other instances, the first and second lever cam regions 648*a*, 648*b* may each be provided in any suitable form provided that they are configured to inhibit rotation of the associated lift member 634 with respect to the lever shaft 630. In some instances, a lever shaft connection hole 660 may be positioned at the lever shaft second end 642 and extend at least partially into the second lever shaft notched region 644*b*.

Figure 37:
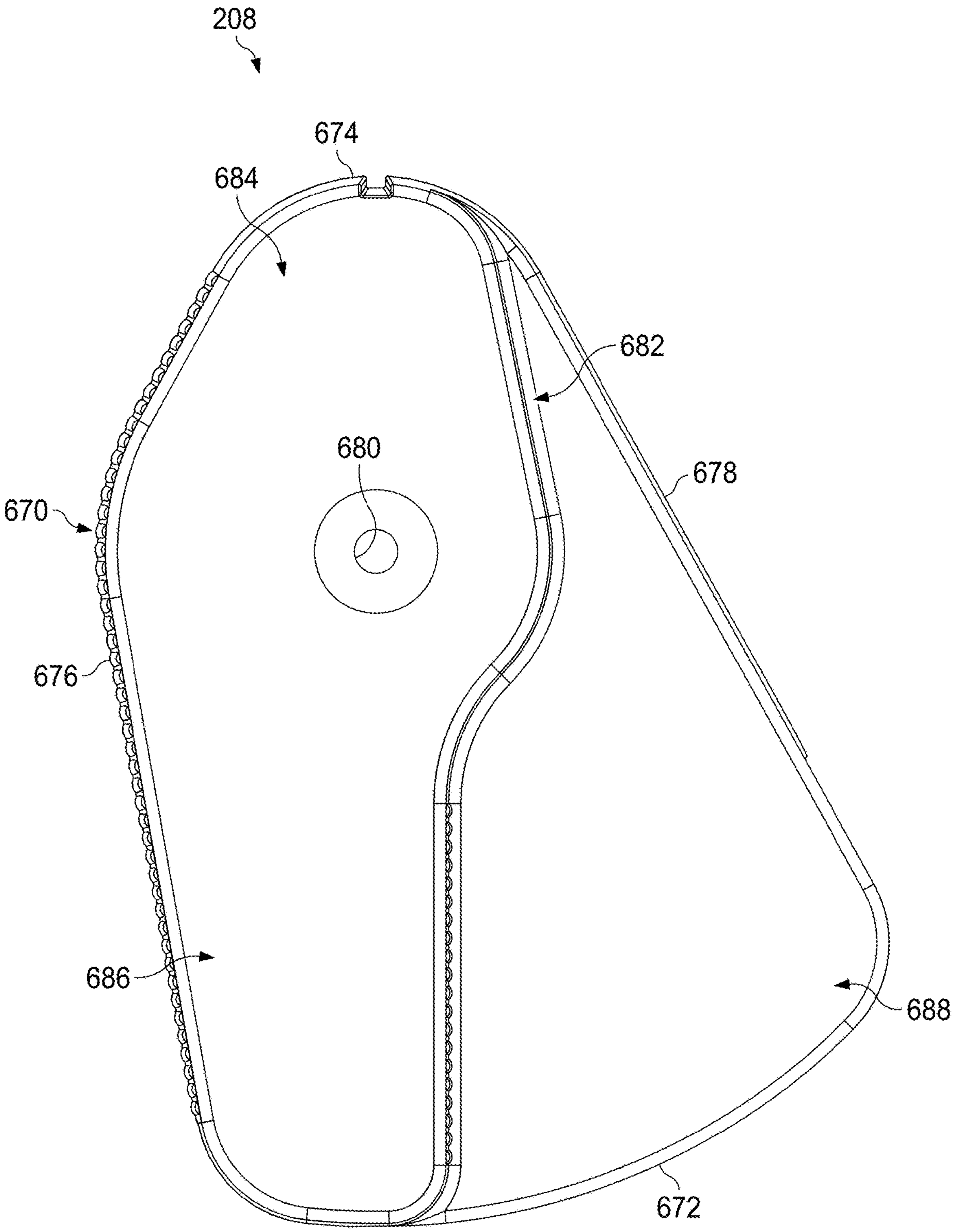
FIG. 37 illustrates a right side elevational view of a lever of the lever subassembly of FIG. 34.

Turning to FIG. 37, the lever 208 may be provided in the form of a substantially curvilinear lever body 670 defined by a lever base 672, a lever peak 674 opposing the lever base 672, a lever first side 676 extending between the lever base 672 and the lever peak 674, and a lever second side 678 extending between the lever base 672 and the lever peak 674 and opposing the lever first side 676. The lever 208 may include a lever connection hole 680 provided in the form of a substantially circular opening extending entirely through the lever body 670.

In some instances, the lever 208 may include a grip surface 682 positioned on a lever exterior surface 684 and extending between the lever base 672 and the lever peak 674. For example, a first lever exterior surface portion 686 proximate to the lever first side 676 may be raised or elevated with respect to a second lever exterior surface portion 688 proximate to the lever second side 678. The first lever exterior surface portion 686 and the second lever exterior surface portion 688 may be offset and parallel with respect to one another, and the grip surface 682 may extend between the first lever exterior surface portion 686 and the second lever exterior surface portion 688. In some instances, the grip surface 682 may be perpendicular with respect to the first lever exterior surface portion 686 and/or the second lever exterior surface portion 688. The grip surface 682 may increase the case with which a user may grip or engage the lever 208 to operate the lever subassembly 206.

Figure 38:
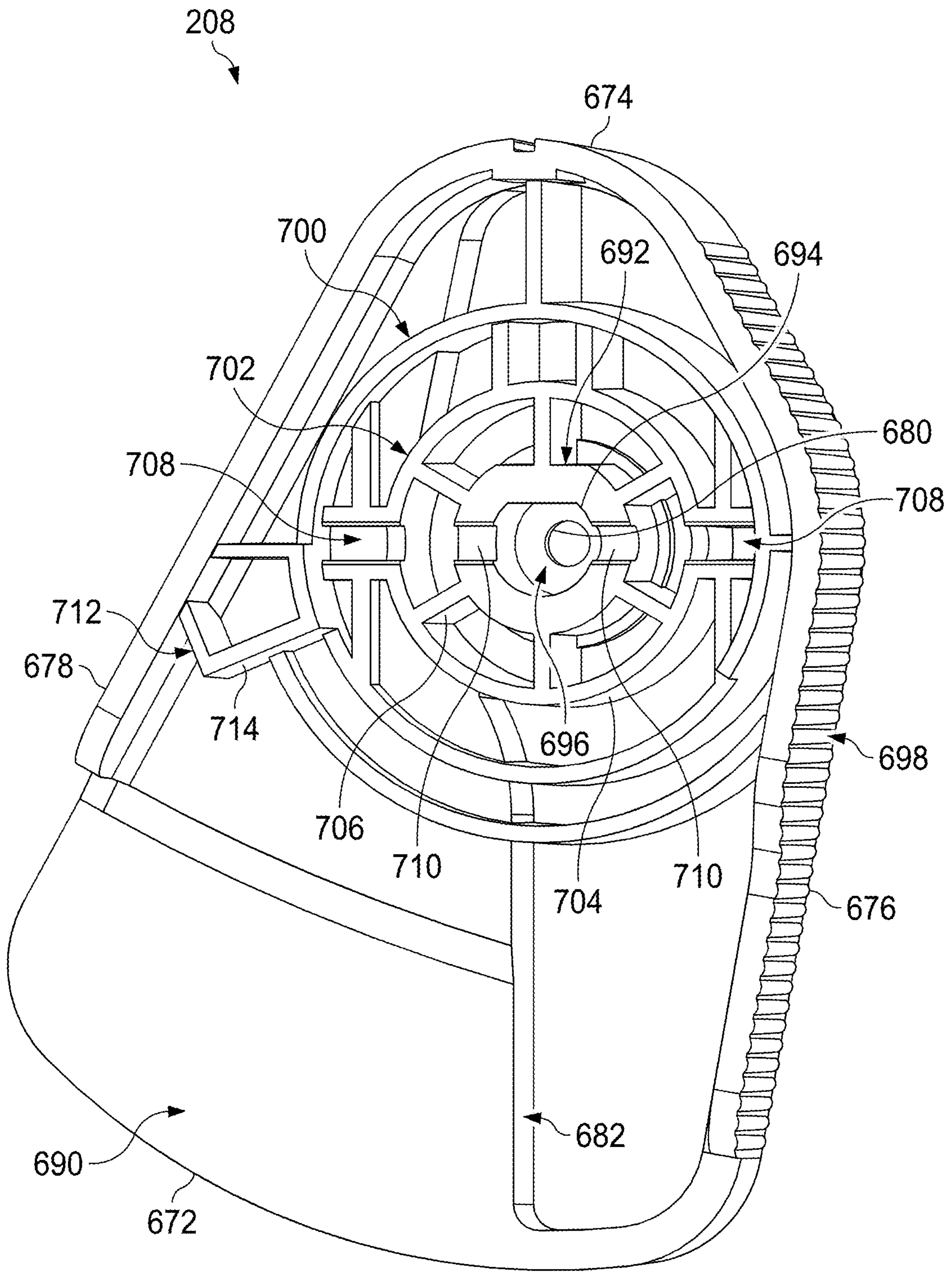
FIG. 38 illustrates a front and left side isometric view of the lever of FIG. 37.

As best shown in FIG. 38, a lever interior surface 690 opposite the lever exterior surface 684 may be configured to receive or engage one or more components of the lever subassembly 206. For example, a substantially annular lever collar 692 designed to receive a portion of the lever shaft

630 (e.g., the lever shaft second end 642) may be positioned on the lever interior surface 690 and extend outwardly therefrom. A lever collar interior perimeter 694 may define a lever shaft seat 696 within the lever collar 692 such that the geometry of the lever shaft seat 696 mirrors or complements the geometry of a portion of the lever shaft 630. For example, the lever shaft seat 696 may be configured to receive the second lever shaft notched region **644*b*. The lever connection hole 680 may be positioned within the lever collar 692 such that the lever connection hole 680 aligns with the lever shaft connection hole 660 (see FIG. 36) when the lever collar 692 receives the lever shaft 630**.

In some instances, a lever sidewall 698 may be coupled to a peripheral edge of the lever interior surface 690 and extend outwardly therefrom. For example, the lever sidewall 698 may be provided in the form of a curved panel positioned at the lever peak 674 and extending toward the lever base 672 along at least a portion of the lever first side 676 and at least a portion of the lever second side 678. In some instances, a lock member support wall 700 positioned adjacent to the lever sidewall 698 may circumscribe at least a portion of the lever collar 692. For example, the lock member support wall 700 may be configured to support or retain a portion of the second lock member **632*b* (see FIG. 34**).

In some instances, the lever 208 may include a lever support structure 702 connected to the lever interior surface 690 and extending outwardly therefrom. For example, the lever support structure 702 may include a support ring 704 (e.g., surrounding the lever collar 692) and one or more support walls 706 connected to the support ring 704. In some instances, one or more support walls 706 may extend between the support ring 704 and the lever collar 692. The lever support structure may define two substantially linear lever pin channels 708 positioned proximate to the lever first side 676 and lever second side 678, respectively. For example, the lever pin channels 708 may be positioned opposite one another with respect to the lever collar 692. The lever collar 692 may include semicircular lever collar indentations 710 positioned proximate to each of the lever pin channels 708. In some instances, the lever pin channels 708 and lever collar indentations 710 may align to form a substantially linear channel or passageway extending between opposing points along the lock member support wall 700.

The lever 208 may include a lever impact member 712 arranged to contact the associated lock member 632 (e.g., the second lock member **632*b*) when the lever subassembly 206 is engaged or operated by a user. In some instances, the lever impact member 712 may be positioned on the lever interior surface 690 adjacent to the lever second side 678 and extend outwardly therefrom. For example, the lever impact member 712 may be positioned between the lever sidewall 698 and the lock member support wall 700. A lever impact surface 714 positioned on the lever impact member 712 may be arranged to contact the associated lock member 632**.

Figure 39:
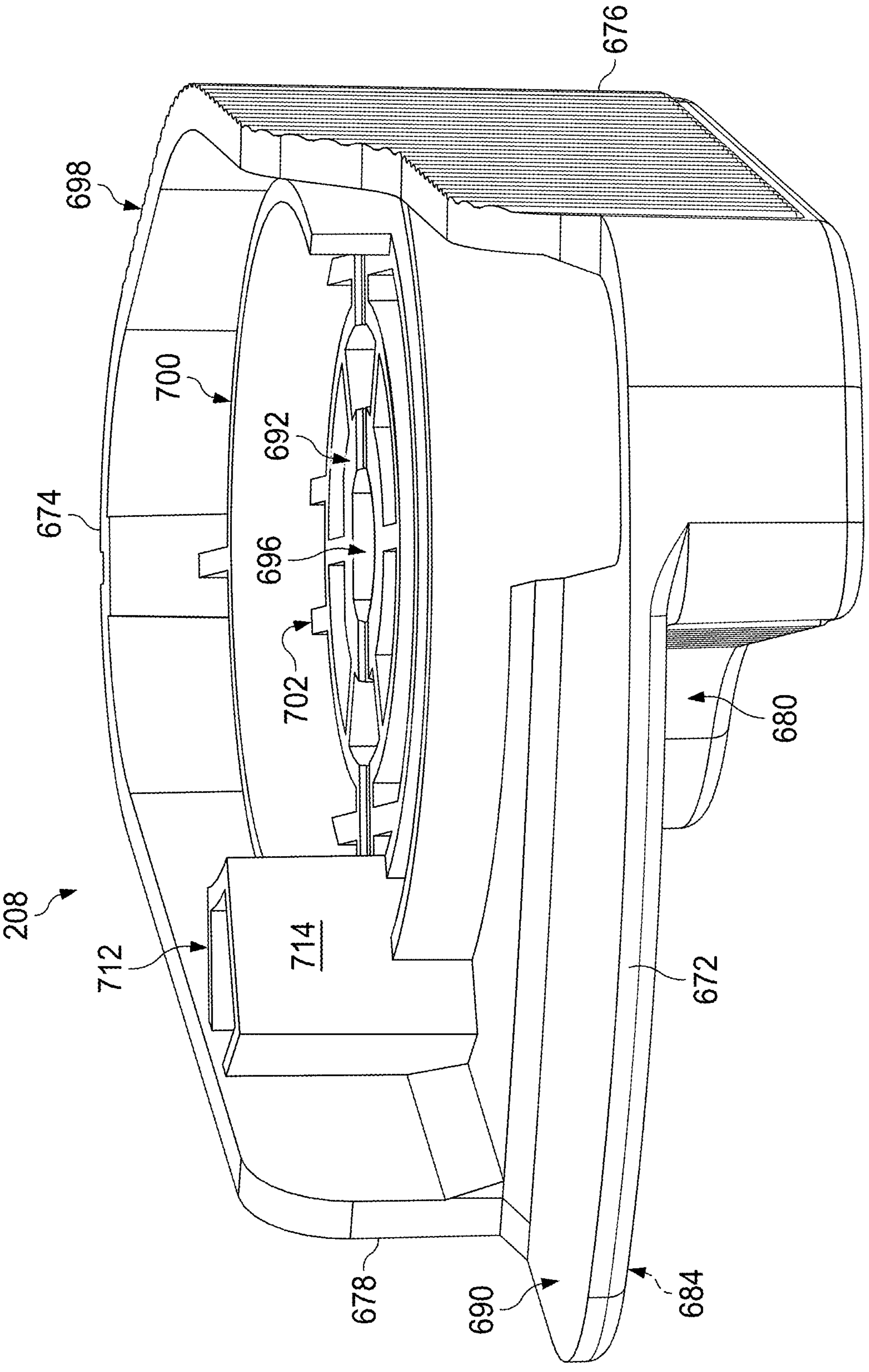
FIG. 39 illustrates a bottom, front, and left side isometric view of the lever of FIG. 38.

Turning to FIG. 39, an exemplary elevation profile of the lever interior surface 690 is shown. In some instances, the lever collar 692 and the lever support structure 702 may extend outwardly from the lever interior surface 690 by a first distance. The lock member support wall 700 may extend outwardly from the lever interior surface 690 by a second distance. The lever impact member 712 may extend outwardly from the lever interior surface 690 by a third distance. In some instances, the third distance may be greater than the second distance and the second distance may be greater than the first distance. In other instances, the second and third distances may be substantially equal to one another and may each be greater than the first distance.

Figure 40:
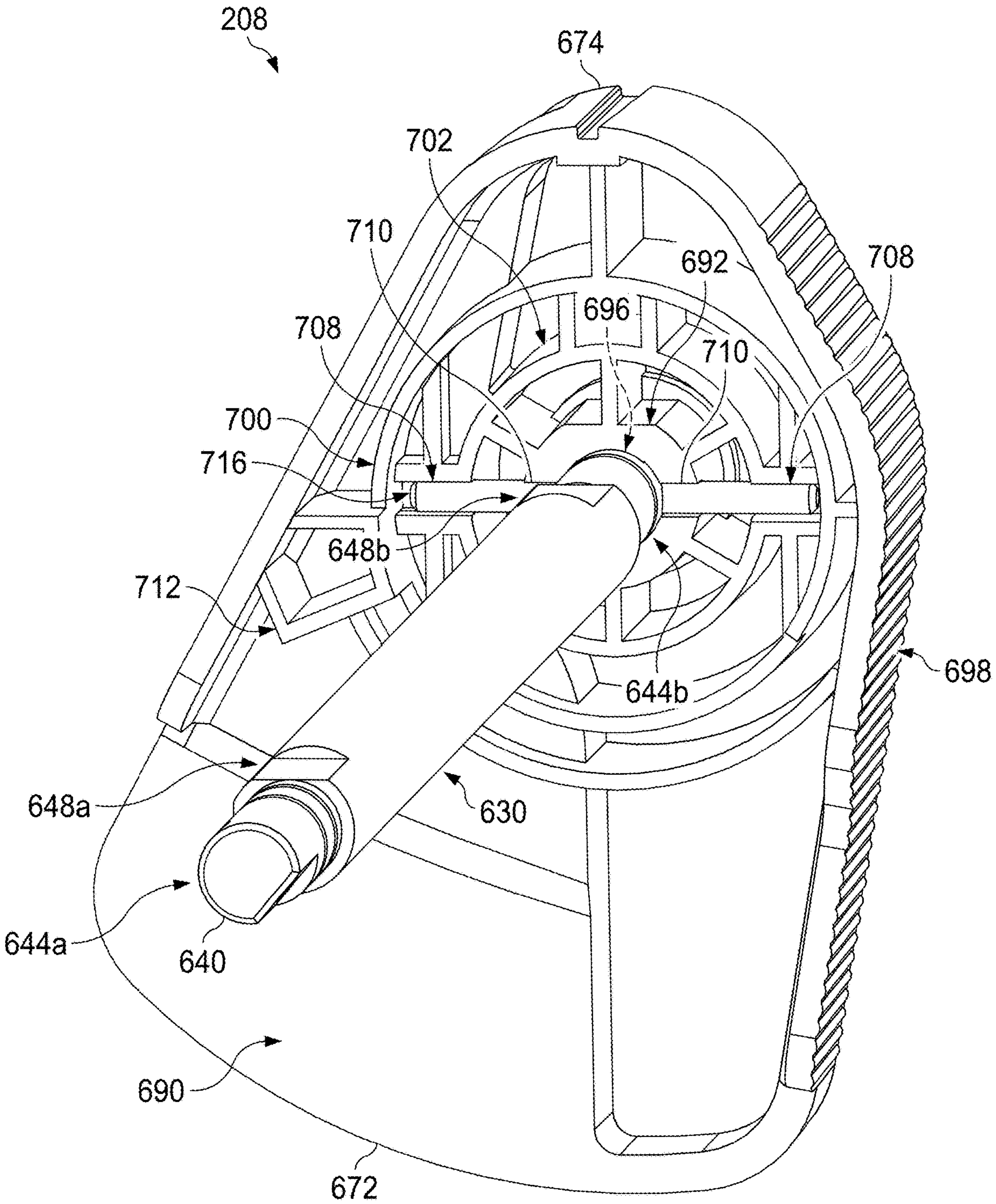
FIG. 40 illustrates a top, front, and left side isometric view of the lever shaft of FIG. 35 with the lever of FIG. 37 connected thereto.

Turning to FIG. 40, the lever shaft second end 642 may be received by the lever collar 692 (e.g., at least a portion of the second lever shaft notched region **644*b* may be positioned within the lever shaft seat 696 defined by the lever collar 692). In some instances, a lever pin 716 may be connected to the lever shaft 630 when the lever subassembly 206 is assembled. The lever pin 716 may be configured to engage both the lever shaft 630 and the lever 208. For example, the lever pin 716 may be positioned within or may extend through the second lever shaft opening 652*b* positioned on the second lever shaft notched region 644*b* (see FIG. 36). Additionally, the lever pin 716 may be received within the lever pin channels 708 and the lever collar indentations 710 such that the lever pin 716 is configured to transmit a torque or rotational motion of the lever 208 to the lever shaft 630. Thus, the lever pin 716 may cause the lever shaft 630 to rotate in response to rotation of the lever 208 (e.g., when a user engages the lever 208 and causes the lever 208 to rotate about a rotational axis extending along the lever shaft 630**).

Figure 41:
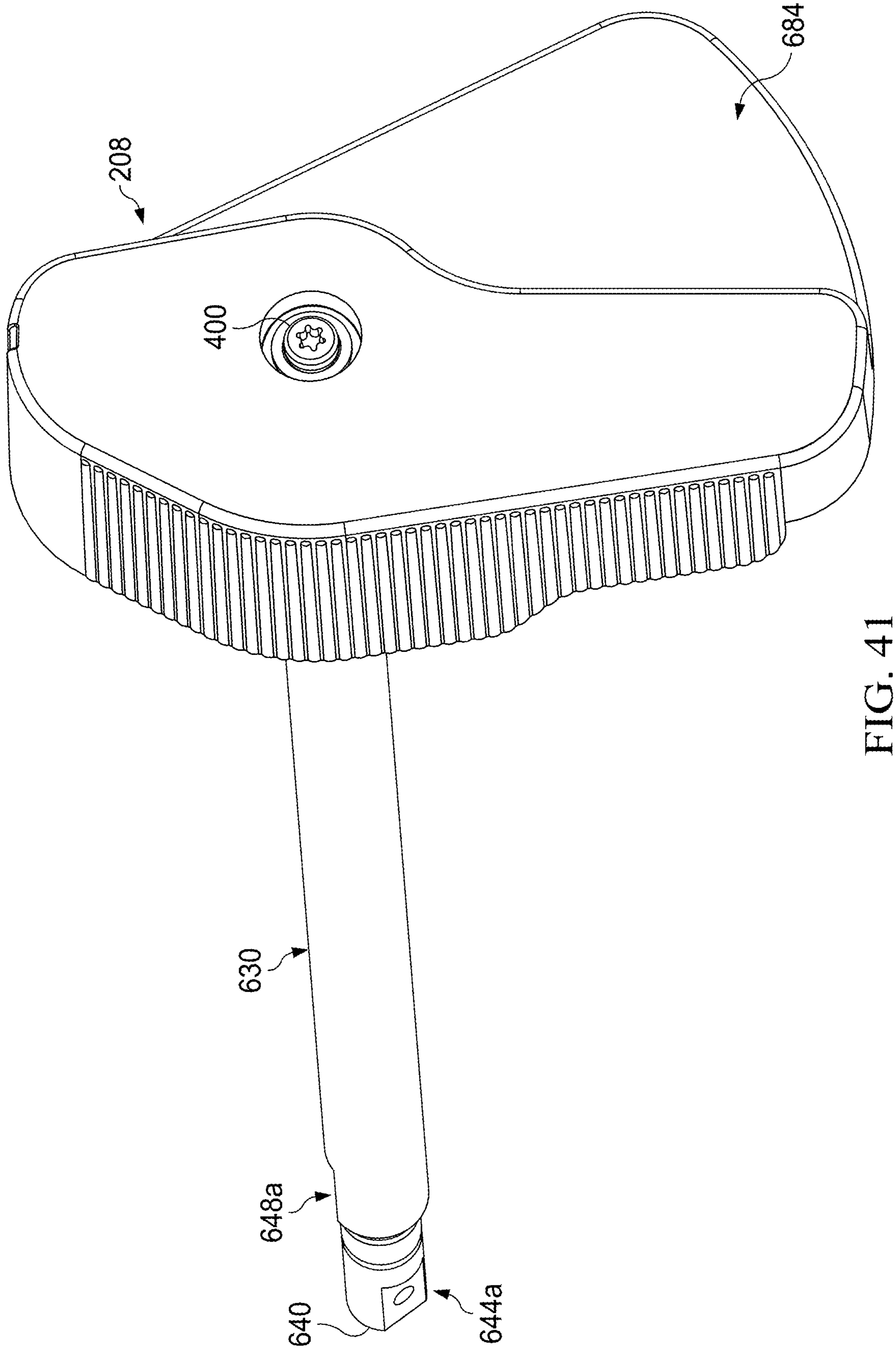
FIG. 41 illustrates a front and right side isometric view of the lever shaft of FIG. 35 with the lever of FIG. 36 connected thereto.

Turning to FIG. 41, the lever shaft connection hole 660 (see FIG. 36) may be arranged to align with the lever connection hole 680 (see FIG. 38) when the lever shaft second end 642 is received by the lever collar 692. Therefore, a fastener 400 may extend through the lever connection hole 680 and be received by the lever shaft connection hole 660 (e.g., via a threaded engagement between an exterior surface of the fastener 400 and an interior surface of the lever shaft connection hole 660), thereby coupling the lever 208 to the lever shaft 630. The fastener 400 may retain the lever shaft second end 642 in place within the lever collar 692. Thus, the lever pin may be retained within the lever pin channels 708 and lever collar indentations 710 such that engagement between the lever pin 716 and the lever 208 is maintained (see FIG. 40).

Figure 42A:
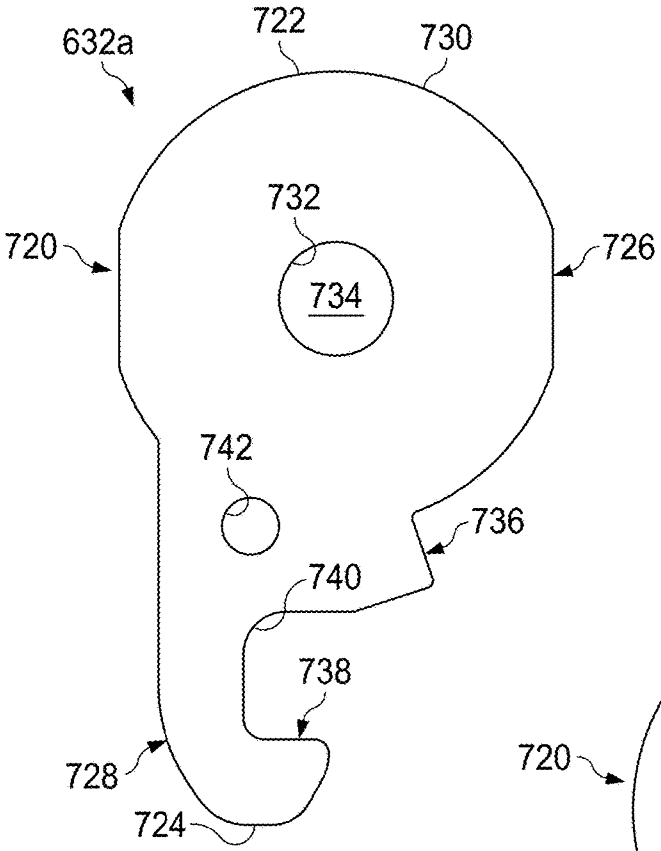
FIG. 42A illustrates a right side elevational view of a first lock member of the lever subassembly of FIG. 34.
Figure 42B:
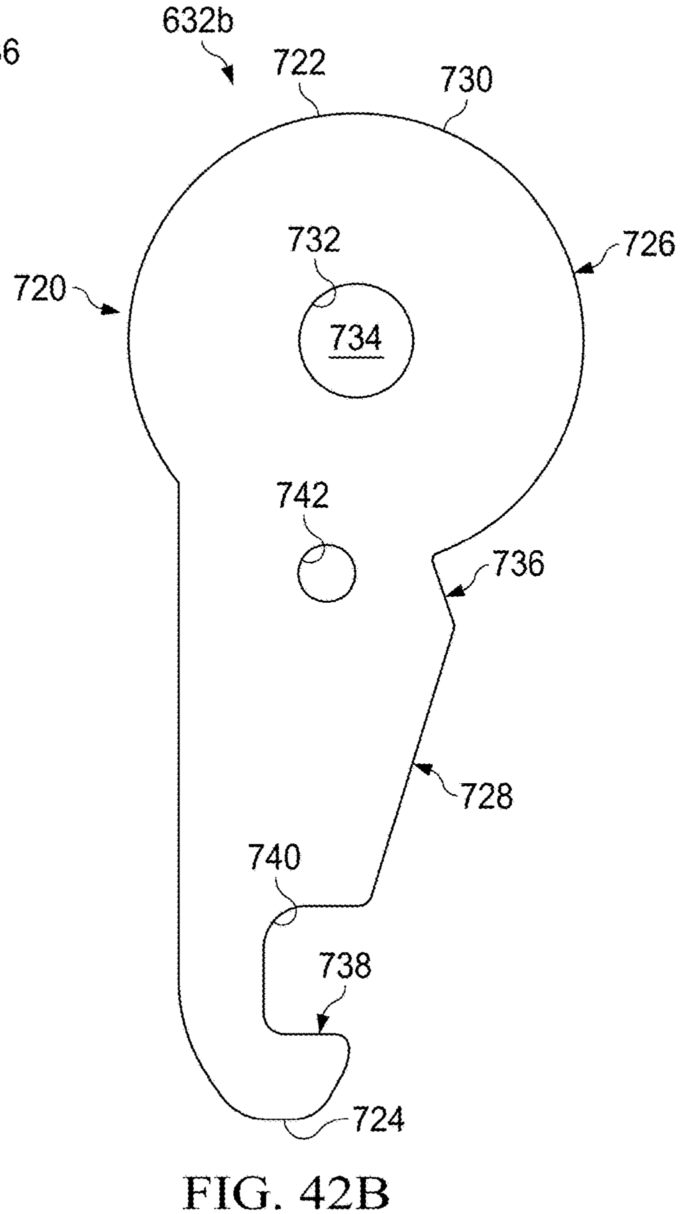
FIG. 42B illustrates a right side elevational view of a second lock member of the lever subassembly of FIG. 34.

The first lock member **632*a* (see FIG. 42A) and the second lock member 632*b* (see FIG. 42B) may each be provided in the form of a substantially key-shaped lock member body 720 defined by a lock member upper end 722 and a lock member lower end 724 opposing the lock member upper end 722. In some instances, the first lock member 632*a* and second lock member 632*b* may be provided in substantially the same form. For example, each lock member 632 may include a substantially annular bow member 726 proximate to the lock member upper end 722 and a hook member 728 connected to the bow member 726** and extending downwardly therefrom.

The bow member 726 may be defined by a bow member exterior perimeter 730 and a bow member interior perimeter 732. The bow member interior perimeter 732 may define a substantially circular lock member mounting hole 734 extending entirely through the lock member body 720. For example, the lock member mounting hole 734 may be configured to receive a portion of the lever shaft 630. In some instances, a lock member tab 736 may be positioned proximate to a juncture between the bow member exterior perimeter 730 and the hook member 728. For example, the lock member tab 736 may be provided in the form of a protruding surface oriented substantially perpendicular with respect to the bow member exterior perimeter 730. The lock member tab 736 may facilitate engagement between the lock member 632 (e.g., the first lock member **632*a* or the second lock member 632*b*) and one or more other components of the lever subassembly 206, as described below with reference to FIG. 51**.

The lock members 632 may each include a locking pin seat 738 positioned on the hook member 728 proximate to the lock member lower end 724. The locking pin seat 738 may be provided in the form of a recessed edge 740 of the hook member 728 configured to engage an adjacent locking pin 636 (e.g., first locking pin 636*a* or second locking pin 636*b*) when the lever subassembly 206 is in the default configuration (see FIG. 34). In some instances, the lock members 632 may each include a lock member opening 742 provided in the form of a substantially circular opening extending entirely through the lock member body 720. For example, the lock member opening 742 may be positioned between the bow member 726 and the hook member 728.

Figure 43:
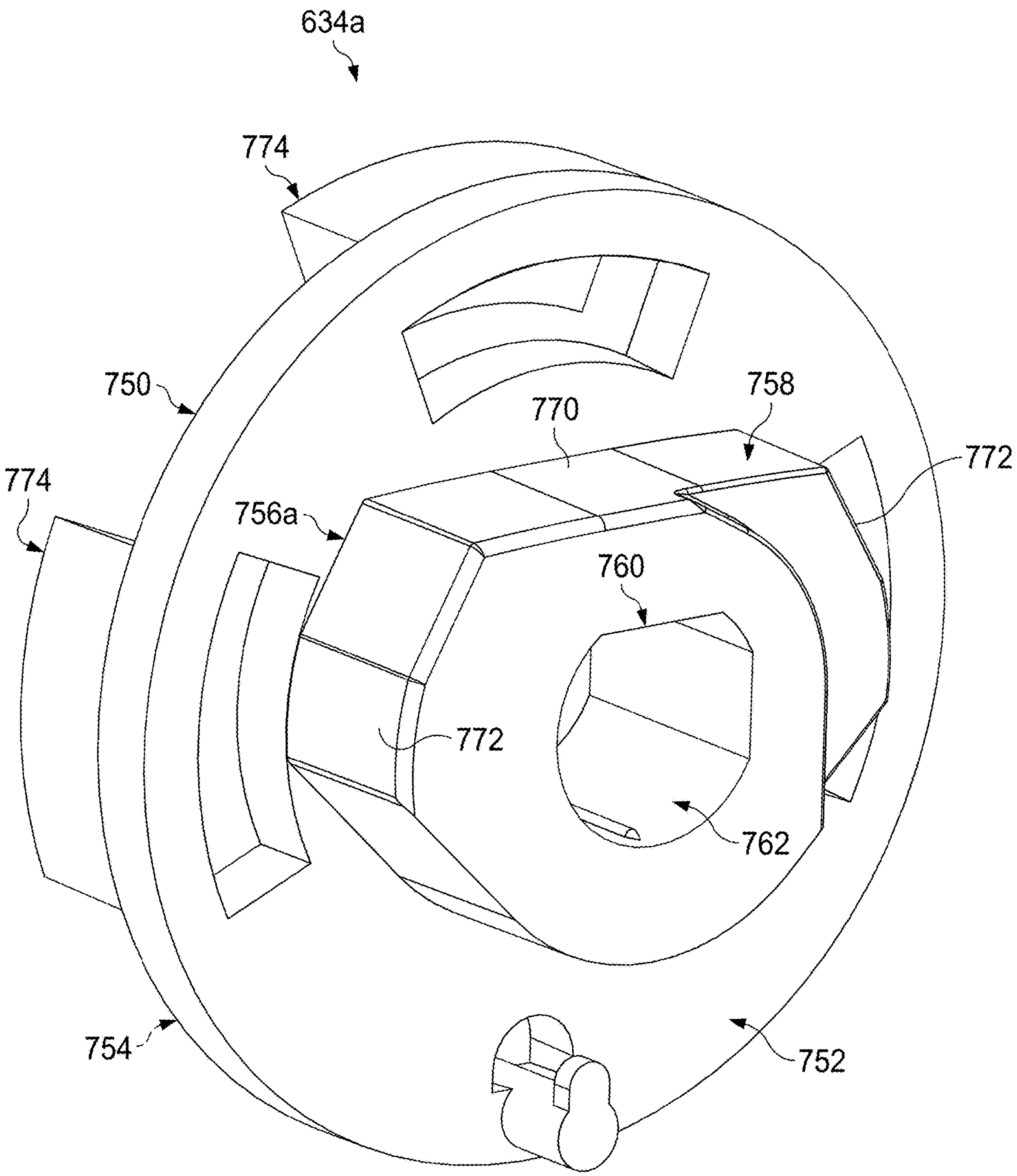
FIG. 43 illustrates a front and right side isometric view of a first lift member of the lever subassembly of FIG. 34.

Turning to FIG. 43, the first lift member 634*a* may be provided in the form of a rounded lift member body 750 defined by a cam surface 752 and a lift member rear surface 754 opposing the cam surface 752. A first lever cam 756*a* may be connected to the cam surface 752 and extend outwardly therefrom. The first lever cam 756*a* may be defined by a lever cam exterior surface 758 and a lever cam interior surface 760. The lever cam interior surface 760 may define a lift member mounting hole 762 extending entirely through the first lever cam 756*a* and the lift member body 750.

Figure 44:
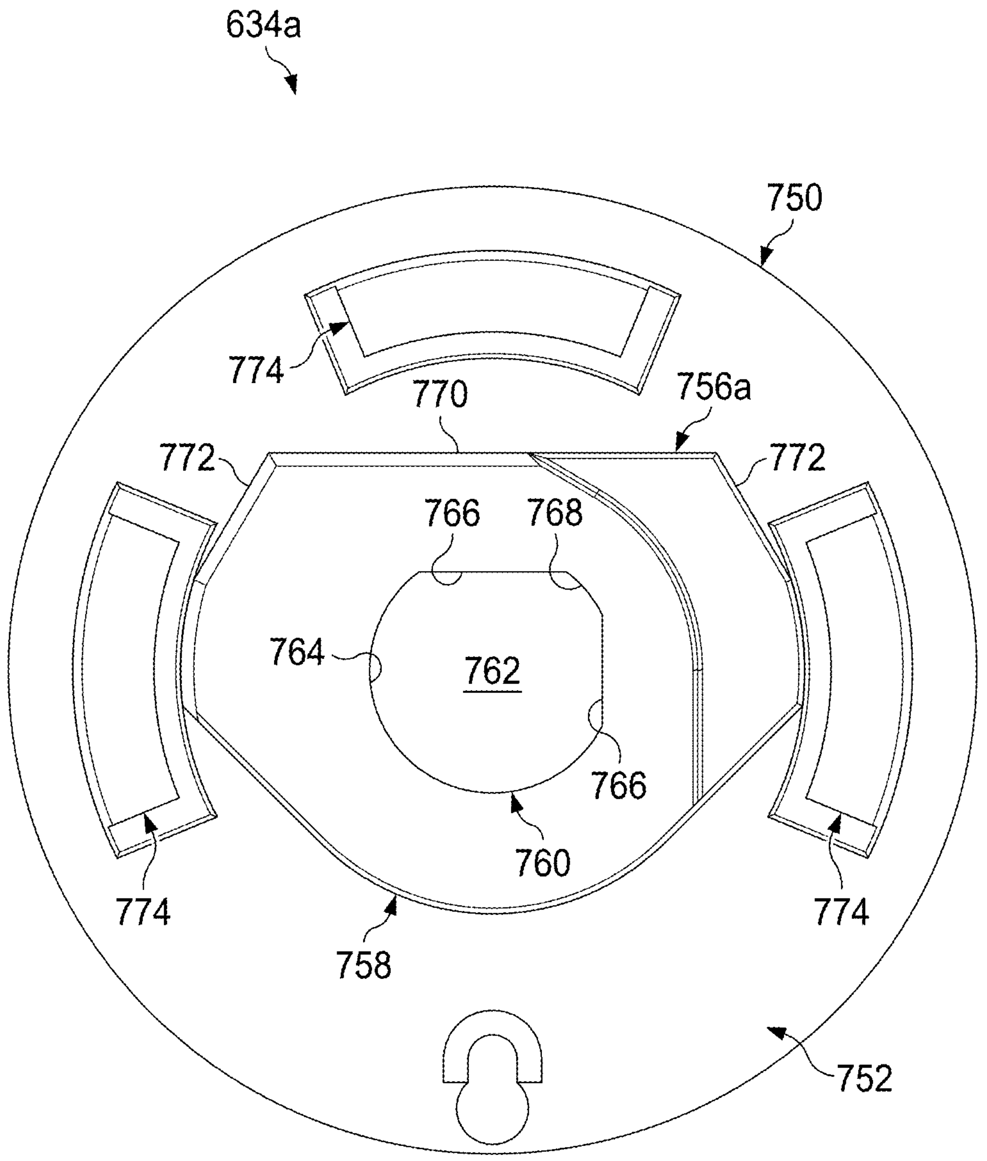
FIG. 44 illustrates a right side elevational view of the first lift member of FIG. 43.

As best shown in FIG. 44, the lever cam interior surface 760 may define the lift member mounting hole 762 such that the geometry of the lift member mounting hole 762 mirrors or complements the geometry of the lever shaft 630 at the first lever cam region 648*a* (see FIG. 35). For example, in some instances, the lever cam interior surface 760 may include a lever cam semicircular edge 764, two lever cam planar edges 766 connected to opposing ends of the lever cam semicircular edge 764, and a lever cam beveled edge 768 positioned at a juncture between the lever cam planar edges 766. Thus, the lever cam planar edges 766 and the lever cam beveled edge 768 may engage the lever shaft planar edges 656 and lever shaft beveled edge 658, respectively (see FIG. 36) when the first lift member 634*a* is installed (e.g., when the lift member mounting hole 762 receives the first lever cam region 648*a* of the lever shaft 630). In this way, the first lift member 634*a* may be prevented or restricted from rotating with respect to the lever shaft 630 when the printhead assembly 200 is in use. In other words, the first lift member 634*a* may be configured to rotate in unison with the lever shaft 630 when the printhead assembly 200 is in use.

The lever cam exterior surface 758 may be imparted with an irregular shape designed to selectively engage the associated lever impact surface 366 of the printhead holder 282 (see FIG. 14) depending on the rotational position of the lever shaft 630. In some instances, the lever cam exterior surface 758 may include a lever cam idle segment 770 and two lever cam active segments 772 connected to opposing ends of the lever cam idle segment 770. The lever cam idle segment 770 may be adjacent to the lever impact surface 366 when the lever subassembly 206 is in the default configuration (e.g., the lever cam idle segment may be configured not to engage the lever impact surface 366). On the other hand, the lever cam active segments 772 may be arranged to rotate into engagement (e.g., physical contact) with the lever impact surface 366 when the lever shaft 630 rotates. For example, the first lever cam 756 may be configured such that the lever cam active segments 772 are positioned farther away from the lift member mounting hole 762 (and thus from the lever shaft 630) than the lever cam idle segment 770. In other instances, the lever cam exterior surface 758 may be imparted with any suitable shape or structure.

Figure 45:
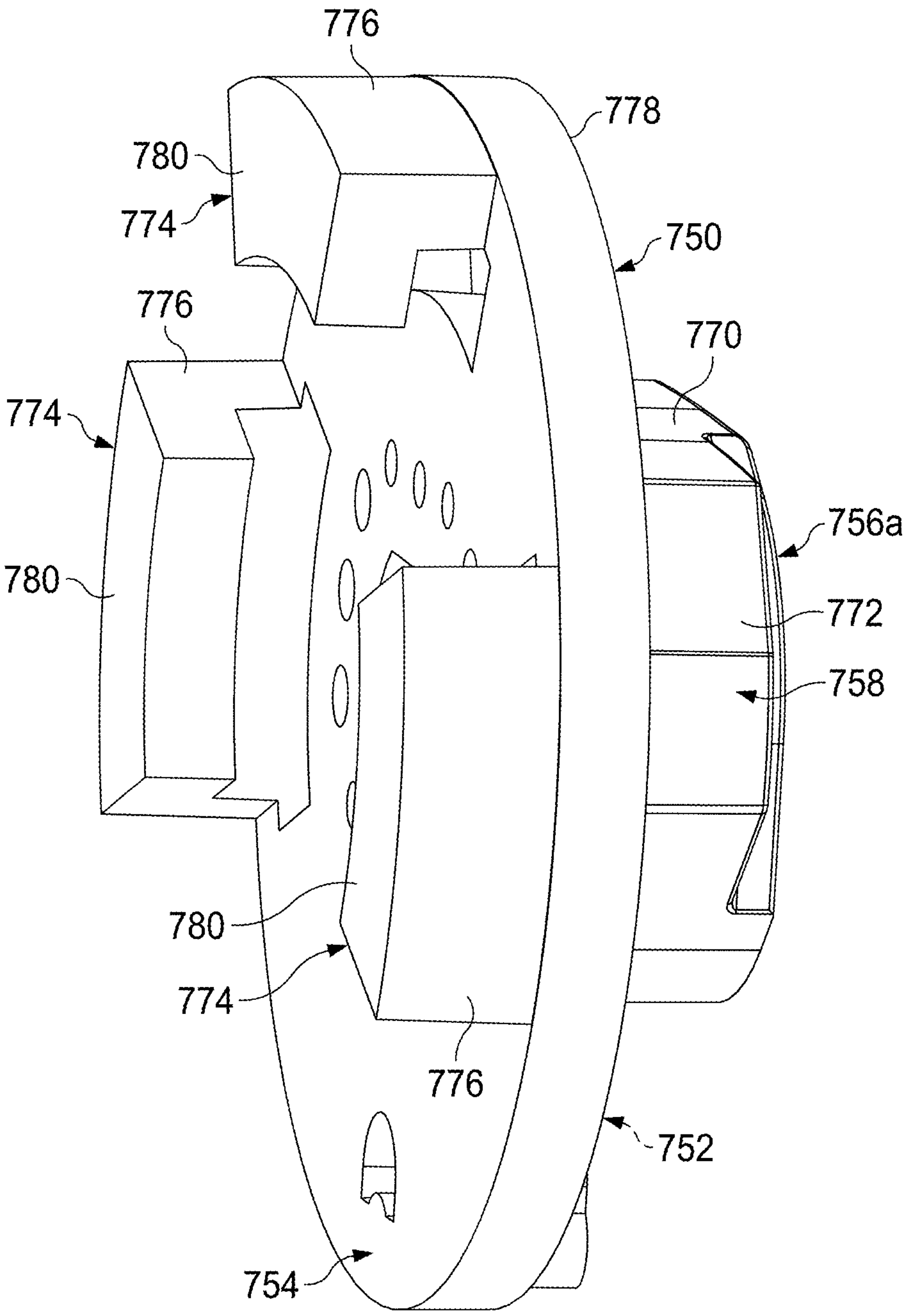
FIG. 45 illustrates a front and left side isometric view of the first lift member of FIG. 43.

Turning to FIG. 45, in some instances, the first lift member 634*a* may include one or more brackets 774 connected to the lift member rear surface 754 and extending outwardly therefrom. For example, each bracket 774 may include a bracket base member 776 connected to a peripheral edge 778 of the lift member body 750 and a bracket retention member 780 connected to the bracket base member 776 and extending inwardly therefrom (e.g., away from the peripheral edge 778). In some instances, the brackets 774 may be arranged to surround at least a portion of the bow member 726 of the first lock member 632*a* when the lever subassembly 206 is assembled (see FIG. 34).

Figure 46:
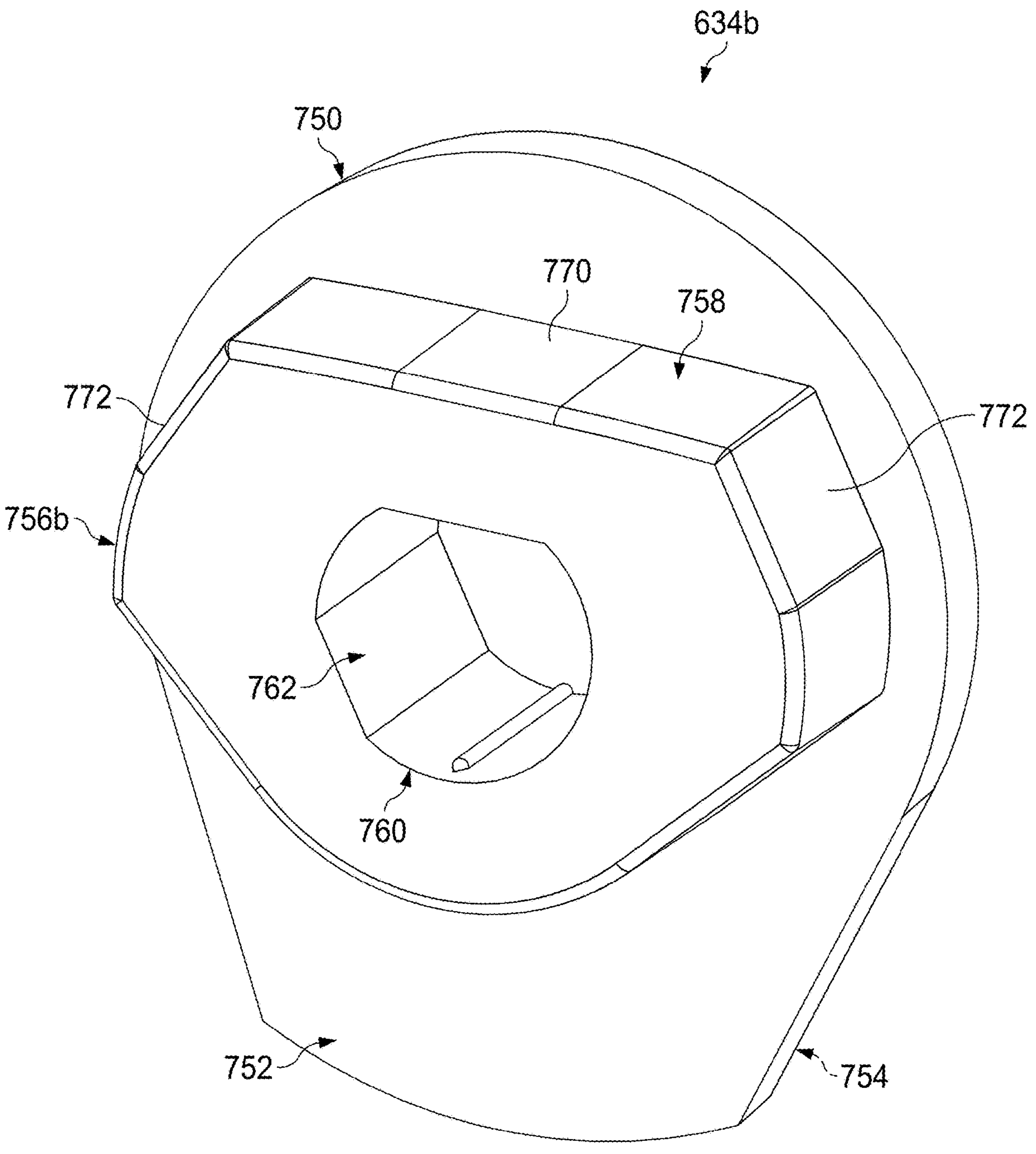
FIG. 46 illustrates a top, front, and left side isometric view of a second lift member of the lever subassembly of FIG. 34.

Turning to FIG. 46, similar to the first lift member 634*a*, the second lift member 634*b* may be provided in the form of a rounded lift member body 750 defined by a cam surface 752 and a lift member rear surface 754 opposing the cam surface 752. A second lever cam 756*b* may be connected to the cam surface 752 and extend outwardly therefrom. The second lever cam 756*b* may be provided in substantially the same form as the first lever cam 756*a*. For example, the second lever cam 756*b* may be defined by a lever cam exterior surface 758 and a lever cam interior surface 760. The lever cam interior surface 760 may define a lift member mounting hole 762 extending entirely through the second lever cam 756*b* and the lift member body 750.

Figure 47:
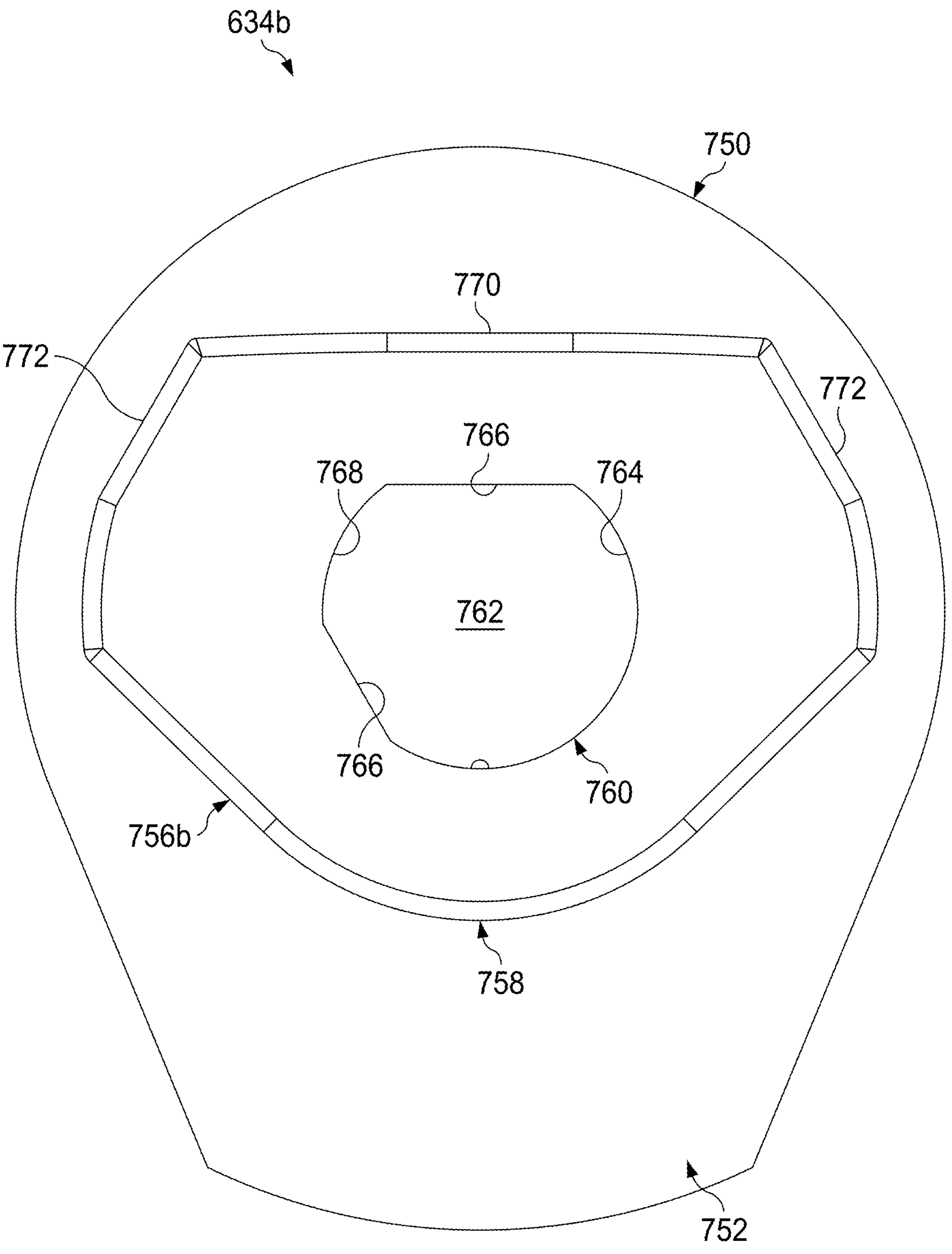
FIG. 47 illustrates a left side elevational view of the second lift member of FIG. 46.

As best shown in FIG. 47, the lever cam interior surface 760 may define the lift member mounting hole 762 such that the geometry of the lift member mounting hole 762 mirrors or complements the geometry of the lever shaft 630 at the second lever cam region 648*b* (see FIG. 35). For example, in some instances, the lever cam interior surface 760 may include a lever cam semicircular edge 764, two lever cam planar edges 766 connected to opposing ends of the lever cam semicircular edge 764, and a lever cam beveled edge 768 positioned at a juncture between the lever cam planar edges 766. Thus, the lever cam planar edges 766 and the lever cam beveled edge 768 may engage the lever shaft planar edges 656 and lever shaft beveled edge 658, respectively (see FIG. 36) when the second lift member 634*b* is installed (e.g., when the lift member mounting hole 762 receives the second lever cam region 648*b* of the lever shaft 630). In this way, the second lift member 634*b* may be prevented or restricted from rotating with respect to the lever shaft 630 when the printhead assembly 200 is in use. In other words, the first lift member 634*a* may be configured to rotate in unison with the lever shaft 630 when the printhead assembly 200 is in use.

Figure 48:
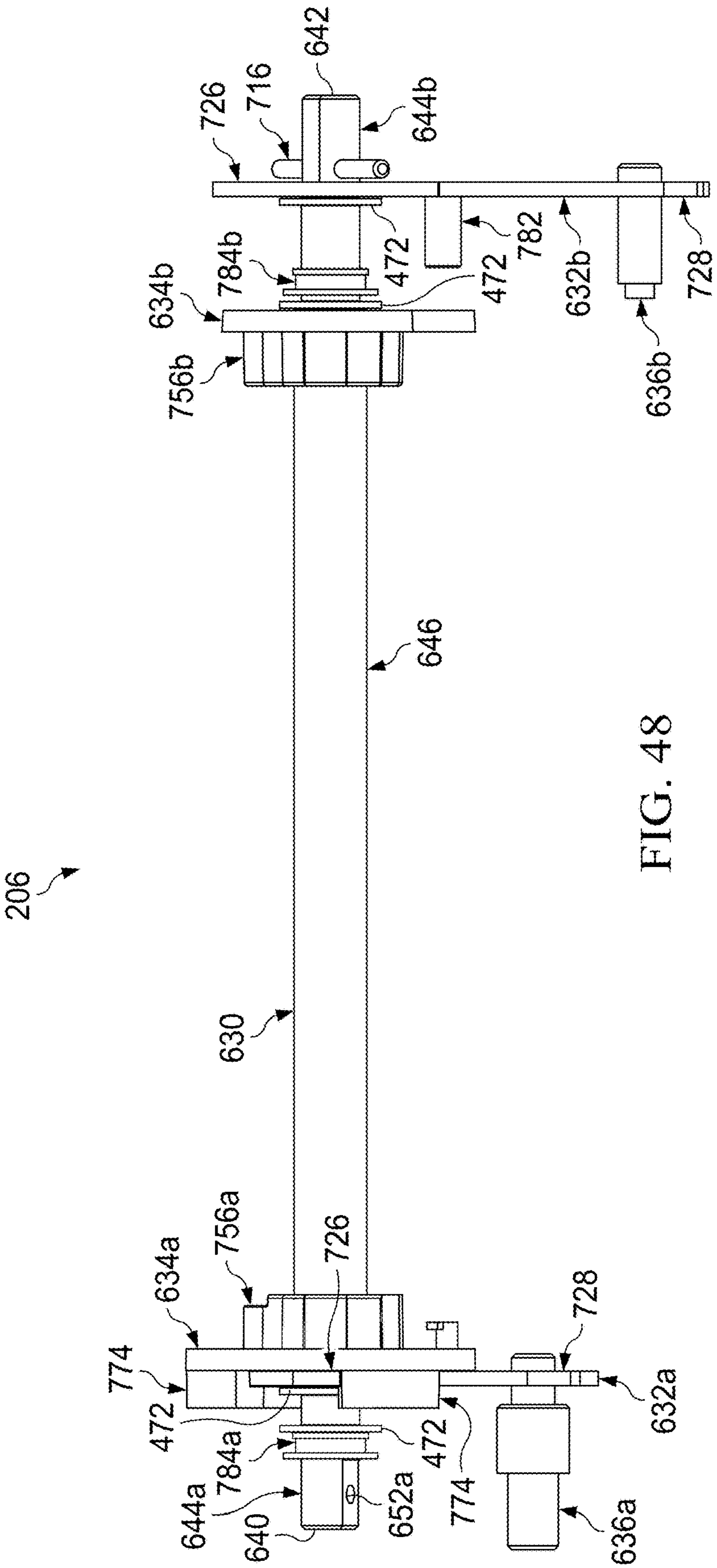
FIG. 48 illustrates a front elevational view of a portion of the lever subassembly of FIG. 34.

Turning to FIG. 48, the lever subassembly 206 is depicted with the lever 208 removed. The first lift member 634*a* may be positioned on the first lever cam region 648*a* and the second lift member 634*b* may be positioned on the second lever cam region 648*b* (see FIG. 35). The first lock member 632*a* may be positioned on the first lever shaft notched region 644*a* adjacent to the first lift member 634*a*. For example, the first lock member 632*a* may abut the first lever cam region 648*a* (see FIG. 35) such that the bow member 726 of the first lock member 632*a* is positioned within (e.g., at least partially surrounded by) the brackets 774 of the first lift member 634*a* (see also FIG. 34). The second lock member 632*b* may be positioned between the second lift member 634*b* and the lever shaft second end 642. For example, the second lock member 632*b* may be positioned on the second lever shaft notched region 644*b* adjacent to the lever pin 716. The hook member 728 of the first lift member 634*a* may engage the first locking pin 636*a* and the hook member 728 of the second lift member 634*b* may engage the second locking pin 636*b*. In some instances, the second lock member 632*b* may include a second lock member pin 782 positioned within or coupled to the lock member opening 742 (see FIG. 42B) and extending inwardly therefrom (e.g., toward the lever shaft first end 640). The lever shaft central region 646 may extend between the first lever cam 756*a* and the second lever cam 756*b*.

The lever subassembly 206 may include one or more lever shaft bearings 784 and one or more washers 472 positioned along the lever shaft 630. The lever shaft bearings 784 may be arranged to facilitate rotation of the lever shaft 630 with respect to one or more other components of the printhead assembly 200 when the printhead assembly 200 is in use. In some instances, a first lever shaft bearing 784*a* positioned proximate to the lever shaft first end 640 may facilitate rotation of a portion of the lever shaft 630 disposed within the side plate lever shaft hole 584*d* (see FIG. 30) when the printhead assembly 200 is in use. A second lever shaft bearing 784*b* positioned proximate to the lever shaft second end 642 may facilitate rotation of a portion of the lever shaft 630 disposed within the casing lever shaft hole 240 (see FIG. 9) when the printhead assembly 200 is in use. In other instances, any number of lever shaft bearings 784 may be positioned along the lever shaft 630 in any suitable arrangement. Washers 472 may be received by the washer grooves 462 of the lever shaft 630 and may be arranged to prevent tracking or unintentional movement of the lock members 632, the lift members 634, and/or the lever shaft bearings 784 along the lever shaft 630 while the printhead assembly 200 is in use.

Figure 49:
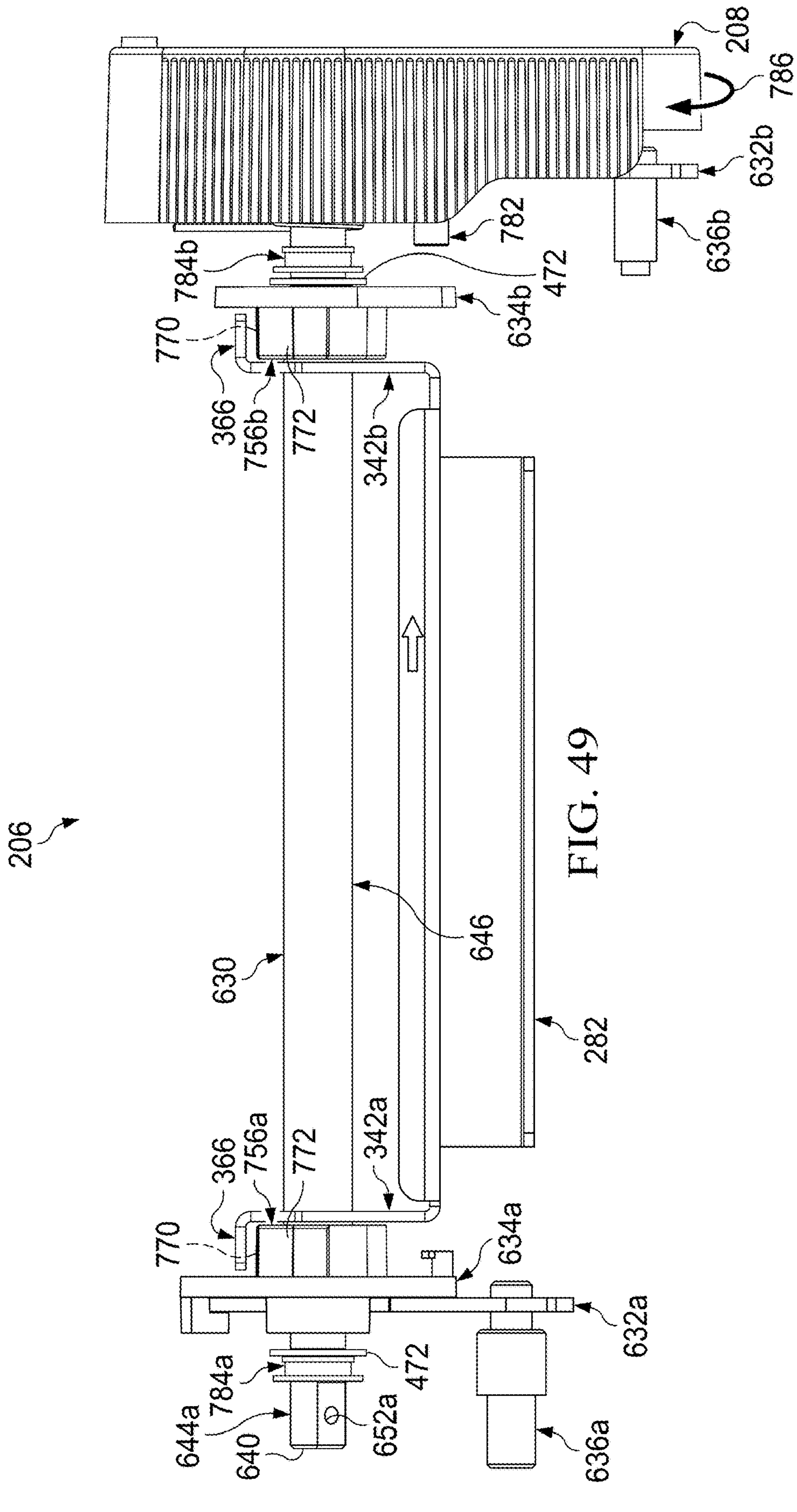
FIG. 49 illustrates a front elevational view of the lever subassembly of FIG. 34 positioned to engage the printhead holder of FIG. 13.

Turning to FIG. 49, the lever shaft 630 may extend through the lever shaft opening 358 positioned on the first printhead holder sidewall 342*a* and the second printhead holder sidewall 342*b* (see FIG. 14) when the printhead assembly 200 is assembled. In some instances, the first printhead holder sidewall 342*a* may be positioned along the lever shaft central region 646 adjacent to the first lever cam 756*a*, and the second printhead holder sidewall 342*b* may be positioned along the lever shaft central region 646 adjacent to the second lever cam 756*b*. Thus, the first and second lever cams 756*a*, 756*b* may each be positioned to lift or elevate the printhead holder 282 by engaging the adjacent lever impact surface 366.

For each of the first and second lever cams 756*a*, 756*b*, the lever cam idle segment 770 may be adjacent to the lever impact surface 366 such that the lever cam 756 does not engage the printhead holder 282 when the lever subassembly 206 is in the default configuration, as shown in FIG. 49. However, the lever cam active segments 772 may be positioned to engage the lever impact surface 366 when the lever subassembly 206 is operated. For example, a user may operate the lever subassembly 206 (e.g., to open the printhead assembly 200) by pressing the lever 208 in the direction of a second arrow 786. The lever shaft 630 and the lift members 634 positioned thereon may rotate in response to movement of the lever 208 due to engagement between the lever pin 716, the lever shaft 630, and the lever 208, as described above with reference to FIG. 40. Thus, the lever subassembly 206 may be converted to lift configuration as the first lever cam 756*a* and the second lever cam 756*b* rotate into engagement with the printhead holder 282. For example, one of the lever cam active segments 772 may impact and/or apply an upward force to the adjacent lever impact surface 366 when the lever subassembly 206 is in the lift configuration (see FIG. 50B).

Figure 50A:
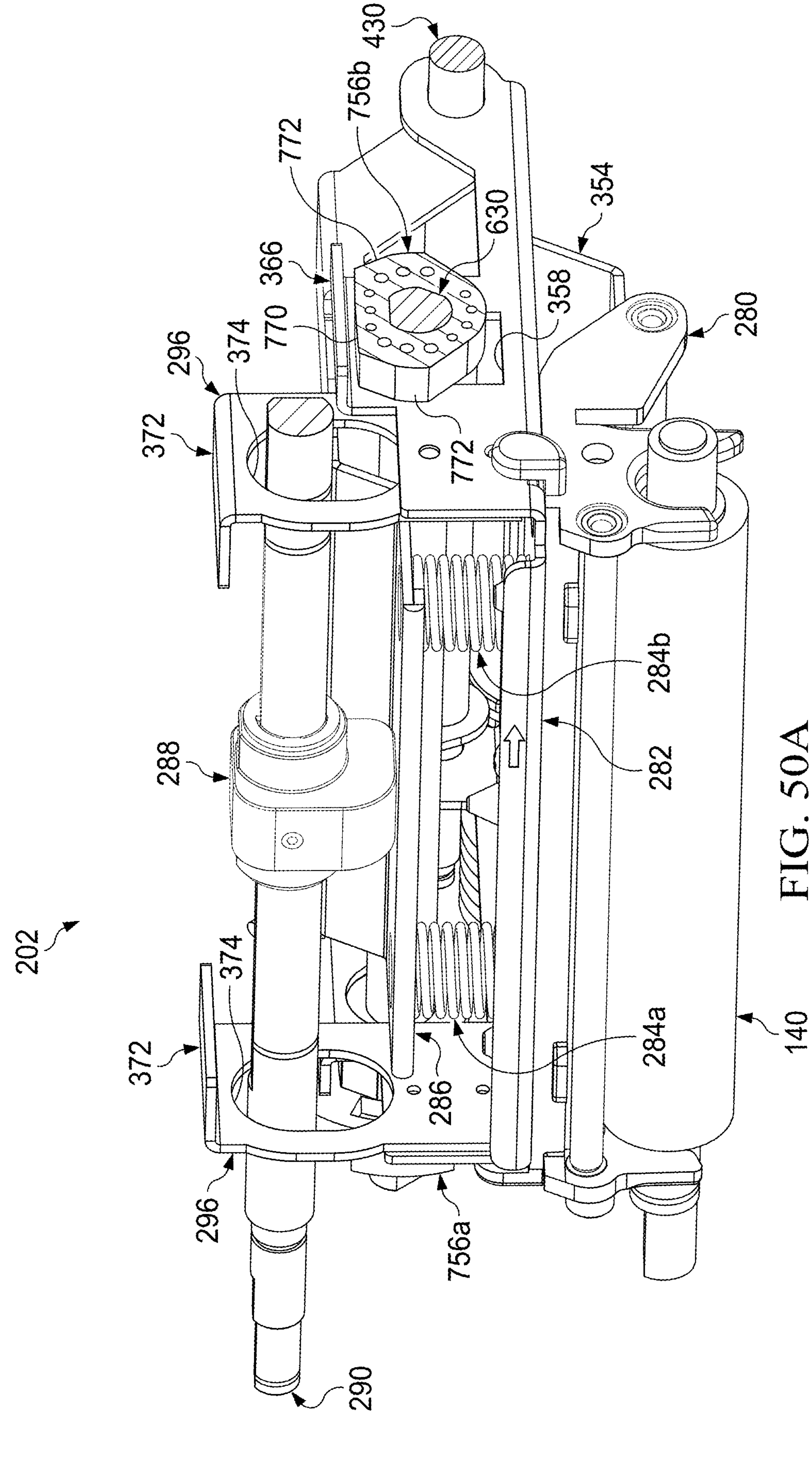
FIG. 50A illustrates a front and right side isometric view of the printhead module of FIG. 10 in combination with a platen roller and with the lever subassembly of FIG. 34 in a first configuration.

FIG. 50A depicts the printhead module 202 including the lever subassembly 206 in the default configuration. As shown, the lever cam idle segment 770 is adjacent to the lever impact surface 366 such that the lever subassembly 206 does not engage the printhead holder 282. Therefore, the printhead 138 may occupy the lowered position and engage the platen roller 140 (e.g., by applying a nip force thereto) when the lever subassembly 206 is in the default configuration.

Figure 50B:
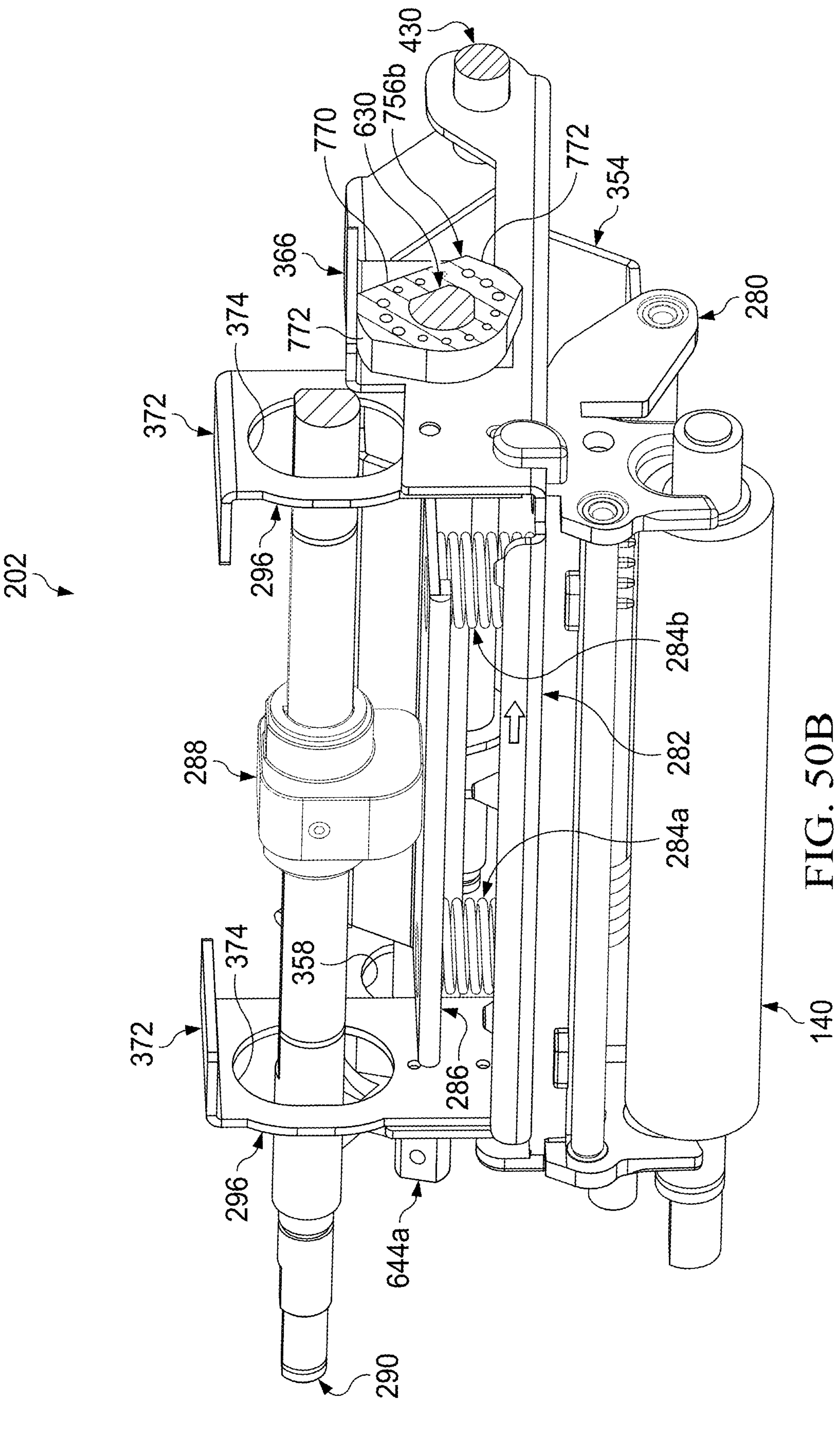
FIG. 50B illustrates a front and right side isometric view of the printhead module of FIG. 10 in combination with a platen roller and with the lever subassembly of FIG. 34 in a second configuration.

FIG. 50B depicts the printhead module 202 including the lever subassembly 206 in the lifted configuration (e.g., after a user presses or rotates the lever 208 in the direction of the second arrow 786 shown in FIG. 49). As shown, the lever cam idle segment 770 has rotated away from the lever impact surface 366 such that the lever cam active segment 772 impacts and engages the lever impact surface 366, thereby applying an upward force to the printhead holder 282. As described above with reference to FIG. 16, the printhead 138, docking plate 280, printhead holder 282, and/or other components of the printhead assembly 200 may be coupled together and configured to move as a unit. Therefore, engagement between the first and second lever cams 756*a*, 756*b* and the lever impact surfaces 366 may lift or elevate the printhead holder 282 and/or other components of the printhead module 202 connected thereto. In this way, the printhead 138 may transition from the lowered position to the lifted position when the lever subassembly 206 transitions from the default configuration to the lifted configuration.

Figure 51:
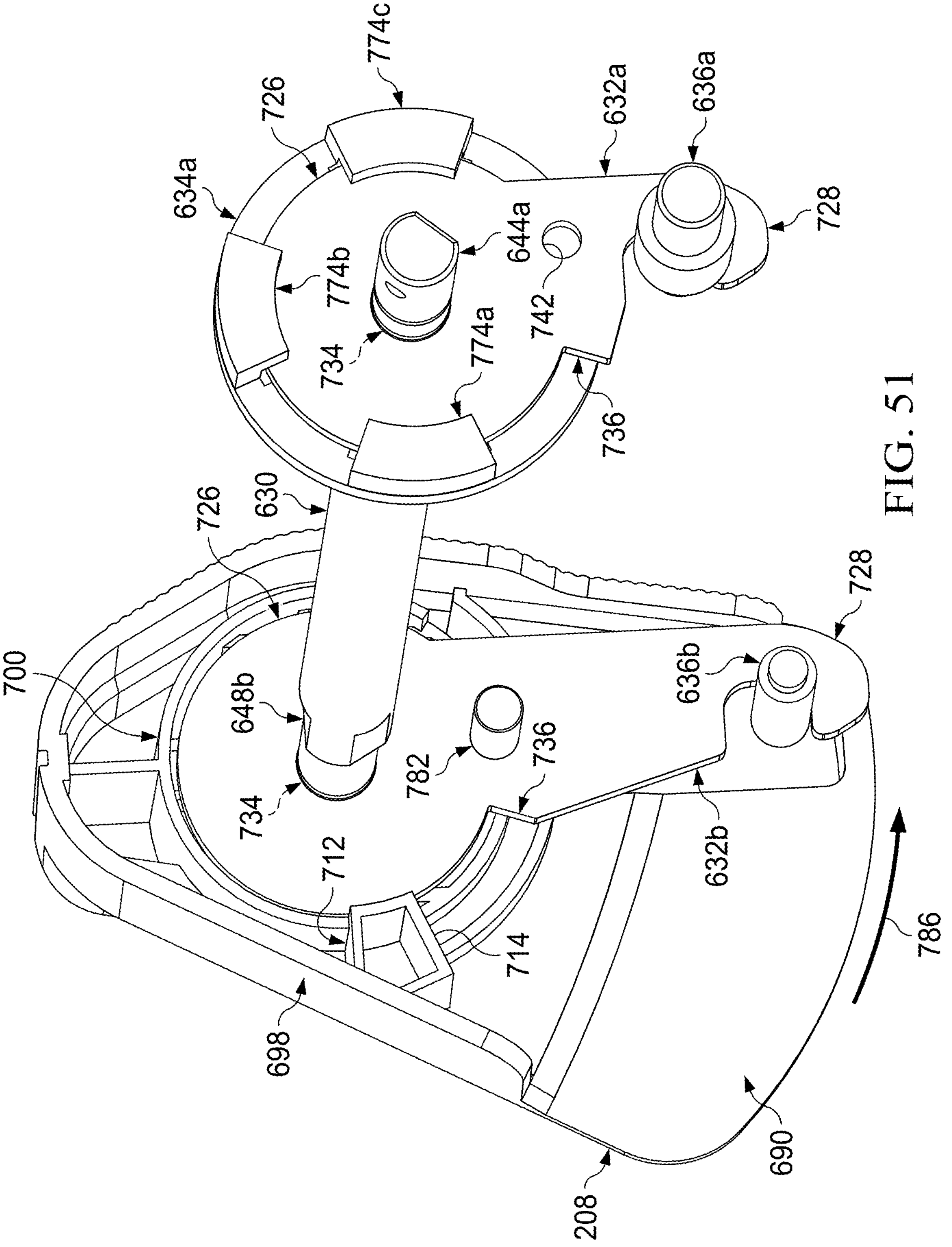
FIG. 51 illustrates a front and right side isometric view of a portion of the lever subassembly of FIG. 34.

Turning now to FIG. 51, the lock members 632 may remain stationary (e.g., engaging the locking pins 636) while the lever subassembly 206 moves from the default configuration to the lift configuration, as described above with reference to FIGS. 49-50B. In some instances, the lock member mounting hole 734 of the first lock member 632*a* and the lock member mounting hole 734 of the second lock member 632*b* may be configured to permit the lever shaft 630 to rotate with respect to the lock members 632. Thus, the lock members 632 may not immediately rotate in response to rotation of the lever shaft 630 in the same manner as the lift members 634. Instead, the lock members 632 may remain in place until impacted or engaged by another component of the lever subassembly 206 (e.g., via the lock member tabs 736).

When the printhead 138 is in the lowered position, the nip force (e.g., generated by the springs 284) pressing the printhead 138 into the platen roller 140, as described above with reference to FIG. 10, may be at least partially transmitted to the lever subassembly 206. In some instances, the nip force may increase the strength of the engagement between the first and second lock members 632*a*, 632*b* and the first and second locking pins 636*a*, 636*b*, respectively. For example, the nip force may hold or press the hook members 728 against the locking pins 636 with a substantial force. Thus, a substantial resistance may need to be overcome in order to move the lock members 632 out of engagement with the locking pins 636 while the printhead 138 is in the lowered position.

The force required to operate the lever subassembly 206 (e.g., to open the printhead assembly 200) may be significantly reduced by allowing the lock members 632 to remain stationary (e.g., engaging the locking pins 636) while the lift members 634 rotate into engagement with the printhead holder 282 and move the printhead 138 to the lifted position, thereby reducing or eliminating the resistance supplied by the nip force.

For example, the lever subassembly 206 may be configured such that engagement between the lock members 632 and the locking pins 636 is not interrupted as the lever subassembly 206 moves from the default configuration to the lift configuration. Once the lever subassembly 206 is moved to the lift configuration, a user may continue to operate the lever subassembly 206 (e.g., by rotating the lever 208 in the direction of the second arrow 786) to disengage the lock members 632 from the locking pins 636 without being opposed by the nip force or otherwise needing to overcome a resistance generated by engagement between the printhead 138 and the platen roller 140.

In some instances, a portion of the first lift member 634*a* may be configured to engage the first lock member 632*a* once the printhead 138 has been moved to the lifted position. For example, in some instances, the first lift member 634*a* may include three brackets 774 including a first bracket 774*a*, a second bracket 774*b*, and a third bracket 774*c*, each bracket arranged to surround at least a portion of the bow member 726 of the first lock member 632*a*. The first bracket 774*a* may be positioned proximate to and arranged for engagement with the lock member tab 736 of the first lock member 632*a*. In other instances, the first lift member 634*a* may have any number of brackets 774 or the first lift member 634*a* may include additional or alternative components, provided that a portion of the first lift member 634*a* is arranged to engage the first lock member 632*a* once the printhead 138 occupies the lifted position.

The first lift member 634*a* may be configured to rotate in unison with the lever shaft 630 when the lever 208 rotates in the direction of the second arrow 786, whereas the first lock member 632*a* may initially remain stationary with respect to the lever shaft 630. Thus, the first bracket 774*a* may be configured to approach the lock member tab 736 while the lever cams 756 rotate into engagement with the printhead holder 282 to lift the printhead 138 (e.g., while the lever subassembly 206 moves from the default configuration to the lift configuration). Once the printhead 138 is in the lifted position, the first bracket 774*a* may then engage (e.g., impact) the lock member tab 736 of the first lock member 632*a* and cause the hook member 728 to disengage the first locking pin 636*a* as the lever 208 continues to rotate in the direction of the second arrow 786.

In some instances, the lever impact member 712 on the lever interior surface 690 may be configured to engage the second lock member 632*b* in a similar fashion once the printhead 138 has been moved to the lifted position. For example, the lever impact member 712 may be arranged on the lever interior surface 690 such that the lever impact surface 714 is positioned proximate to and arranged for engagement with the lock member tab 736 of the second lock member 632*b*. The second lock member 632 may initially remain stationary while the lever 208 and the lever shaft 630 rotate in the direction of the second arrow 786. Thus, the lever impact surface 714 may approach the lock member tab 736 of the second lock member 632*b* while the lever cams 756 rotate into engagement with the printhead holder 282 to lift the printhead 138. Once the printhead 138 is in the lifted position, the lever impact surface 714 may then engage the lock member tab 736 and cause the hook member 728 of the second lock member 632*b* to disengage the second locking pin 636*b* as the lever 208 continues to rotate in the direction of the second arrow 786.

Similarly, when closing the printhead assembly 200, the printhead 138 may remain in the lifted position until the lock members 632 have been lowered to reengage the locking pins 636. For example, the first bracket 774*a* of the first lift member 634*a* may remain in contact with the lock member tab 736 of the first lock member 632*a* and the lever impact surface 714 may remain in contact with the lock member tab 736 of the second lock member 632*b* while the printhead assembly 200 is moved from the open position to the closed position. When the printhead assembly 200 returns to the closed position, the hook members 728 may reengage the locking pins 636 (e.g., a user may rotate the lever 208 in a direction opposite the direction of the second arrow 786). The lever subassembly 206 may remain in the lift configuration (see FIG. 50B) until the lock members 632 are lowered such that the recessed edge 740 of each of the hook members 728 can receive the associated locking pin 636. Therefore, the lever subassembly 206 may be configured such that it is not necessary to oppose the nip force when closing the printhead assembly 200 (e.g., by applying a downward force to the casing 204). The lever subassembly 206 may return to the default configuration after the lock members 632 have reengaged the locking pins 636, thereby lowering the printhead 138 into engagement with the platen roller 140 and reestablishing the nip force.

In this way, the lever subassembly 206 may reduce or eliminate the resistance a user experiences when opening or closing the printhead assembly 200 due to the nip force applied by the printhead 138. For example, the lever subassembly 206 may retain the printhead 138 in the lifted position via engagement between the lift members 634 and the printhead holder 282 (i) when the hook members 728 rotate out of engagement with the locking pins 636 (e.g., as a user rotates the lever 208 in the direction of the second arrow 786 to open the printhead assembly 200), and (ii) when the hook members 728 rotate back into engagement with the locking pins 636 (e.g., as a user presses down on the casing 204 to close the printhead assembly 200 and the lever 208 rotates in a direction opposite the direction of the second arrow 786).

Figure 52:
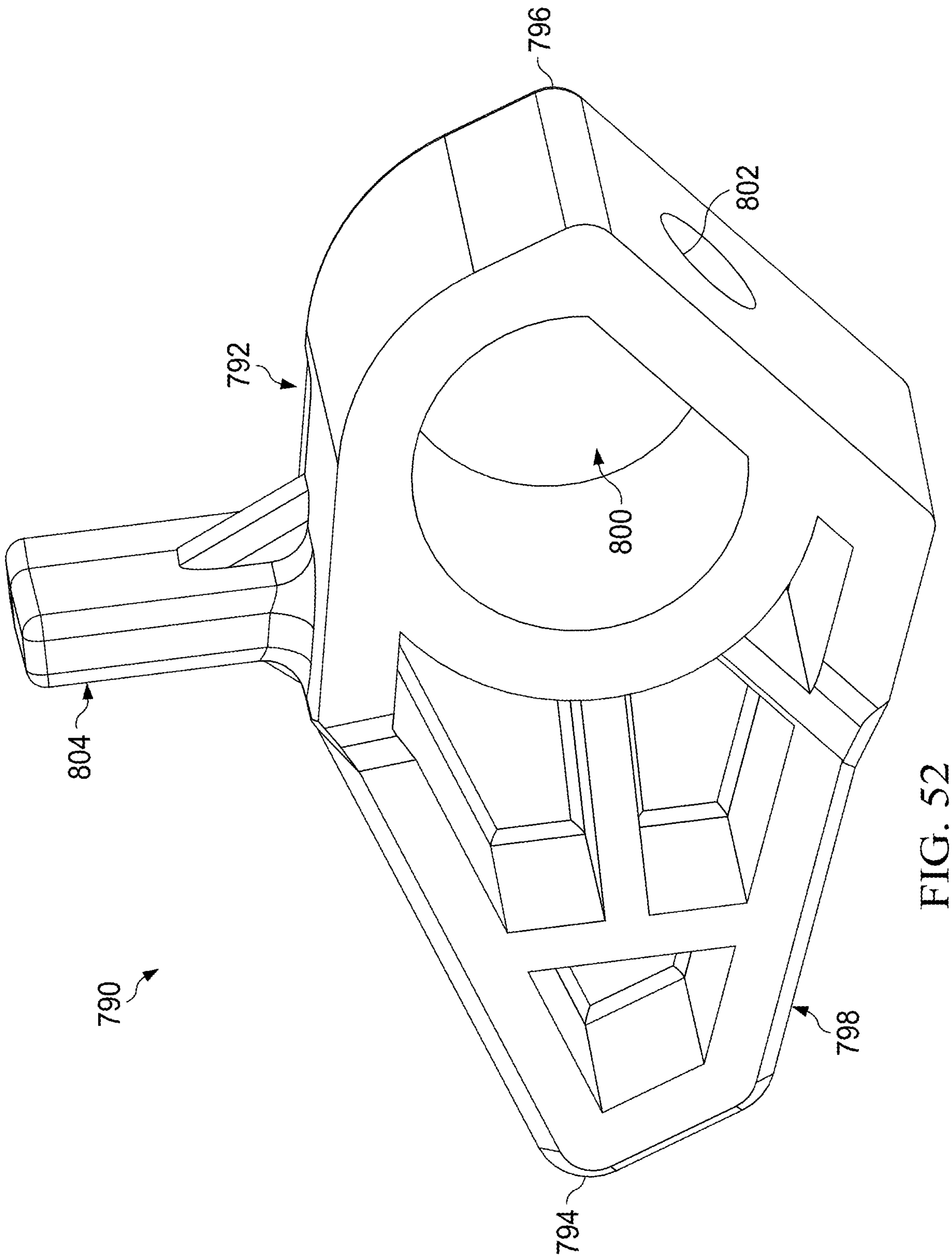
FIG. 52 illustrates a top, front, and right side isometric view of a lever shaft appendage of the printhead assembly of FIG. 5.

Turning to FIG. 52, a lever shaft appendage 790 designed to be installed on the first lever shaft notched region 644*a* (see FIG. 35) may be provided in the form of a substantially curvilinear appendage body 792 defined by an appendage first end 794 and an appendage second end 796 opposing the appendage first end 794. An appendage impact member 798 provided in the form of a substantially rectilinear protrusion may be positioned at the appendage first end 794. An appendage mounting hole 800 provided in the form of an opening imparted with the shape of a partial cylinder may be positioned proximate to the appendage second end 796 and extend entirely through the appendage body 792. The appendage mounting hole 800 may be imparted with a geometry that mirrors or complements the geometry of the first lever shaft notched region 644*a* such that the lever shaft appendage 790 is configured to rotate with the lever shaft 630 when installed thereon. An appendage fastener hole 802 arranged to facilitate coupling between the lever shaft appendage 790 and the lever shaft 630 may be provided in the form of a substantially circular opening extending entirely between the appendage mounting hole 800 and the appendage second end 796.

In some instances, the lever shaft appendage 790 may include an appendage arm 804 positioned on the appendage body 792 between the appendage first end 794 and the appendage second end 796 and extending outwardly therefrom. In other instances, the appendage arm 804 may be omitted.

Figure 53:
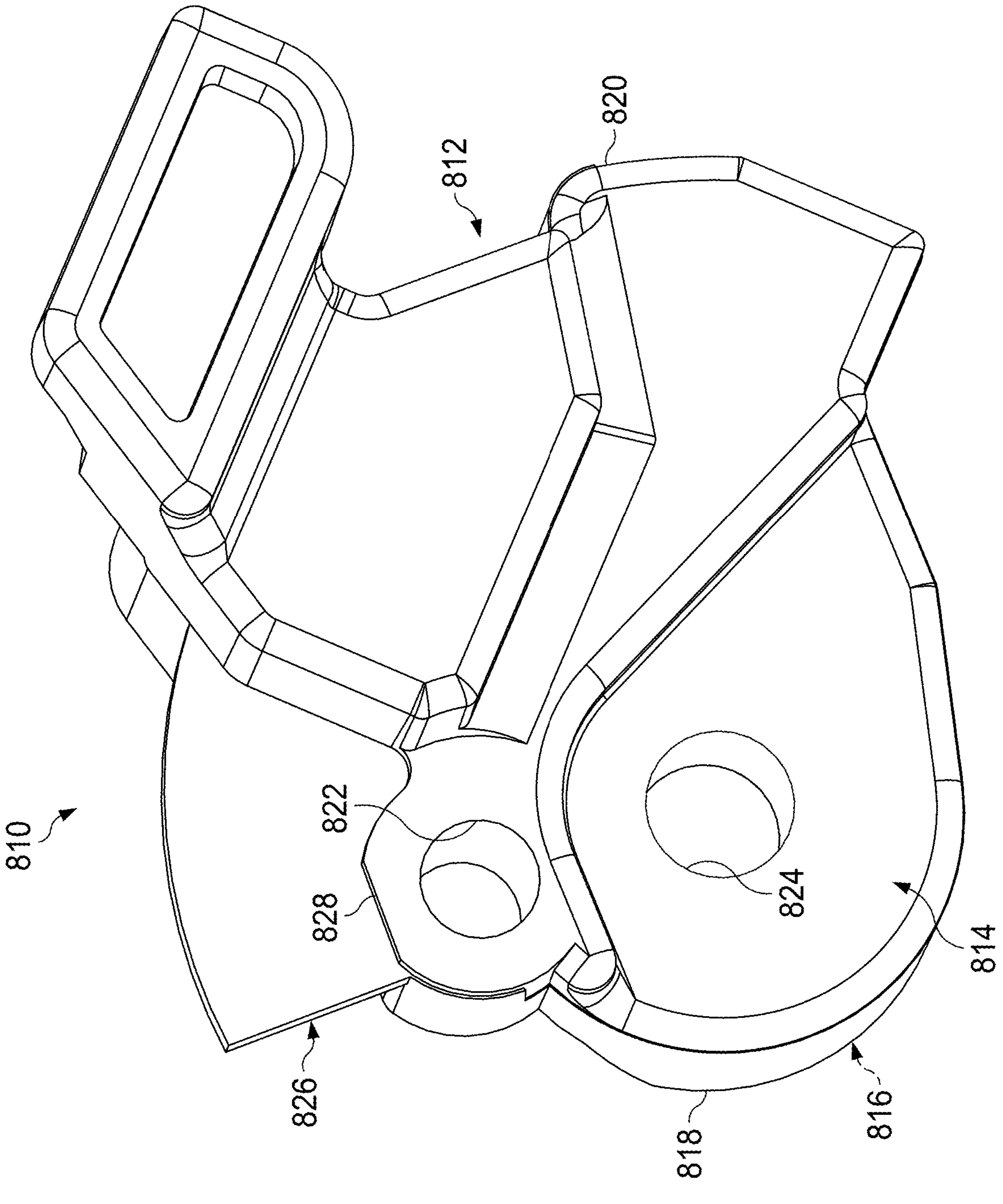
FIG. 53 illustrates a front and left side isometric view of a stopper of the printhead assembly of FIG. 5.

Turning to FIG. 53, a stopper 810 may be coupled to the side plate 570 (e.g., via the side plate stopper hole 584*f* shown in FIG. 30) and arranged to be engaged by the lever shaft appendage 790. The stopper 810 may be provided in the form of a substantially curvilinear stopper body 812 defined by a stopper front surface 814 and a stopper rear surface 816 opposing the stopper front surface 814. The stopper front surface 814 and the stopper rear surface 816 may each extend between a stopper first end 818 and a stopper second end 820 opposing the stopper first end 818. In some instances, the stopper 810 may include a first stopper hole 822 and a second stopper hole 824 positioned proximate to the stopper first end 818. The first and second stopper holes 822, 824 may each be provided in the form of a substantially circular opening extending entirely through the stopper body 812. In some instances, the stopper 810 may include a stopper sensor flag 826 provided in the form of a substantially planar panel connected to a peripheral edge 828 of the stopper body 812 (e.g., proximate to the stopper first end 818) and extending outwardly therefrom.

Figure 54:
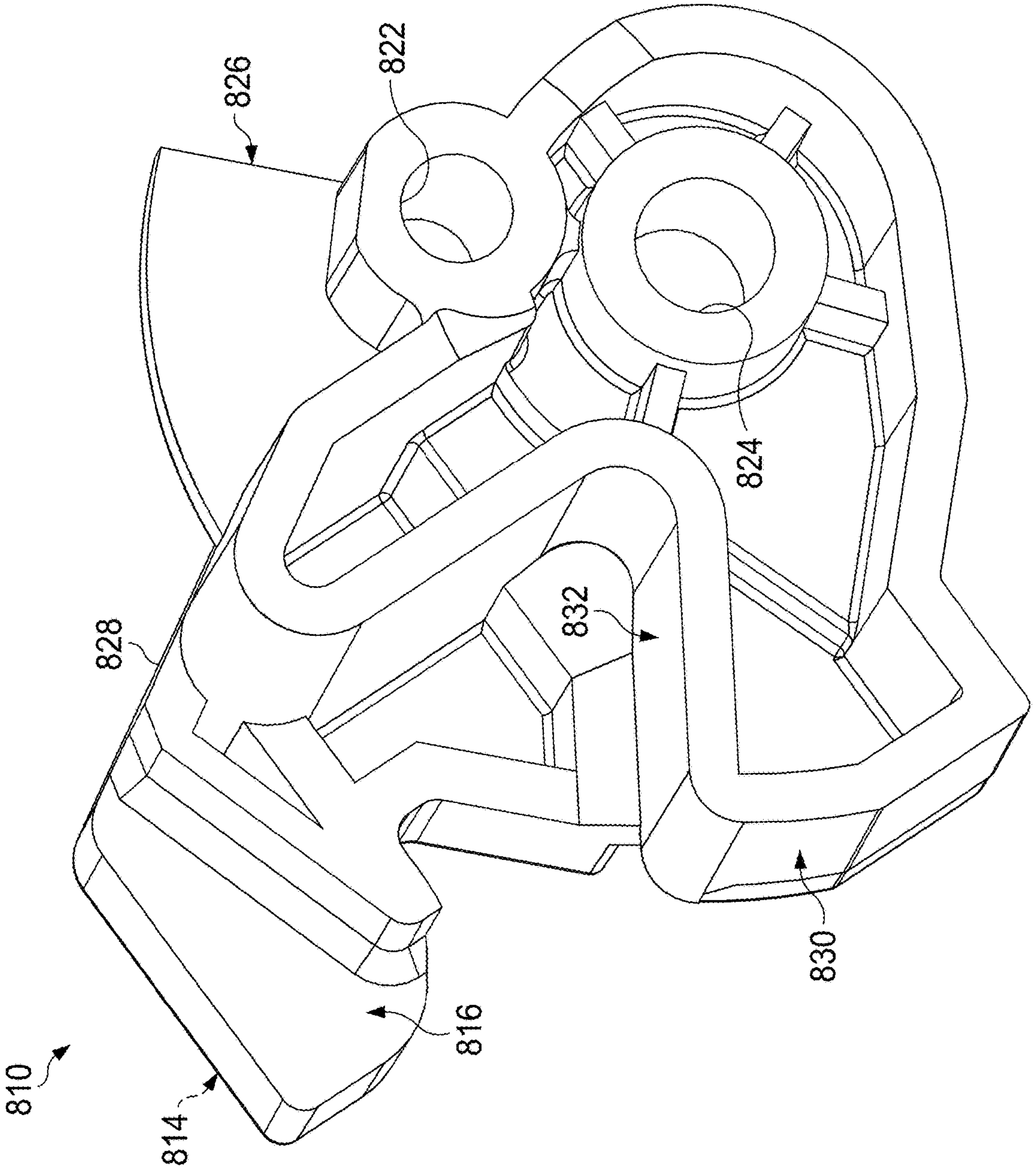
FIG. 54 illustrates a rear and right side isometric view of the stopper of FIG. 53.

As best shown in FIG. 54, the stopper 810 may include a stopper support wall 830 connected to the stopper rear surface 816 and extending outwardly therefrom. The stopper support wall 830 may be configured to abut or be positioned adjacent to the side plate 570 (see FIG. 30) when the printhead assembly 200 is assembled. In some instances, the stopper support wall 830 may provide stability and/or structural rigidity to the stopper 810 and/or other components of the printhead assembly 200. The stopper support wall 830 may include a stopper receiving region 832 provided in the form of an inwardly curved surface of the stopper support wall 830 positioned proximate to the stopper second end 820 and arranged to receive or be engaged by the appendage impact member 798 of the lever shaft appendage 790 (see FIG. 52).

Figure 55:
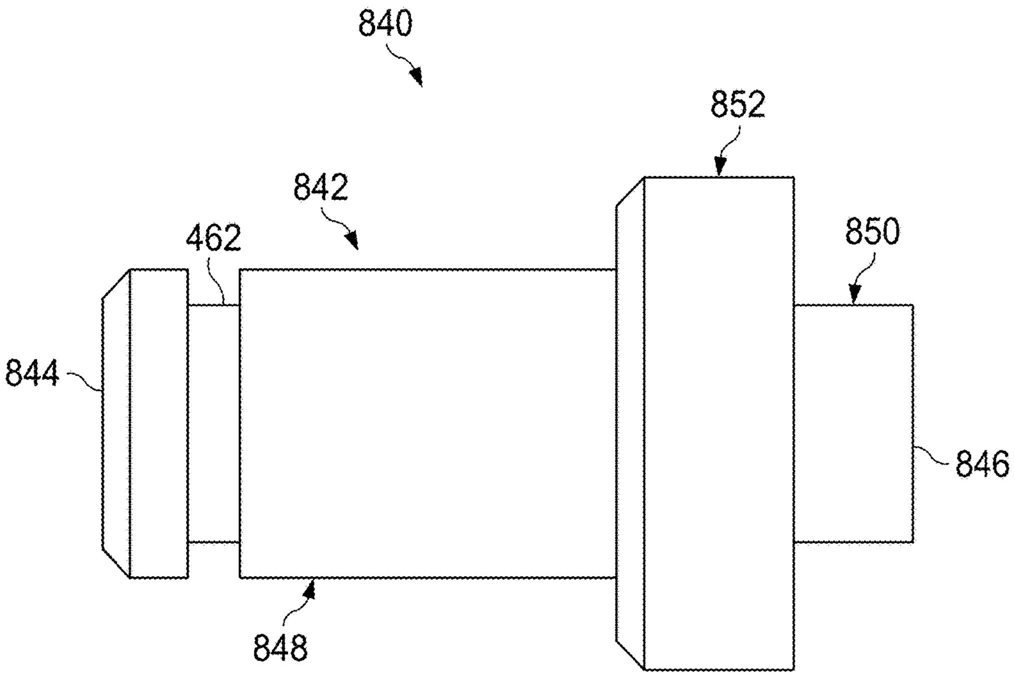
FIG. 55 illustrates a right side elevational view of a first pin for use with the stopper of FIG. 53.

Turning to FIG. 55, a stopper mounting pin 840 may facilitate attachment of the stopper 810 to the side plate 570 (see FIG. 30) when the printhead assembly 200 is assembled. The stopper mounting pin 840 may be provided in the form of a substantially cylindrical mounting pin body 842 defined by a mounting pin first end 844 and a mounting pin second end 846 opposing the mounting pin first end 844. A mounting pin receiving portion 848 may be positioned proximate to the mounting pin first end 844, a mounting pin insert portion 850 may be positioned at the mounting pin second end 846, and a substantially annular mounting pin collar 852 may be positioned between the mounting pin receiving portion 848 and the mounting pin insert portion 850. In some instances, the stopper mounting pin 840 may include a washer groove 462 proximate to the mounting pin first end 844.

In some instances, the stopper mounting pin 840 may extend through the second stopper hole 824 such that the mounting pin receiving portion 848 is positioned within the second stopper hole 824 (see FIG. 53). The mounting pin first end 844 may extend beyond the stopper front surface 814 (e.g., such that the washer groove 462 may receive a washer 472 arranged to prevent the stopper mounting pin 840 from tracking within the second stopper hole 824). The mounting pin collar 852 may be positioned adjacent to the stopper rear surface 816 such that the mounting pin second end 846 can be received by the side plate stopper hole **584*f* (e.g., in a press fit), thereby coupling the stopper 810 to the side plate 570 (see FIG. 30**).

Figure 56:
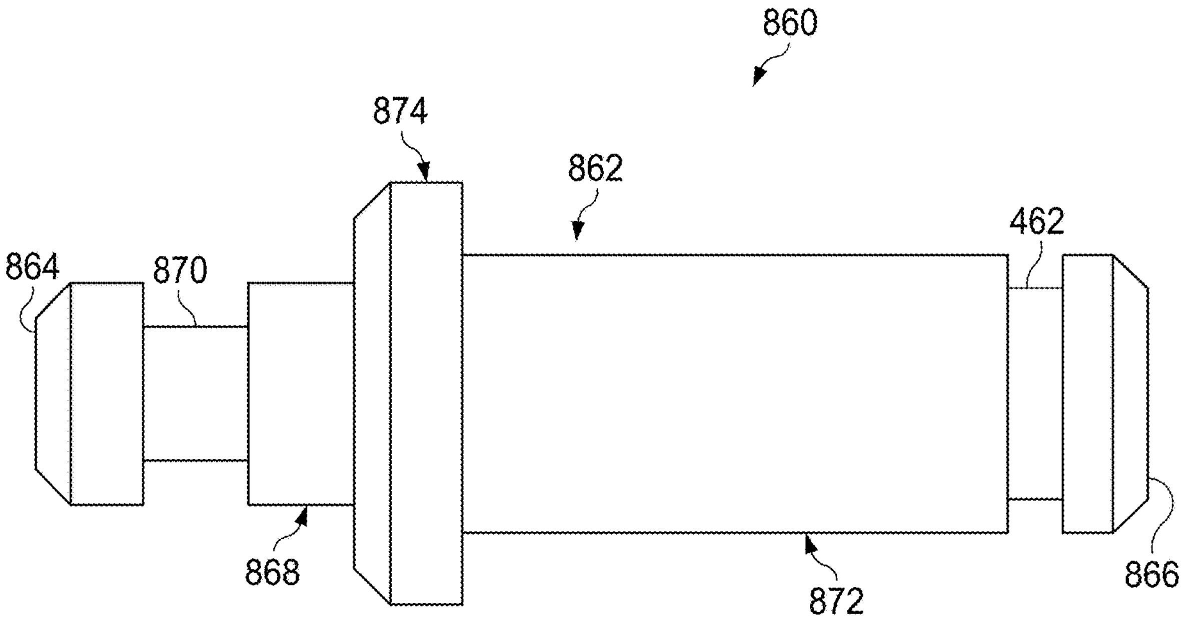
FIG. 56 illustrates a right side elevational view of a second pin for use with the stopper of FIG. 53.

Turning to FIG. 56, a stopper spring pin 860 may be designed to be installed on the stopper 810 via the first stopper hole 822 when the printhead assembly 200 is assembled. The stopper spring pin 860 may be provided in the form of a substantially cylindrical spring pin body 862 defined by a spring pin first end 864 and a spring pin second end 866 opposing the spring pin first end 854. A spring post 868 including a substantially annular spring groove 870 may be positioned proximate to the spring pin first end 864, a spring pin receiving portion 872 may be positioned proximate to the spring pin second end 866, and a substantially annular spring pin collar 874 may be positioned between the spring post 868 and the spring pin receiving portion 872.

In some instances, the stopper spring pin 860 may extend through the first stopper hole 822 such that the spring pin receiving portion 872 is positioned within the first stopper hole 822 (see FIG. 53). The spring pin second end 866 may extend beyond the stopper rear surface 816 (e.g., such that the washer groove 462 may receive a washer 472 arranged to prevent the stopper spring pin 860 from tracking within the first stopper hole 822). The spring pin collar 874 may be positioned adjacent to the stopper front surface 814 such that the spring post 868 extends beyond the stopper front surface 814 and the spring groove 870 is available to receive and/or be engaged by another component of the printhead assembly 200 (e.g., a stopper spring 880 as shown in FIG. 57).

Figure 57:
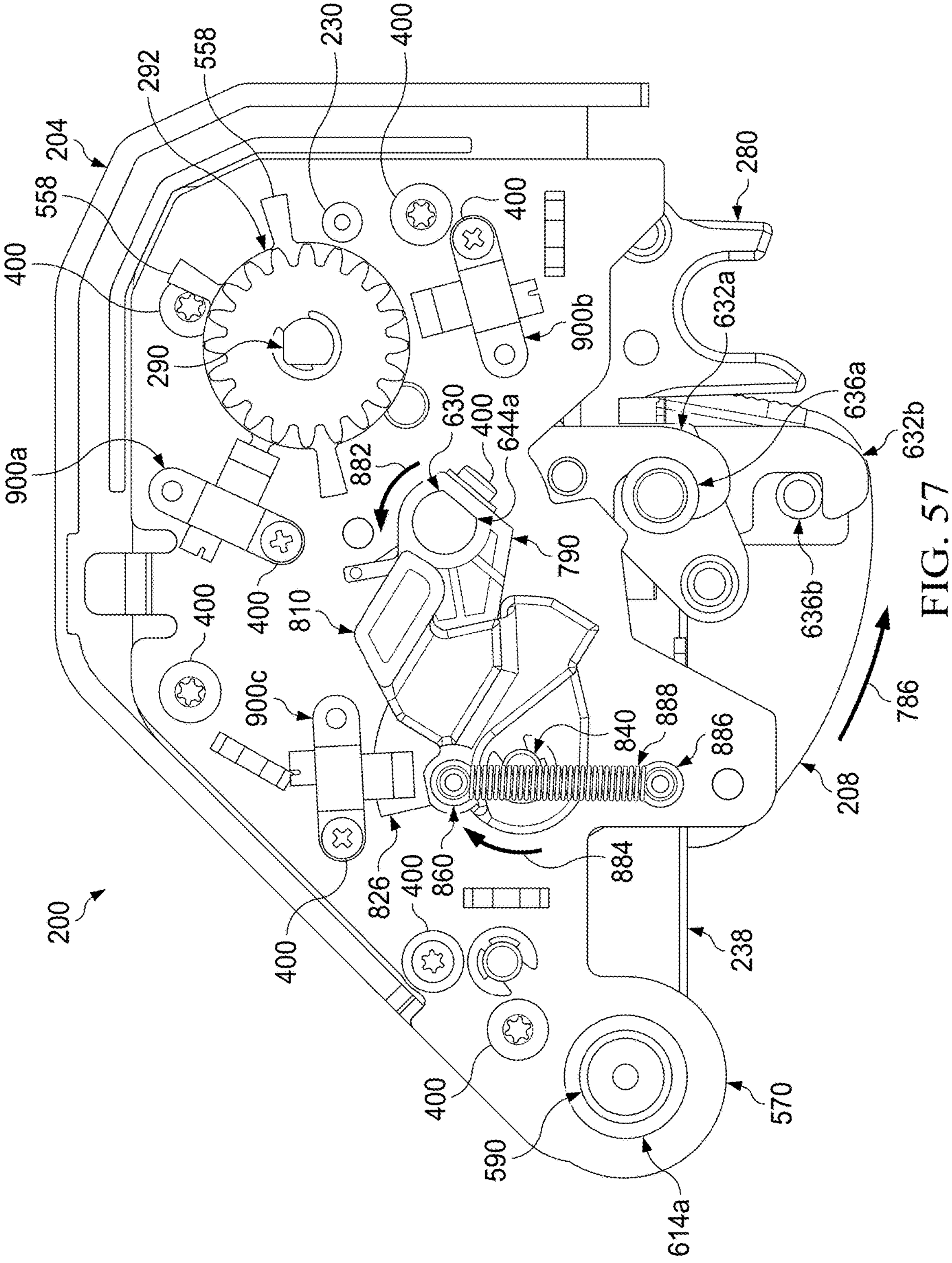
FIG. 57 illustrates a left side elevational view of the printhead assembly of FIG. 5.

Turning to FIG. 57, the lever shaft 630 may extend through the side plate lever shaft hole **584*d* of the side plate 570 (see FIG. 30) and the casing lever shaft hole 240 of the casing 204 (see FIG. 8) such that the lever subassembly 206 is substantially positioned within the enclosure 618 (see FIG. 33). The lever shaft 630 may extend beyond the side plate 570 such that the first lever shaft notched region 644*a* may be received by the appendage mounting hole 800 (see FIG. 52). The lever shaft appendage 790 may be positioned adjacent to the side plate 570 and coupled to the lever shaft 630 by a fastener 400 extending through the appendage fastener hole 802 and received by the first lever shaft opening 652*a* (see FIG. 35). The lever shaft appendage 790 may thus be configured to rotate in the direction of a third arrow 882 when the lever 208 moves or rotates in the direction of the second arrow 786**.

In some instances, the stopper 810 may be coupled to the side plate 570 by the stopper mounting pin 840 and may be arranged to apply a return force to the lever shaft 630 via the lever shaft appendage 790 when the lever 208 moves or rotates in the direction of the second arrow 786. For example, the stopper 810 may be positioned proximate to the lever shaft appendage 790 such that the appendage impact member 798 (see FIG. 52) is received by or otherwise engages the stopper receiving region 832 (see FIG. 54). Thus, when the lever shaft appendage 790 rotates in the direction of the third arrow 882, the appendage impact member 798 may apply a downward force to the stopper receiving region 832, thereby causing the stopper 810 to rotate about an axis of rotation formed by the stopper mounting pin 840 (e.g., in the direction of a fourth arrow 884).

A spring base pin 886 may be coupled to the side plate 570 (e.g., via one of the side plate pin holes **584*h* shown in FIG. 30) and extend outwardly therefrom. The spring base pin 886 may be positioned proximate to the stopper 810 such that a stopper spring 888 may extend between the spring base pin 886 and the stopper spring pin 860. For example, one end of the stopper spring 888 may be received by an annular spring groove of the spring base pin 886 (not shown) and the spring groove 870 (see FIG. 56). The stopper spring 888 may be in an expanded state such that a tension of the stopper spring 888 applies a downward force to the stopper spring pin 860. In some instances, the stopper spring 888 may apply a preload tension to the lever shaft 630 (e.g., due to the engagement between the stopper 810, lever shaft appendage 790, and lever shaft 630) such that the likelihood of the lever 208 unintentionally rotating in the direction of the second arrow 786 is reduced or eliminated. Additionally, a distance between the stopper spring pin 860 and the spring base pin 886 may increase when the stopper 810 rotates in the direction of the fourth arrow 884, thereby causing the stopper spring 888 to expand and apply a return force (e.g., a downward force) to the stopper 810**.

Figure 58:
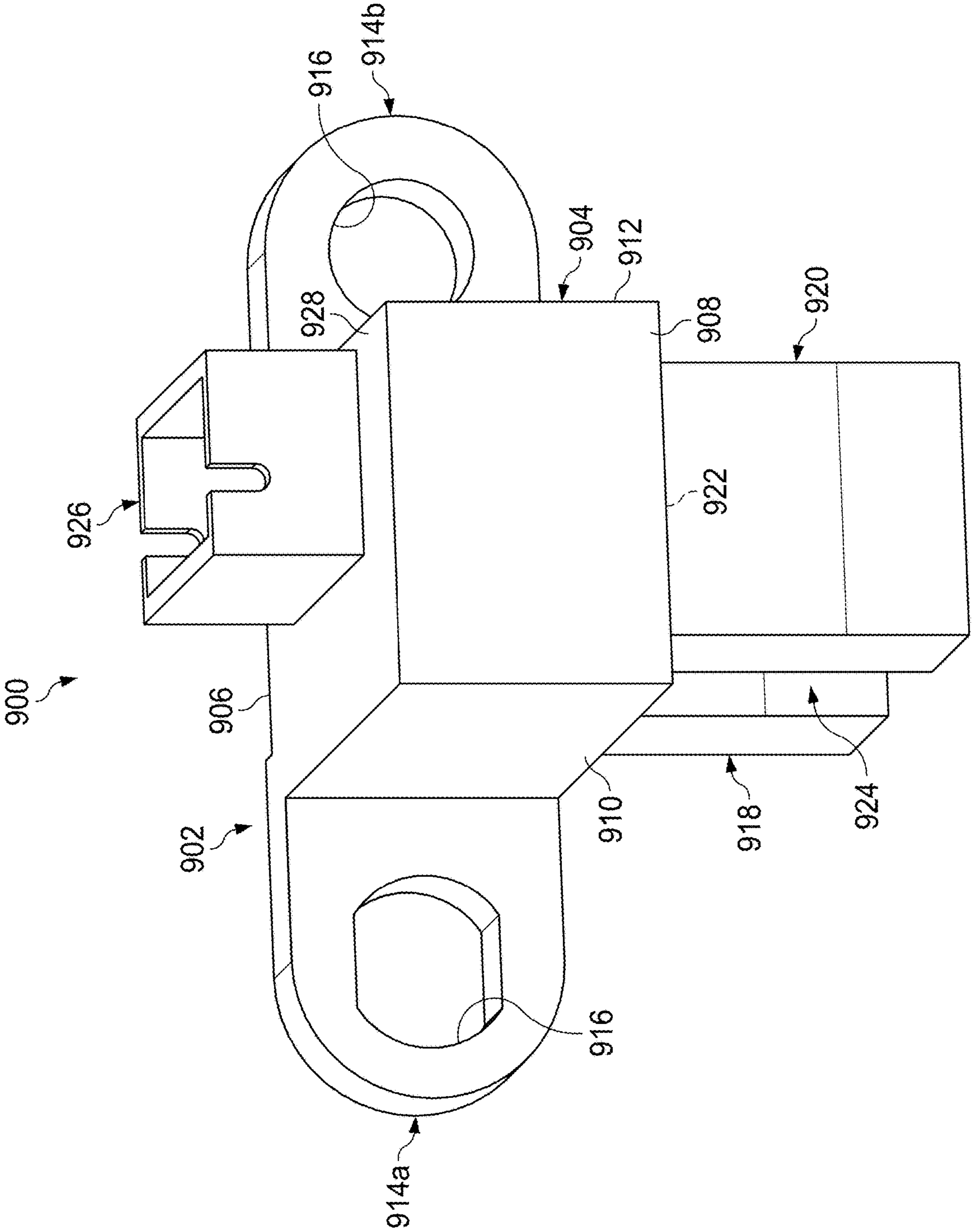
FIG. 58 illustrates a top, front, and left side isometric view of a sensor of the printhead assembly of FIG. 5.
Figure 59:
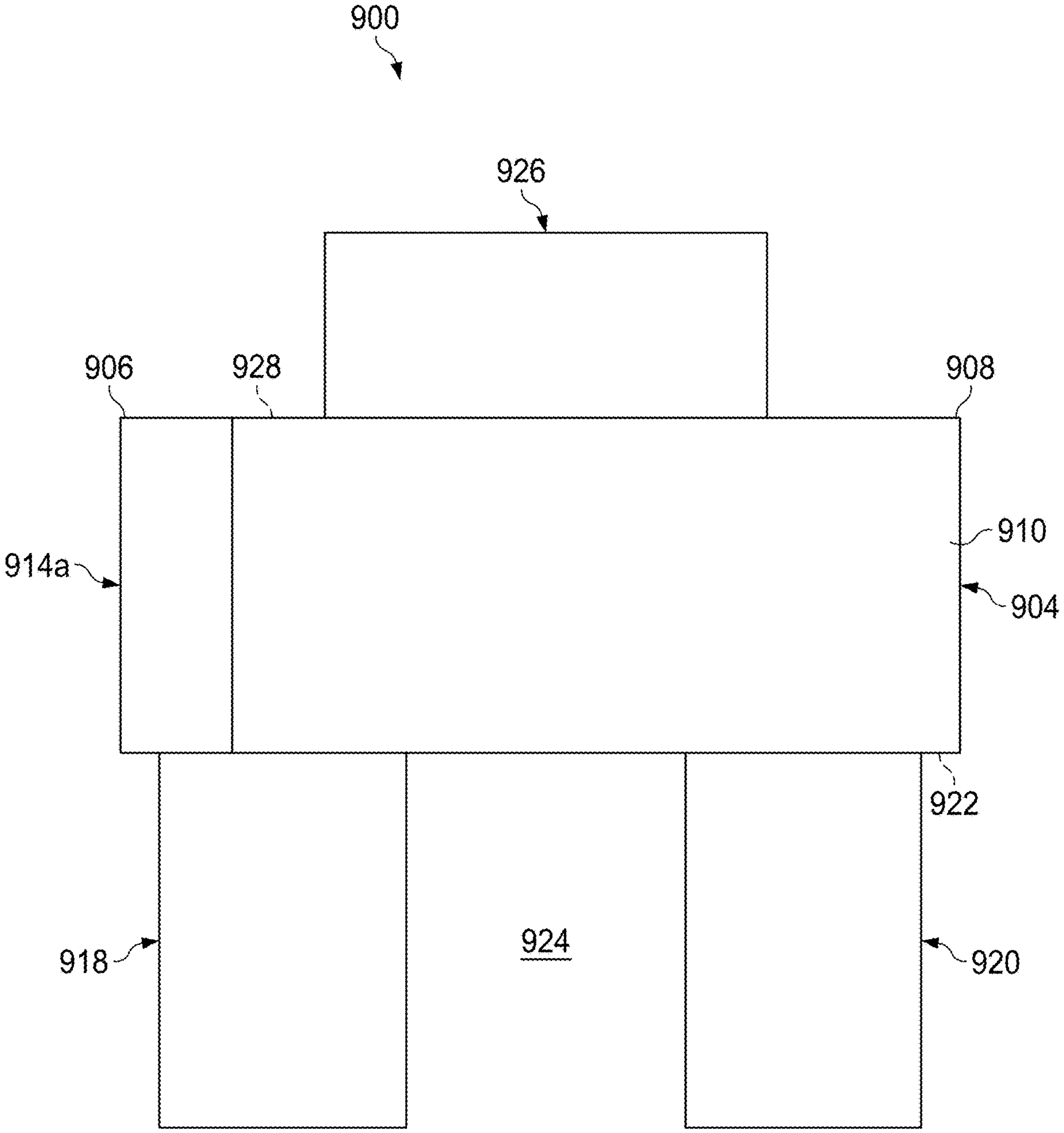
FIG. 59 illustrates a left side elevational view of the sensor of FIG. 58.

In some instances, one or more sensors 900 may be coupled to the side plate 570 and arranged to generate one or more signals indicative of one or more settings, positions, or configurations of the printhead assembly 200. As shown in FIGS. 58 and 59, each of the sensors 900 may be provided in the form of a substantially rectilinear sensor body 902 including a rectangular sensor base member 904 defined by a sensor first end 906, a sensor second end 908 opposing the sensor first end 906, a sensor first side 910 extending between the sensor first end 906 and the sensor second end 908, and a sensor second side 912 extending between the sensor first end 906 and the sensor second end 908 and opposite the sensor first side 910. In other instances, the sensor body 902 and/or the sensor base member 904 may be imparted with a rounded shape or any other suitable shape.

Each of the sensors 900 may include a first wing 914*a* and a second wing 914*b* configured to facilitate attachment between the sensor 900 and the side plate 570. The first and second wings 914*a*, 914*b* may be formed integrally with the sensor base member 904 or may be coupled thereto. The first wing 914*a* may be connected to the sensor base member 904 proximate to the junction between the sensor first end 906 and the sensor first side 910 and extend outwardly therefrom. The second wing 914*b* may be connected to the sensor base member 904 proximate to the junction between the sensor first end 906 and the sensor second side 912 and extend outwardly therefrom. The first and second wings 914*a*, 914*b* may each include a sensor connection hole 916 configured to align with the side plate sensor holes 584*g* and facilitate coupling the sensor 900 to the side plate 570 (e.g., via a press fit, snap fit, threaded engagement, or other mechanism known in the art).

As best shown in FIG. 59, each of the sensors 900 may include a first sensor leg 918 and a second sensor leg 920 connected to a bottom side 922 of the sensor base member 904 and extending downwardly therefrom. The first sensor leg 918 may be provided in the form of a substantially rectangular protrusion positioned proximate to the sensor first end 906, and the second sensor leg 920 may be provided in the form of a substantially rectangular protrusion positioned proximate to the sensor second end 908. The first and second sensor legs 918, 920 may be oriented parallel with respect to one another such that an opening or passageway 924 is positioned between the first sensor leg 918 and the second sensor leg 920. Additionally, in some instances, each of the sensors 900 may include a port 926 provided in the form of a substantially rectilinear protrusion connected to a top side 928 of the sensor base member 904 and extending upwardly therefrom. For example, the port 926 may be a mating portion of the sensor 900 configured to receive a connector (not shown) such that each of the sensors 900 may be in communication with a processor, controller, or other electronic component of a printing device (e.g., the printer 100).

In some instances, each of the sensors 900 may be provided in the form of an optical sensor (e.g., a photointerrupter). For example, one of the first and second sensor legs 918, 920 may be equipped with an emitter (not shown) configured to emit a light beam across the passageway 924. The other of the first and second sensor legs 918, 920 may be equipped with a receiver (not shown) positioned opposite the emitter and configured to receive the light beam. Thus, each of the sensors 900 may at any given moment occupy or detect either a blocked state or an unblocked state. If the light beam from the emitter is able to traverse the passageway 924 and reach the receiver, the sensor 900 may generate a signal indicating that the sensor 900 is in the unblocked state. If the light beam from the emitter is prevented from traversing the passageway 924 and reaching the receiver, the sensor 900 may generate a signal indicating that the sensor 900 is in the blocked state.

One or more sensors 900 may be coupled to the side plate 570 (see FIG. 57) and arranged to detect one or more settings, positions, or conditions of the printhead assembly 200. Each of the sensors 900 may be in communication with a processor, controller, or other electronic component (not shown) of a printing device (e.g., the printer 100). Thus, the sensors 900 may facilitate digital operation or control of the printhead assembly 200. In some instances, the printhead assembly 200 includes three sensors 900. In other instances, the printhead assembly 200 may include any number of sensors 900 positioned in any suitable arrangement.

As shown in the example of FIG. 57, the printhead assembly 200 may include a first sensor 900*a* and a second sensor 900*b* arranged to detect the sensor flags 558 of the cam adjustment gear 292 as the cam shaft 290 rotates. In some instances, the first and second sensors 900*a*, 900*b* may together form a system capable of generating unique signals indicative of multiple rotational positions of the cam shaft 290. For example, the sensor flags 558 may be arranged such that one, neither, or both of the first and second sensors 900*a*, 900*b* occupies or detects the blocked state depending on the rotational position of the cam shaft 290. When the cam shaft 290 rotates, the orientation of the sensor flags 558 with respect to the first and second sensors 900*a*, 900*b* may change, thereby altering the signal or signals generated by the first and second sensors 900*a*, 900*b*.

A third sensor 900*c* may be positioned proximate to the stopper 810 and positioned to detect the stopper sensor flag 826. For example, at least a portion of the stopper sensor flag 826 may be positioned within the passageway 924 (see FIG. 59) such that the third sensor 900*c* occupies or detects the blocked state when the lever subassembly 206 is in the default configuration (e.g., when the printhead assembly 200 is closed). The stopper sensor flag 826 may leave the passageway 924 when the lever subassembly 206 transitions to the lift configuration as described above with reference to FIGS. 50A and 50B. For example, rotation of the lever shaft 630 and lever shaft appendage 790 in the direction of the third arrow 882 (e.g., due to a user pressing or rotating the lever 208 in the direction of the second arrow 786) may cause the stopper sensor flag 826 to rotate out of the passageway 924 in the direction of the fourth arrow 884. Thus, the third sensor 900*c* may detect a transition from the blocked state to the unblocked state when the lever subassembly 206 is operated to open the printhead assembly 200. In this way, the third sensor 900*c* may be configured to communicate a signal to the processor or controller of a printing device (e.g., the printer 100) indicating the state or configuration of the lever subassembly 206 and/or the printhead assembly 200 (e.g., open vs. closed).

Figure 60:
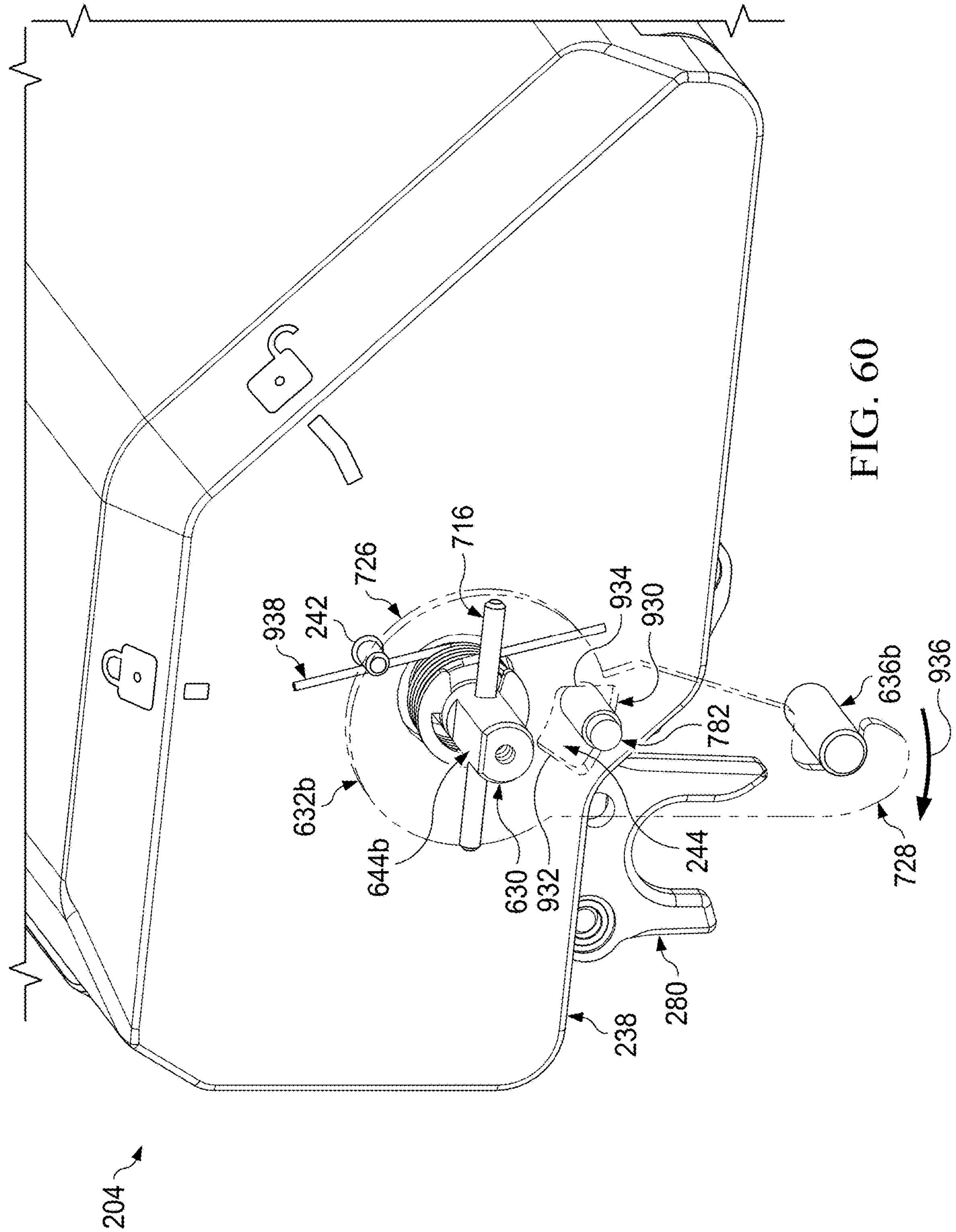

Turning to FIG. 60, in some instances the second lock member 632*b* may be arranged to engage the casing protrusion 242 and/or the recessed surface 244 of the casing 204. For example, the second lock member pin 782 may be connected to the second lock member 632*b* via the lock member opening 742 (see FIG. 42B) and extend outwardly therefrom (e.g., toward the casing 204). A portion of the second lock member pin 782 may be received by the recessed surface 244. The recessed surface 244 may be defined by a recessed surface sidewall 930. The recessed surface sidewall 930 may be substantially perpendicular with respect to the recessed surface 244 and may surround the portion of the second lock member pin 782 received therein.

The recessed surface 244 may be defined by a recessed surface first end 932 and a recessed surface second end 934 opposing the recessed surface first end 932. In some instances, the second lock member pin 782 may be positioned at the recessed surface second end 934 while the lever subassembly 206 is in the default configuration and the second lock member 632*b* engages the second locking pin 636*b*. The second lock member 632*b* may rotate in the direction of a fifth arrow 936 once the lever impact surface 714 engages the lock member tab 736 of the second lock member 632*b*, as described above with reference to FIG. 51. Thus, the second lock member pin 782 may travel from the recessed surface second end 934 to the recessed surface first end 932 as the second lock member 632*b* disengages the second locking pin 636*b*. The second lock member pin 782 may be configured to aid in converting the printhead assembly 200 from the closed position to the open position by engaging the recessed surface sidewall 930 at the recessed surface first end 932. For example, a user may continue to apply a force (e.g., upward or in the direction of the fifth arrow 936) to the lever subassembly 206 while the second lock member pin 782 engages the recessed surface first end 932 such that the casing 204 and/or other components of the printhead assembly 200 are moved into the open position.

In some instances, a torsion spring 938 may be positioned on the lever shaft 630 between the second lock member 632*b* and the casing sidewall 238. The torsion spring 938 may be configured to supply a resistance or a return force when the lever shaft 630 rotates to disengage the lock members 632 from the locking pins 636. For example, the torsion spring 938 may engage the casing protrusion 242 as shown in FIG. 60.

Figure 61:
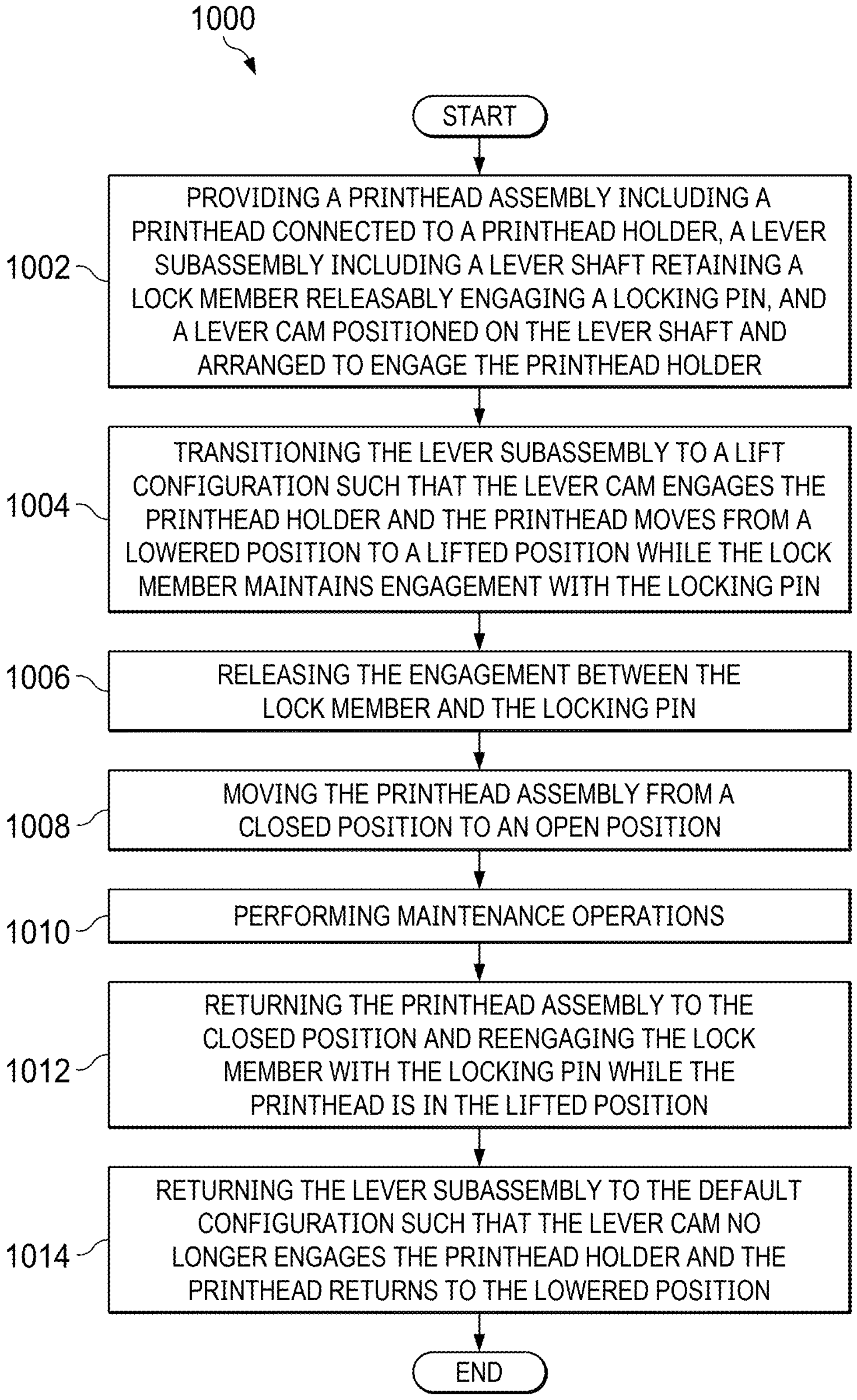
FIG. 61 is a flow chart illustrating a method of opening and closing a printhead assembly according to the principles of the present disclosure.

FIG. 61 illustrates a method 1000 of opening and closing a printhead assembly (e.g., to perform maintenance, replace one or more components of the printhead assembly, or to load consumables) according to the principles of the present disclosure.

At a step 1002, a printhead assembly (e.g., printhead assembly 200) is provided. In some instances, the printhead assembly includes a printhead (e.g., printhead 138) connected to a printhead holder (e.g., printhead holder 282), a lever subassembly (e.g., lever subassembly 206) including a lever shaft (e.g., lever shaft 630) retaining one or more lock members (e.g., first lock member 632*a* and second lock member 632*b*) releasably engaging one or more locking pins (e.g., first locking pin 636*a* and second locking pin 636*b*) and one or more lever cams (e.g., first lever cam 756*a* and second lever cam 756*b*) positioned on the lever shaft and arranged to engage the printhead holder. In some instances, the printhead assembly may be movable between a closed position and an open position, the printhead may be movable between a lowered position and a lifted position, and/or the lever subassembly may be movable between a default configuration and a lift configuration. The printhead holder may include one or more lever impact surfaces positioned adjacent to and arranged to be engaged by one or more of the lever cams.

At a step 1004, the lever subassembly transitions to the lift configuration such that the one or more lever cams engage the printhead holder and the printhead moves from the lowered position to a lifted position while the one or more lock members maintain engagement with the one or more locking pins.

At a step 1006, the one or more lock members disengage the one or more locking pins.

At a step 1008, the printhead assembly moves from the closed position to the open position.

At a step 1010, maintenance operations may be performed. The maintenance operations may include repairing or replacing the printhead and/or other components of the printhead assembly, loading consumables into the printhead assembly, and the like.

At a step 1012, the printhead assembly returns to the closed position and the lock members reengage the locking pins while the printhead is in the lifted position.

At a step 1014, the lever subassembly returns to the default configuration and the printhead returns to the lowered position.

It will be appreciated by those skilled in the art that while the above disclosure has been described above in connection with particular embodiments and examples, the above disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference as if each such patent or publication were individually incorporated by reference herein. Various features and advantages of the above disclosure are set forth in the following claims.

The invention claimed is:

1. A printhead assembly for use in a printer, comprising:
- a printhead connected to a printhead holder, the printhead movable between a lowered position and a lifted position; and
- a lever subassembly including:
  - a lever shaft;
  - a locking mechanism configured to maintain the printhead assembly in a closed position when the locking mechanism is engaged; and
  - a lever cam connected to the lever shaft and positioned adjacent to a portion of the printhead holder,
- wherein the lever cam moves the printhead from the lowered position to the lifted position by engaging the printhead holder, and
- wherein the printhead is moved to the lifted position prior to disengaging the locking mechanism when moving the printhead assembly from the closed position to an open position.

2. The printhead assembly of claim 1, wherein the printhead is maintained in the lifted position until the locking mechanism is reengaged after moving the printhead assembly from the open position to the closed position.

3. The printhead assembly of claim 1, wherein the locking mechanism includes a lock member releasably engaging a locking pin.

4. The printhead assembly of claim 3, wherein the lever cam engages the printhead holder and moves the printhead to the lifted position before the lock member and the locking pin disengage.

5. The printhead assembly of claim 3, wherein the lever cam is designed to rotate with the lever shaft, and wherein the lock member is designed to permit the lever shaft to rotate with respect to the lock member.

6. The printhead assembly of claim 3, further comprising a sensor arranged to detect whether the locking mechanism is disengaged.

7. A printhead assembly for use in a printer, comprising:
- an enclosure formed by a casing and a side plate coupled to the casing;

a printhead connected to a printhead holder retained within the enclosure; and a lever subassembly including:

a lever shaft positioned partially within the enclosure, a first end of the lever shaft extending beyond the side plate and a second end of the lever shaft, opposite the first end, extending beyond a sidewall of the casing;

a first lock member and a second lock member positioned on the lever shaft, the first lock member releasably engaging a first locking pin and the second lock member releasably engaging a second locking pin;

a lever cam positioned on the lever shaft and configured to rotate therewith; and a lever connected to the second end of the lever shaft and operably engaging the lever subassembly, wherein the printhead assembly is movable between a closed position and an open position, wherein the printhead occupies a lowered position when the printer is in use, and wherein the printhead occupies a lifted position when the printhead assembly is transitioned between the closed position and the open position.

8. The printhead assembly of claim 7, wherein the lever cam is positioned to engage the printhead holder, and wherein the lever cam causes the printhead to move to the lifted position by engaging the printhead holder.

9. The printhead assembly of claim 8, wherein the lever shaft moves from a first stage of rotation to a second stage of rotation when the printhead assembly transitions from the closed position to the open position.

10. The printhead assembly of claim 9, wherein the lever cam rotates into engagement with the printhead holder and the first and second lock members remain stationary during the first stage of rotation.

11. The printhead assembly of claim 10, wherein the printhead is in the lifted position when the first stage of rotation is complete.

12. The printhead assembly of claim 11, wherein the first lock member disengages the first locking pin and the second lock member disengages the second locking pin during the second stage of rotation.

13. The printhead assembly of claim 11, wherein the first lock member engages the first locking pin and the second lock members engages the second locking pin until the first lock member is impacted by a first component of the lever subassembly configured to rotate with the lever shaft and the second lock member is impacted by a second component of the lever subassembly configured to rotate with the lever shaft.

14. The printhead assembly of claim 7, wherein the force required to open the printhead assembly when the printhead is in the lifted position is less than the force required to open the printhead assembly when the printhead is in the lowered position.

15. The printhead assembly of claim 7, wherein the force required to close the printhead assembly when the printhead is in the lifted position is less than the force required to close the printhead assembly when the printhead is in the lowered position.

16. The printhead assembly of claim 7, wherein rotation of the lever shaft releases the engagement between the first lock member and the first locking pin and the second lock member and the second locking pin.

17. The printhead assembly of claim 16, further comprising:

a lever shaft appendage connected to the first end of the lever shaft and configured to rotate therewith; and a stopper connected to the side plate and arranged to be engaged by the lever shaft appendage when the lever shaft rotates.

18. The printhead assembly of claim 17, wherein a stopper spring extending between a first pin connected to the side plate and a second pin connected to the stopper is arranged to apply a return force to the lever shaft in response to the lever shaft appendage engaging the stopper.

19. The printhead assembly of claim 17, further comprising:

a stopper sensor flag connected to the stopper and extending outwardly therefrom; and a sensor connected to the side plate and positioned to detect the stopper sensor flag, wherein the sensor is configured to generate a signal indicating whether the printhead is in the lowered position or the lifted position based on whether or not the sensor detects the stopper sensor flag.

20. A method of opening and closing a printhead assembly in a printer, comprising:

providing a printhead assembly including a printhead connected to a printhead holder, a lever subassembly including a lever shaft retaining a lock member releasably engaging a locking pin, and a lever cam positioned on the lever shaft and arranged to engage the printhead holder;

transitioning the lever subassembly from a default configuration to a lift configuration such that the lever cam engages the printhead holder and the printhead moves from a lowered position to a lifted position while the lock member maintains engagement with the locking pin;

releasing the engagement between the lock member and the locking pin;

moving the printhead assembly from a closed position to an open position;

returning the printhead assembly to the closed position and reengaging the lock member with the locking pin while the printhead is in the lifted position; and returning the lever subassembly to the default configuration such that the lever cam no longer engages the printhead holder and the printhead returns to the lowered position.

* * * * *